United States Patent
Ly et al.

(10) Patent No.: US 11,310,088 B2
(45) Date of Patent: Apr. 19, 2022

(54) PHYSICAL SHARED CHANNEL REFERENCE SIGNAL BUNDLING

(71) Applicant: QUALCOMM Incorporated, San Diego, CA (US)

(72) Inventors: Hung Dinh Ly, San Diego, CA (US); Wei Yang, San Diego, CA (US); Seyedkianoush Hosseini, San Diego, CA (US); Seyed Ali Akbar Fakoorian, San Diego, CA (US); Kazuki Takeda, Minato-ku (JP); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/921,910

(22) Filed: Jul. 6, 2020

(65) Prior Publication Data
US 2021/0014095 A1    Jan. 14, 2021

Related U.S. Application Data

(60) Provisional application No. 62/885,755, filed on Aug. 12, 2019, provisional application No. 62/873,133, filed on Jul. 11, 2019.

(51) Int. Cl.
*H04L 27/26* (2006.01)
*H04L 5/00* (2006.01)
*H04W 72/04* (2009.01)

(52) U.S. Cl.
CPC ........ *H04L 27/2613* (2013.01); *H04L 5/0023* (2013.01); *H04L 5/0053* (2013.01); *H04L 5/0094* (2013.01); *H04W 72/042* (2013.01)

(58) Field of Classification Search
CPC ............. H04L 5/0094; H04L 27/26132; H04L 27/2613; H04L 5/0053; H04L 5/0044;
(Continued)

(56) References Cited

U.S. PATENT DOCUMENTS

2019/0045569 A1    2/2019  Abedini et al.
2019/0159181 A1*   5/2019  Manolakos .......... H04B 7/0617
(Continued)

FOREIGN PATENT DOCUMENTS

WO    WO-2018187242 A1 * 10/2018  .......... H04L 5/0094
WO    WO-2019009454 A1    1/2019

OTHER PUBLICATIONS

Samsung, R1-1702913 "Continuous precoding of NR DMRS in time domain," Feb. 7, 2017, 3GPP TSG RAN WG1 Meeting #88 Athens, Greece Feb. 13-17, 2017 (Year: 2017).*
(Continued)

*Primary Examiner* — Maharishi V Khirodhar
*Assistant Examiner* — Kenneth P Hunt
(74) *Attorney, Agent, or Firm* — Holland & Hart LLP

(57) ABSTRACT

Methods, systems, and devices for wireless communications are described to enable a user equipment (UE) to bundle reference signals, such as demodulation reference signals (DMRSs), by maintaining one or more coherence properties across DMRSs. A base station may transmit an indication of a DMRS bundling configuration to the UE, and the UE may transmit a DMRS bundling capability indication to the base station. The base station may transmit DCI to the UE, and the UE may determine whether to maintain or alter DMRS bundling (for example, maintain or alter one or more coherence properties) for one or more physical shared channels based on the DCI. The UE may maintain or alter one or more coherence properties of the one or more physical shared channels based on determining whether to maintain DMRS bundling and may transmit the one or more physical shared channels and associated DMRSs to the base station.

65 Claims, 24 Drawing Sheets

(58) Field of Classification Search
CPC .................. H04L 5/0023; H04L 5/001; H04L 27/261–26136; H04L 5/0048–0051; H04W 72/042
See application file for complete search history.

(56) References Cited

U.S. PATENT DOCUMENTS

2020/0389284 A1* 12/2020 Manolakos ........... H04L 5/0092
2020/0403768 A1* 12/2020 Manolakos ........... H04L 5/0082

OTHER PUBLICATIONS

International Search Report and Written Opinion—PCT/US2020/041054—ISAEPO—dated Oct. 12, 2020.
ZTE: "Initial Consideration on NR V2X Resource Allocation", 3GPP Draft, 3GPP TSG-RAN WG2#103bis, R2-1814168 Initial Consideration on NR V2X Resource Allocation, 3rd Generation Partnership Project (3GPP), Mobile Competence Centre, 650, Route Des Lucioles, F-06921, Sophia-Antipolis Cedex, vol. RAN WG2, Sep. 28, 2018 (Sep. 28, 2018), 7 pages, XP051523625, Retrieved from the Internet: URL: http://www.3gpp.org/ftp/tsg%5Fran/WG2%5FRL2/TSGR2%5F103bis/Docs/R2%2D1814168%2Ezip, [retrieved on Dec. 11, 2018], Sections 1-3.

* cited by examiner

PHYSICAL SHARED CHANNEL REFERENCE SIGNAL BUNDLING

CROSS REFERENCE

The present application for patent claims the benefit of U.S. Provisional Patent Application No. 62/873,133 by L Y et al., entitled "PHYSICAL SHARED CHANNEL REFERENCE SIGNAL BUNDLING," filed Jul. 11, 2019; and U.S. Provisional Patent Application No. 62/885,755 by FAKOORIAN et al., entitled "UPLINK DMRS BUNDLING," filed Aug. 12, 2019; each of which is assigned to the assignee hereof, and each of which is expressly incorporated by reference herein.

TECHNICAL FIELD

The following relates generally to wireless communications and more specifically to physical shared channel reference signal bundling.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a quantity of base stations or network access nodes, each simultaneously supporting communication for multiple communication devices, which may be otherwise known as user equipment (UE).

One or more signaling or other characteristics of some wireless communications systems may increase communication delays or overhead, among other challenges. For example, interference associated with signaling in a wireless communications system may decrease communication quality and may cause reception and decoding of inaccurate bits. The reception of such bits may increase communication delays and overhead based on increased retransmissions associated with a feedback process for the signaling. The one or more signaling or other characteristics may also limit a coverage area of one or more base stations of the wireless communications systems related to one or more UEs of the wireless communications systems. For example, a coverage area of a base station may be limited by interference or other characteristics of wireless signaling.

SUMMARY

The described techniques relate to improved methods, systems, devices, and apparatuses that support physical shared channel reference signal bundling. Generally, the described techniques allow for a first device, such as a user equipment (UE), to bundle one or more reference signals, such as demodulation reference signals (DMRSs). In some implementations, the bundling may include transmitting multiple, redundant versions of a same set of DMRSs to a base station in one or more transmission time intervals (TTIs) or one or more slots. The UE may bundle DMRSs associated with a physical shared channel that is repeated over multiple TTIs or repeated over multiple slots. The UE may additionally or alternatively bundle DMRSs associated with one or more physical shared channels carrying different transport blocks (TBs), across multiple TTIs or slots. In some examples, the bundling of the DMRSs includes the UE maintaining or setting one or more coherence properties across the bundled DMRSs. In some examples, the UE may maintain one or more of coherence properties across the bundled DMRSs such as a phase continuity, a precoder continuity (for example, precoding each of the DMRS using a same precoder matrix), a transmit power, a transmit waveform, a time resource allocation, or a frequency resource allocation, among other examples.

A base station may (for example, explicitly or implicitly) transmit an indication of a DMRS bundling configuration or a DMRS bundling configuration itself to the UE. The UE may receive the indication of the DMRS bundling configuration or the DMRS bundling configuration itself from the base station and may transmit a capability indication to the base station, indicating the capability of the UE for supporting DMRS bundling. The base station may transmit downlink control information (DCI) to the UE to configure the UE, for example, for uplink or downlink transmissions. The UE may receive the DCI and may determine whether to maintain DMRS bundling (for example, maintain a phase continuity) for the one or more of the physical shared channels based on one or more priorities of the DMRS bundling configuration, or information included in the DCI, or both, among other factors. For example, the UE may determine to maintain or to alter one or more parameters associated with the phase continuity or other coherence property associated with transmitting a physical shared channel in one or more symbols, including symbols carrying DMRSs (for example, coherent transmission of DMRSs across multiple slots).

The UE may transmit an uplink transmission to the base station based on the determination of whether to maintain or alter DMRS bundling, and in some examples, the uplink transmission may include one or more of the one or more physical shared channels or one or more associated DMRSs. The UE may bundle the DMRSs or may not bundle the DMRSs (for example, maintain or alter one or more phase continuity or coherence properties) based on determining whether to maintain DMRS bundling. The base station may receive multiple DMRSs from one or more UEs and may improve a channel estimate by jointly processing the multiple bundled DMRSs. In another example, the base station may receive multiple DMRSs from the UE and may combine the signals using one or more components, and may estimate the channel from the combined signal. Combining the signals may improve one or more of channel estimation, decoding, or demodulation of any physical shared channels associated with the bundled DMRSs and may reduce transmission delays and reduce overhead, among other benefits.

One innovative aspect of the subject matter described in this disclosure may be implemented in a method for wireless communication. The method includes receiving, from a base station, an indication of a DMRS bundling configuration for one or more physical shared channels; transmitting, to the base station based on receiving the indication, an indication of a UE capability for DMRS bundling for the one or more physical shared channels; receiving, from the base station based on transmitting the indication of the UE capability, DCI; determining, based on the DCI, whether to alter a parameter associated with or more physical shared channel symbols associated with the one or more physical shared channels; and transmitting, to the base station based on determining whether to alter the parameter, one or more DMRSs associated with the one or more physical shared channel symbols.

Another innovative aspect of the subject matter described in this disclosure may be implemented in an apparatus for wireless communications at a UE. The apparatus may include a processor, memory coupled with the processor, and instructions stored in the memory. The instructions may be executable by the processor to cause the apparatus to receive, from a base station, an indication of a DMRS bundling configuration for one or more physical shared channels; transmit, to the base station based on receiving the indication, an indication of a UE capability for DMRS bundling for the one or more physical shared channels; receive, from the base station based on transmitting the indication of the UE capability, DCI; determine, based on the DCI, whether to alter a parameter associated with or more physical shared channel symbols associated with the one or more physical shared channels; and transmit, to the base station based on determining whether to alter the parameter, one or more DMRSs associated with the one or more physical shared channel symbols.

Another innovative aspect of the subject matter described in this disclosure may be implemented in an apparatus for wireless communications at a UE. The apparatus may include means for receiving, from a base station, an indication of a DMRS bundling configuration for one or more physical shared channels; transmitting, to the base station based on receiving the indication, an indication of a UE capability for DMRS bundling for the one or more physical shared channels; receiving, from the base station based on transmitting the indication of the UE capability, DCI; determining, based on the DCI, whether to alter a parameter associated with or more physical shared channel symbols associated with the one or more physical shared channels; and transmitting, to the base station based on determining whether to alter the parameter, one or more DMRSs associated with the one or more physical shared channel symbols.

Another innovative aspect of the subject matter described in this disclosure may be implemented in a non-transitory computer-readable medium storing code for wireless communications at a UE. The code may include instructions executable by a processor to receive, from a base station, an indication of a DMRS bundling configuration for one or more physical shared channels; transmit, to the base station based on receiving the indication, an indication of a UE capability for DMRS bundling for the one or more physical shared channels; receive, from the base station based on transmitting the indication of the UE capability, DCI; determine, based on the DCI, whether to alter a parameter associated with or more physical shared channel symbols associated with the one or more physical shared channels; and transmit, to the base station based on determining whether to alter the parameter, one or more DMRSs associated with the one or more physical shared channel symbols.

In some examples of the method, apparatuses, and non-transitory computer-readable medium described herein, the parameter includes a coherence property associated with the one or more physical shared channel symbols.

In some examples of the method, apparatuses, and non-transitory computer-readable medium described herein, the coherence property includes one or more of a phase continuity, a precoder phase continuity, a threshold timing gap, a frequency resource allocation, a transmit power, or a transmit waveform, associated with the one or more physical shared channel symbols.

Another innovative aspect of the subject matter described in this disclosure may be implemented in a method of wireless communications at a base station. The method may include determining, for a UE, a DMRS bundling configuration for one or more physical shared channels; transmitting, to the UE, an indication of the DMRS bundling configuration; receiving, from the UE based on transmitting the indication, an indication of a UE capability for DMRS bundling for the one or more physical shared channels; and transmitting, to the UE based on receiving the indication of the UE capability, DCI.

Another innovative aspect of the subject matter described in this disclosure may be implemented in an apparatus for wireless communications at a base station. The apparatus may include a processor, memory coupled with the processor, and instructions stored in the memory. The instructions may be executable by the processor to cause the apparatus to determine, for a UE, a DMRS bundling configuration for one or more physical shared channels; transmit, to the UE, an indication of the DMRS bundling configuration; receive, from the UE based on transmitting the indication, an indication of a UE capability for DMRS bundling for the one or more physical shared channels; and transmit, to the UE based on receiving the indication of the UE capability, DCI.

Another innovative aspect of the subject matter described in this disclosure may be implemented in an apparatus for wireless communications at a base station. The apparatus may include means for determining, for a UE, a DMRS bundling configuration for one or more physical shared channels; transmitting, to the UE, an indication of the DMRS bundling configuration; receiving, from the UE based on transmitting the indication, an indication of a UE capability for DMRS bundling for the one or more physical shared channels; and transmitting, to the UE based on receiving the indication of the UE capability, DCI.

Another innovative aspect of the subject matter described in this disclosure may be implemented in a non-transitory computer-readable medium storing code for wireless communications at a base station. The code may include instructions executable by a processor to determine, for a UE, a DMRS bundling configuration for one or more physical shared channels; transmit, to the UE, an indication of the DMRS bundling configuration; receive, from the UE based on transmitting the indication, an indication of a UE capability for DMRS bundling for the one or more physical shared channels; and transmit, to the UE based on receiving the indication of the UE capability, DCI.

Some examples of the method, apparatuses, and non-transitory computer-readable medium described herein may further include operations, features, means, or instructions for combining the one or more DMRSs associated with the one or more physical shared channel symbols, and estimating one or more parameters associated with physical shared channel demodulation based on combining the one or more DMRSs.

In some examples of the method, apparatuses, and non-transitory computer-readable medium described herein, the one or more physical shared channel symbols may be associated with a parameter that may be altered or maintained as unchanged based on transmitting the DCI.

DETAILED DESCRIPTION

Figure 1:
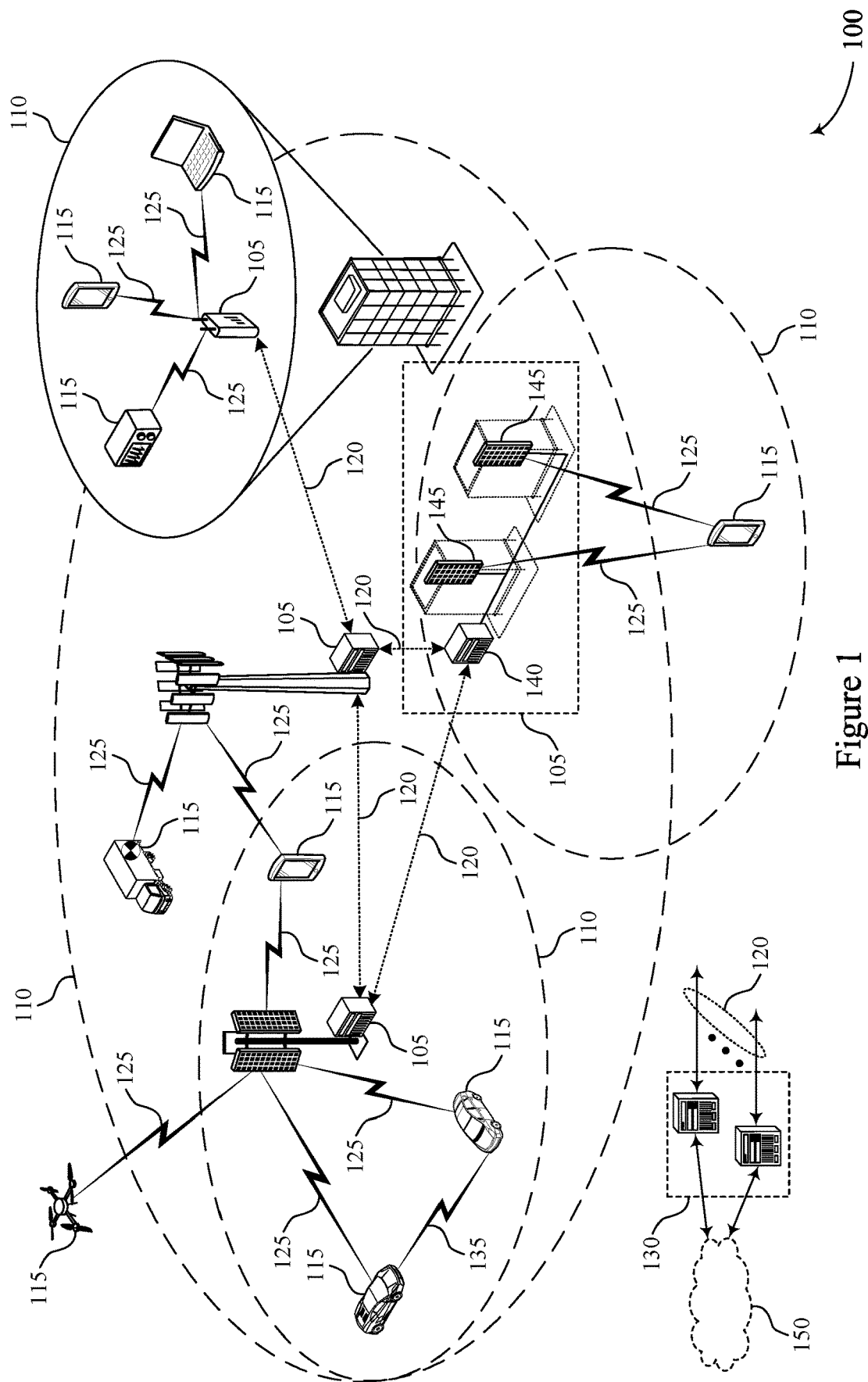
FIG. 1 illustrates an example of a wireless communications system that supports physical shared channel reference signal bundling in accordance with aspects of the present disclosure.

Various aspects generally relate to DMRS signaling, for example, using DMRS bundling, and more specifically, to determining whether to maintain DMRS bundling based on a DMRS bundling configuration and received DCI. For example, a base station may transmit an indication of a DMRS bundling configuration to a UE, and the UE may transmit a DMRS bundling capability indication to the base station. The base station may transmit DCI to the UE, and the UE may determine whether to maintain or alter DMRS bundling (for example, maintain or alter one or more coherence properties) for one or more physical shared channels based on the DCI. The UE may maintain or alter one or more coherence properties of the one or more physical shared channels based on determining whether to maintain DMRS bundling and may transmit the one or more physical shared channels and associated DMRSs to the base station.

A user equipment (UE) may bundle multiple references signals, such as demodulation reference signals (DMRSs), for example, in a time domain by coherently transmitting the DMRSs in one or more transmission time intervals (TTIs) or by coherently transmitting the DMRS in one or more slots. In some implementations, the bundling may include transmitting a same set of DMRSs or transmitting a different set of DMRSs to a base station in multiple TTIs or multiple slots. The base station may perform channel estimation based on jointly processing the DMRSs from the slots or TTIs over which the DMRSs are bundled. For example, the base station may receive multiple DMRSs from a UE or one or more UEs and may improve a channel estimate based on jointly processing the multiple bundled DMRSs. In another example, the base station may, using one or more components, combine the signals from multiple bundled DMRSs and estimate the channel from the combined signal. These channel estimation techniques may improve one or more of decoding, or demodulation of any physical shared channels associated with the bundled DMRSs. Such DMRS bundling may reduce transmission delays and reduce overhead, as well as improve channel estimation (for example, for physical uplink shared channel (PUSCH) decoding).

The UE may bundle DMRSs associated with a physical shared channel that is related to multiple slots or TTIs (for example, to increase reliability) or DMRSs associated with one or more physical shared channels carrying different transport blocks (TBs) (for example, to increase throughput). The UE may maintain one or more coherence properties across the DMRSs to bundle the DMRSs. In some examples, the UE may maintain a coherence property such as phase continuity across the bundled DMRSs. In some implementations, the phase continuity may include one or more of a precoder phase continuity (for example, precoding each of the DMRS using a same precoder matrix) or a frequency carrier phase continuity. Phase continuity may be based on one or more parameters such as a transmit power, a transmit waveform, a time resource allocation, or a frequency resource allocation, among other examples. The UE may additionally, or alternatively, maintain one or more other coherence properties to transmit the bundled DMRSs to the base station.

In some examples, the base station may indicate that the UE is to perform DMRS bundling on one or more physical shared channels (for example, one or more PUSCHs) by transmitting an indication of a DMRS bundling configuration, or a DMRS bundling configuration itself, to the UE. The base station may explicitly or implicitly signal the indication of the DMRS bundling configuration or the DMRS bundling configuration itself to the UE. A DMRS configuration may, in some examples, include a quantity of symbols for the DMRS bundling (for example, a number of symbols for which DMRS bundling should be performed), as well as one or more of a start symbol or an end symbol for the DMRS bundling, among other examples. The DMRS configuration may additionally or alternatively include one or more priorities for DMRS bundling scenarios. For example, the DMRS configuration may include one or more priorities for determining whether to bundle DMRSs in specific transmit power configurations, component carrier (CC) configurations, or downlink control information (DCI) configurations, among other examples.

The UE may receive the indication of the DMRS bundling configuration, or the DMRS bundling configuration itself, from the base station, and may transmit a capability indication to the base station that may indicate a capability of the UE at least for supporting DMRS bundling. The base station may transmit DCI to the UE to configure the UE for uplink or downlink transmissions. The UE may receive the DCI and may determine whether to perform or maintain DMRS bundling (for example, maintain a phase continuity, a frequency carrier continuity, or a precoder continuity) for the one or more physical shared channels based on one or more priorities of the DMRS bundling configuration, information included in the DCI, or both. For example, the UE may determine to maintain or to alter one or more parameters associated with the phase continuity, the precoder continuity, or other coherence property associated with transmitting a physical shared channel in one or more symbols, including symbols carrying DMRSs (for example, coherent transmission of DMRSs across multiple slots).

The UE may transmit an uplink transmission to the base station based on determining whether to maintain or alter DMRS bundling. In some examples, the uplink transmission may include the one or more physical shared channels and associated DMRSs. The UE may, in some examples, bundle the DMRSs or may not bundle the DMRSs (for example, maintain or alter a phase continuity, a frequency carrier continuity, or a precoder continuity based on one or more coherence properties) based on determining whether to maintain DMRS bundling.

Aspects of the disclosure are initially described in the context of wireless communications systems. Aspects of the disclosure are further illustrated by and described with reference to power control configurations, resource priority configurations, physical shared channel priority configurations, a process flow, apparatus diagrams, system diagrams, and flowcharts that relate to physical shared channel reference signal bundling.

FIG. 1 illustrates an example of a wireless communications system 100 that supports physical shared channel reference signal bundling in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, or network equipment (for example, core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (for example, via an S1, N2, N3, or other interface). Base stations 105 may communicate with one another over backhaul links 120 (for example, via an X2, Xn, or other interface) either directly (for example, directly between base stations 105), or indirectly (for example, via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, in which the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, meters, among other examples.

The UEs 115 described herein may be able to communicate with various types of devices, such as other UEs 115 that may sometimes act as relays as well as base stations 105 and network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (for example, a bandwidth part (BWP)) that is operated according to physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink CCs and one or more uplink CCs according to a carrier aggregation configuration. Carrier aggregation may be used with both frequency division duplexing (FDD) and time division duplexing (TDD) CCs.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, in which the symbol period and subcarrier spacing are inversely related. The quantity of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

Time intervals for base stations 105 or UEs 115 may be expressed in multiples of a basic time unit which may, for example, refer to a sampling period of $T_s=1/(\Delta f_{max} \cdot N_f)$ seconds, in which $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a quantity of slots. Alternatively, each frame may include a variable quantity of slots, and the quantity of slots may depend on subcarrier spacing. Each slot may include a quantity of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a TTI. In some examples, the TTI duration (for example, the quantity of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (for example, a control resource set (CORESET)) for a physical control channel may be defined by a quantity of symbol periods and may extend across the system bandwidth or a subset of the system bandwidth of the carrier. One or more control regions (for example, CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a quantity of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, an Intranets, an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a quantity of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, because the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with CCs operating in a licensed band (for example, LAA). Operations in unlicensed spectrum may include downlink transmissions, uplink transmissions, P2P transmissions, or D2D transmissions, among other examples.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a quantity of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), in which multiple spatial layers are transmitted to the same receiving device, and multiple-user MIMO (MU-MIMO), in which multiple spatial layers are transmitted to multiple devices.

Beamforming, which may also be referred to as spatial filtering, directional transmission, or directional reception, is a signal processing technique that may be used at a transmitting device or a receiving device (for example, a base station 105 or a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the medium access control (MAC) layer in poor radio conditions (for example, low signal-to-noise conditions). In some examples, a device may support same-slot HARQ feedback, in which the device may provide HARQ feedback in a specific slot for data received in a previous symbol in the slot. In other cases, the device may provide HARQ feedback in a subsequent slot, or according to some other time interval.

Wireless communications systems, such as wireless communications system 100, operated by different network operating entities (such as network operators) may share spectrum. In some implementations, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, some resources (such as time) may be partitioned and allocated to the different network operating entities for some types of communication.

For example, a network operating entity may be allocated some time resources reserved for exclusive communication by the network operating entity using the entirety of the shared spectrum. The network operating entity may also be allocated other time resources in which the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a defined arbitration scheme, or dynamically determined based on interactions between wireless nodes of the network operators.

In some implementations, the UE 115 and the base station 105 of the wireless communications system 100 may operate in a shared radio frequency spectrum band, which may include licensed or unlicensed (for example, contention-based) frequency spectrum. In an unlicensed frequency portion of the shared radio frequency spectrum band, UEs 115 or base stations 105 may perform a medium-sensing procedure to contend for access to the frequency spectrum. For example, the UE 115 or the base station 105 may perform a listen before talk (LBT) procedure such as a clear channel assessment (CCA) prior to communicating, in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a bandwidth and exceeds a determined noise floor may indicate another wireless transmitter. A CCA also may include detection of specific sequences that indicate use of the channel. For example, another device may transmit a specific preamble prior to transmitting a data sequence. In some implementations, an LBT procedure may include a wireless node adjusting its own backoff window based on the amount of energy detected on a channel or the acknowledge/negative-acknowledge (ACK/NACK) feedback, or both, for its own transmitted packets as a proxy for collisions.

Use of a medium-sensing procedure to contend for access to an unlicensed shared spectrum may result in communication inefficiencies. This may be particularly evident when multiple network operating entities (for example, network operators) are attempting to access a shared resource. In the wireless communications system 100, base stations 105 and UEs 115 may be operated by the same or different network operating entities. In some examples, an individual base station 105 or an individual UE 115 may be operated by more than one network operating entity. In other examples, each base station 105 and UE 115 may be operated by a single network operating entity. In some examples, requiring each base station 105 and UE 115 of different network operating entities to contend for shared resources may result in increased signaling overhead and communication latency.

In some examples, the wireless communications system 100 may implement a coordinated resource partitioning, which may include a superframe representing a fixed duration of time (for example, 20 ms). The superframe may be repeated for a given communication session and may be used by a wireless system such as the wireless communications system 100. The superframe may be divided into intervals such as an acquisition interval (A-INT) and an arbitration interval. As described in more detail below, the A-INT and arbitration interval may be subdivided into sub-intervals, designated for some resource types, and allocated to different network operating entities to facilitate coordinated communications between the different network operating entities. For example, the arbitration interval may be divided into multiple sub-intervals. Also, the superframe may be further divided into a multiple subframes with a fixed duration (for example, 1 ms). While the examples herein describe three different network operating entities (for example, Operator A, Operator B, Operator C), the number of network operating entities using the superframe for coordinated communications may be greater than or fewer than the number described herein.

The A-INT may be a dedicated interval of the superframe that is reserved for exclusive communications by the network operating entities. In some examples, each network operating entity may be allocated some resources within the A-INT for exclusive communications. For example, first reserved resources may be reserved for exclusive communications by Operator A, such as through a first base station 105, second reserved resources may be reserved for exclusive communications by Operator B, such as through a second base station 105, and third reserved resources may be reserved for exclusive communications by Operator C, such as through a third base station 105. Because the first reserved resources are reserved for exclusive communications by Operator A, neither Operator B nor Operator C may communicate during the first reserved resources (for example, overlapping in time with the first reserved resources), even if Operator A determines not to communicate during those resources. That is, access to exclusive resources is limited to the designated network operator. Similar restrictions apply to the second reserved resources for Operator B and the third reserved resources for Operator C. The wireless nodes of Operator A (for example, the UEs 115 or the base stations 105) may communicate any information desired using the first reserved resources, such as control information or data.

When communicating over an exclusive resource, a network operating entity does not need to perform any medium sensing procedures (for example, LBT or CCA) because the network operating entity may determine that the resources are reserved. Because the designated network operating entity may communicate over exclusive resources, there may be a reduced likelihood of interfering communications as compared to relying on medium sensing techniques alone (for example, no hidden node problem). In some examples, the A-INT may transmit control information, such as synchronization signals, system information (for example, system information blocks (SIBs)), paging information (for example, physical broadcast channel (PBCH) messages), or random access information (for example, random access channel (RACH) signals). In some examples, all of the wireless nodes associated with a network operating entity may transmit at the same time using their exclusive resources.

In some examples, resources may be classified as prioritized for some network operating entities. Resources that are assigned with priority for a network operating entity may be referred to as a guaranteed interval (G-INT) for that network operating entity. The interval of resources used by the network operating entity during the G-INT may be referred to as a prioritized sub-interval. For example, first prioritized resources may be prioritized for use by Operator A and may therefore be referred to as a G-INT for Operator A (for example, G-INT-OpA). Similarly, second prioritized resources may be prioritized for Operator B, (for example, G-INT-OpB), third prioritized resources (for example, G-INT-OpC) may be prioritized for Operator C, fourth prioritized resources may be prioritized for Operator A, fifth prioritized resources may be prioritized for Operator B, and sixth prioritized resources may be prioritized for Operator C.

The various G-INT resources may all be on a same frequency bandwidth. Thus, if viewed along a time-frequency grid, the G-INT resources may appear as a contiguous line within a superframe. This partitioning of data may be an example of time division multiplexing (TDM). Also, when resources appear in the same sub-interval (for example, first resources and the second prioritized resources may share a same sub-interval), these resources represent the same time resources with respect to the superframe (for example, the resources occupy the same sub-interval), but the resources are separately designated to illustrate that the same time resources can be classified differently for different operators.

When resources are assigned with priority for a network operating entity (for example, a G-INT), that network operating entity may communicate using those resources without having to wait or perform any medium sensing procedures (for example, LBT or CCA). For example, the wireless nodes of Operator A are free to communicate any data or control information during first prioritized resources without interference from the wireless nodes of Operator B or Operator C.

A network operating entity may additionally signal to another operator that the network operating entity intends to use a particular G-INT. For example, referring to the first prioritized resources, Operator A may signal to Operator B and Operator C that Operator A intends to use the first prioritized resources. Such signaling may be referred to as an activity indication. Moreover, because Operator A has priority over the first prioritized resources, Operator A may be considered as a higher priority operator than both Operator B and Operator C. However, as discussed above, Operator A does may not send signaling to the other network operating entities to ensure interference-free transmission during the first prioritized resources because the first prioritized resources are assigned with priority to Operator A.

Similarly, a network operating entity may signal to another network operating entity that the network operating entity intends not to use a particular G-INT. This signaling may also be referred to as an activity indication. For example, referring to the second prioritized resources, Operator B may signal to Operator A and Operator C that Operator B intends not to use the second prioritized resources for communication, even though the resources are assigned with priority to Operator B. With reference to the second prioritized resources, Operator B may be considered a higher priority network operating entity than Operator A and Operator C. In such cases, Operators A and C may attempt to use resources of the sub-interval associated with the second prioritized resources on an opportunistic basis. Thus, from the perspective of Operator A, the sub-interval that contains the second prioritized resources may be considered an opportunistic interval (O-INT) for Operator A (for example, O-INT-OpA). For illustrative purposes, the first resources may represent the O-INT for Operator A. Also, from the perspective of Operator C, the same sub-interval may represent an O-INT for Operator C with corresponding second resources. The first resources, the second prioritized resources, and the second resources all represent the same time resources (for example, a particular sub-interval), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use the second prioritized resources (for example, G-INT-OpB), then Operator A may use those same resources (for example, represented by the first resources) by first checking the channel for interference (for example, LBT) and then transmitting data if the channel was determined to be clear. Similarly, if Operator C wanted to access resources on an opportunistic basis during the sub-interval (for example, use an O-INT represented by the second resources) in response to an indication that Operator B was not going to use its G-INT (for example, the second prioritized resources), Operator C may perform a medium sensing procedure and access the resources if available. In some implementations, two operators (for example, Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during a sub-interval when Operator B is not using the second prioritized resources (for example, G-INT-OpB). It is noted that in another sub-interval Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described herein.

In some examples, access to a G-INT or O-INT may be preceded by a reservation signal (for example, request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In some implementations, one or more sub-intervals may include resources that are neither reserved for exclusive use nor reserved for prioritized use (for example, unassigned resources). Such unassigned resources may be considered an O-INT for any network operating entity, and may be accessed on an opportunistic basis as described herein.

In some examples, each subframe may contain 14 symbols (for example, 250-μs for 60 kHz tone spacing). These subframes may be standalone, self-contained Interval-Cs (ITCs) or the subframes may be a part of a long ITC. An ITC may be a self-contained transmission starting with a downlink transmission and ending with an uplink transmission. In some implementations, an ITC may contain one or more subframes operating contiguously upon medium occupation. In some implementations, there may be a maximum of eight network operators in an A-INT (for example, with duration of 2 ms) assuming a 250-μs transmission opportunity.

Although three operators are described in the examples given herein, it should be understood that fewer or more network operating entities may be configured to operate in a coordinated manner as described herein. In some implementations, the location of the G-INT, O-INT, or A-INT within a superframe for each operator is determined autonomously based on the number of network operating entities active in a system. For example, if there is only one network operating entity, each sub-interval may be occupied by a G-INT for that single network operating entity, or the sub-intervals may alternate between G-INTs for that network operating entity and O-INTs to allow other network operating entities to enter. If there are two network operating entities, the sub-intervals may alternate between G-INTs for the first network operating entity and G-INTs for the second network operating entity. If there are three network operating entities, the G-INT and O-INTs for each network operating entity may be designed as described herein. If there are four network operating entities, the first four sub-intervals may include consecutive G-INTs for the four network operating entities and the remaining two sub-intervals may contain O-INTs. Similarly, if there are five network operating entities, the first five sub-intervals may contain consecutive G-INTs for the five network operating entities and the remaining sub-interval may contain an O-INT. If there are six network operating entities, all six sub-intervals may include consecutive G-INTs for each network operating entity. It should be understood that these examples are for illustrative purposes only and that other autonomously determined interval allocations may be used.

It should be understood that the coordination framework described herein describes one possible example, although other examples are possible. For example, the duration of a superframe may be more or less than 20 ms. Also, the number, duration, and location of sub-intervals and subframes may differ from the configuration illustrated. Also, the types of resource designations (for example, exclusive, prioritized, unassigned) may differ or include more or less sub-designations.

Some wireless communications systems may implement one or more techniques to increase one or more of a link budget or coverage of UEs 115 and base stations 105 of the wireless communications system. For example, a wireless communications system may employ π/2 binary phase-shift keying (BPSK) modulation for uplink signaling (for example, PUSCH or physical uplink control channel (PUCCH) signaling) to provide more link budget for UEs 115 due to a lower peak to average power ratio (PAPR). A wireless communications system may additionally or alternatively employ full power uplink transmissions for UE uplink transmissions configured over two or more transmission ports. A UE 115 may additionally or alternatively bundle DMRSs for example, in a time domain by transmitting (for example, coherently transmitting) the DMRSs in multiple TTIs or by transmitting (for example, coherently transmitting) the DMRSs in multiple slots.

In some implementations, one of the initial processing steps that may be performed by the base station 105 upon receiving data transmitted on a PUSCH, or other shared channel, may be demodulation of the PUSCH that contains the transmitted data. In order to demodulate the PUSCH, the base station 105 may estimate the channel properties associated with the PUSCH used to transmit the data. In some examples, a base station 105 may estimate channel properties by processing a DMRS transmitted along with the data that is transmitted on the PUSCH. That is, through processing of the DMRS, the base station 105 may be able to estimate the channel properties of the PUSCH that was used to transmit data and that is associated with the processed DMRS. Thus, according to some aspects of the disclosure, the DMRS may enable coherent demodulation of the PUSCH at the base station 105. In some examples, a base station 105 may not be able to demodulate a PUSCH when the base station 105 is unable to properly detect and process the DMRS associated with the PUSCH. Accordingly, a DMRS may support a base station 105 in reception and subsequent processing of data transmitted on the PUSCH.

In some implementations, bundling DMRSs may include transmitting multiple, redundant versions of a same set of DMRSs to the base station 105 in multiple TTIs. The UE 115 may, in some implementations, maintain a coherence property such as a phase continuity or a precoder continuity across the bundled DMRSs. In some examples, a base station 105 may indicate that a UE 115 is to perform DMRS bundling on one or more physical shared channels (for example, one or more PUSCHs) by transmitting a DMRS bundling configuration (or an indication thereof) to the UE 115. The UE 115 may receive or identify the DMRS bundling configuration and may transmit a capability indication to the base station 105, indicating the capability of the UE 115 for supporting DMRS bundling.

The base station 105 may transmit DCI to the UE 115 to configure the UE 115 for uplink or downlink transmissions. The UE 115 may receive the DCI and may determine whether to perform or maintain DMRS bundling (for example, maintain a phase continuity or precoder continuity) for the one or more physical shared channels based on one or more priorities of the DMRS bundling configuration and information included in the DCI. For example, the UE 115 may determine to maintain or to alter one or more parameters associated with the phase continuity or other coherence property associated with transmitting a physical shared channel in one or more symbols, including symbols carrying DMRSs (for example, coherent transmission of DMRSs across multiple slots). The UE 115 may transmit an uplink transmission to the base station 105 based on the determination of whether to maintain or alter DMRS bundling. In some examples, the uplink transmission may include the one or more physical shared channels and one or more associated DMRSs. The base station 105 may receive the DMRSs from the UE 115 and may improve a channel estimate by jointly processing the multiple bundled DMRSs. In another example, the base station 105 may, using one or more components, combine the signals from multiple bundled DMRSs and estimate the channel from the combined signal. These channel estimation techniques may improve one or more of decoding or demodulation of any physical shared channels associated with the bundled DMRSs. Such DMRS bundling may reduce transmission delays and reduce overhead, as well as improve channel estimation.

In some examples, DMRS bundling may be achieved by using the same precoding matrix to code or map multiple DMRSs transmitted consecutively. A precoding matrix may define how data may be coded or mapped to physical resources, such as antennas, for transmission over a wireless communication channel. Because a DMRS may provide information to a base station 105 regarding how to demodulate an associated PUSCH containing data, a DMRS and its associated PUSCH, such as a DMRS-PUSCH pair, may be coded using the same precoding matrix. In some examples, different precoding matrices may be used for different DMRS-PUSCH pairs.

According to some implementations, a same precoding matrix may be used for multiple consecutive transmissions of DMRS-PUSCH pairs to achieve phase continuity across the multiple consecutively transmitted DMRSs. In some aspects of the disclosure, when there exists phase continuity across multiple consecutive DMRSs, a base station 105 may more easily estimate a channel. In other words, maintaining phase continuity across multiple consecutive DMRSs may improve channel estimation performed by a base station 105. In addition, maintaining phase continuity across multiple consecutive DMRSs may also improve detection and processing by a base station 105 of a DMRS. As a result of the improvement achieved by a base station 105 in channel estimation and DMRS detection or processing by maintaining phase continuity across multiple consecutive DMRSs, the overall reliability and coverage of wireless communication may be improved.

Figure 2:
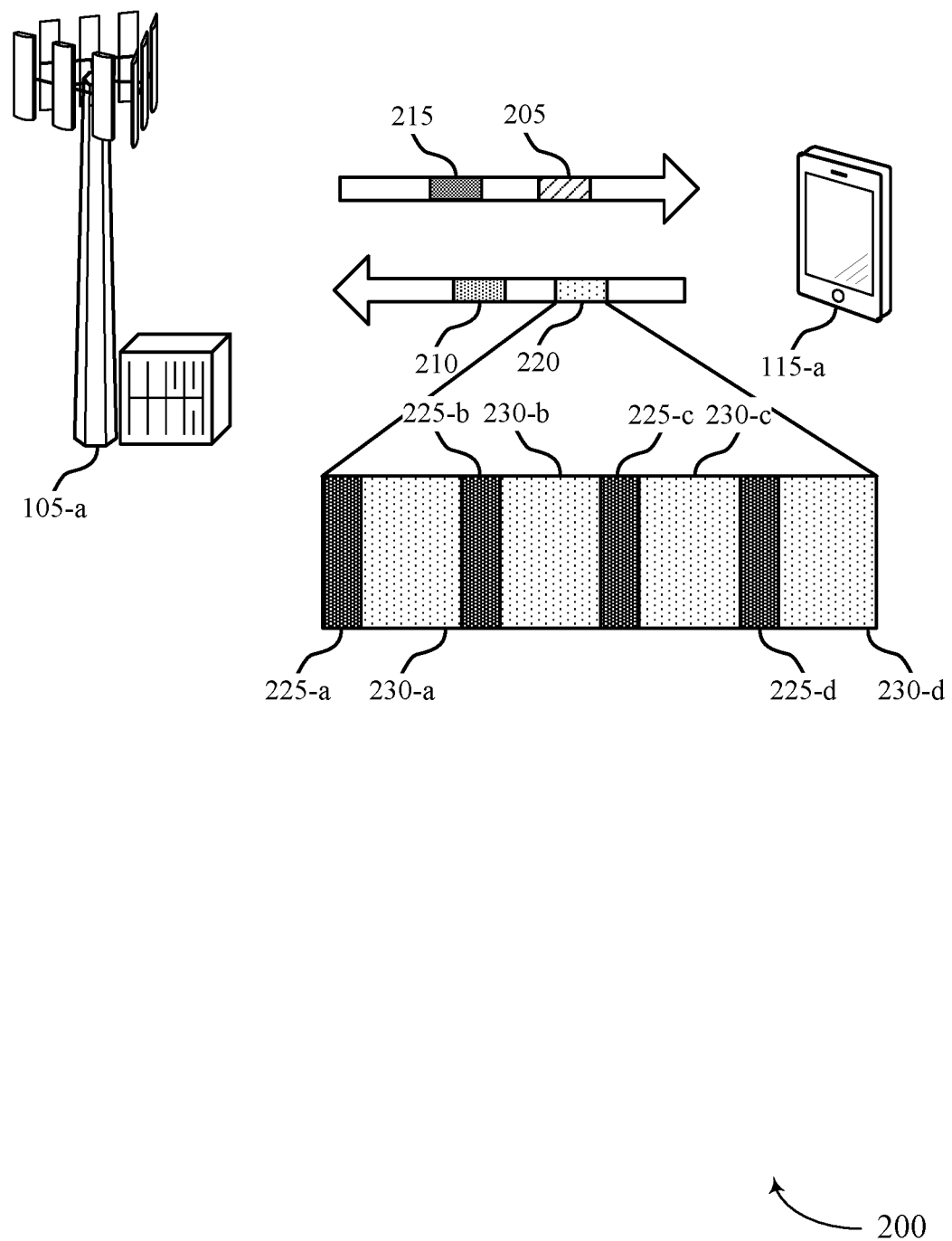
FIG. 2 illustrates an example of a wireless communications system that supports physical shared channel reference signal bundling in accordance with aspects of the present disclosure.

FIG. 2 illustrates an example of a wireless communications system 200 that supports physical shared channel reference signal bundling in accordance with aspects of the present disclosure. In some examples, wireless communications system 200 may implement aspects of wireless communications system 100 and may include a base station 105-a and a UE 115-a, which may be examples of a base station 105 and a UE 115 described with reference to FIG. 1. The base station 105-a may configure the UE 115-a to communicate over one or more physical shared channels (for example, over one or more PUSCHs) using a bundling configuration for associated reference signals, such as DMRSs 225 (for example DMRSs 225-a, 225-b, 225-c, and 225-d).

The UE 115-a may bundle multiple DMRSs 225, for example, in a time domain by transmitting DMRSs 225 in multiple TTIs. In some implementations, this may include transmitting multiple, redundant versions of a same set of DMRSs 225 in multiple TTIs. The base station 105-a may send an acknowledgement (ACK) to the UE 115-a after successfully decoding the DMRSs 225, in which the ACK may be based on using one or more redundant versions for demodulation or channel estimation. For example, the base station 105-a may receive multiple DMRSs 225 from a UE 115 or one or more UEs 115 (such as UE 115-a) and may improve a channel estimate by jointly processing the multiple bundled DMRSs 225. In another example, the base station 105-a may, using one or more components, combine the signals from multiple bundled DMRSs 225 and estimate the channel from the combined signal. These channel estimation techniques may improve one or more of decoding or demodulation of any physical shared channels associated with the bundled DMRSs 225. Such DMRS bundling may reduce transmission delays and reduce control plane overhead, for example, at the MAC layer, as well as improve channel estimation (for example, for PUSCH decoding).

The base station 105-a may configure the UE 115-a (for example, via radio resource control (RRC) signaling or DCI, among other examples) to bundle the DMRSs 225 of a physical shared channel 230 (for example, a physical shared channel 230 including one or more physical shared channel segments 230-a, 230-b, 230-c, or 230-d) to increase one or more of a coverage of the base station 105-a or a link budget of the UE 115-a. The UE 115-a may also independently determine (for example, without being configured by the base station 105-a) to bundle DMRSs 225 of a physical shared channel 230. For example, the UE 115-a may independently determine to bundle DMRSs 225 of the physical shared channel 230 based on determining one or more of a link budget, one or more network conditions, a transmission latency, a transmission reliability, or a location of the base station 105-a, among other examples. In some examples, the base station 105-a may configure DMRS bundling for the UE 115-a in combination with one or more other physical shared channel techniques to increase coverage, such as π/2 BPSK modulation or full power uplink. In some examples, the base station 105-a may configure DMRS bundling for the UE 115-a without (for example, independent of) the one or more other physical shared channel techniques. DMRS bundling, with or without other physical shared channel techniques, may increase coverage provided by base stations 105, such as the base station 105-a, such that a network may avoid employing or installing a greater quantity of the base stations 105 and thereby reduce costs.

The UE 115-a may bundle the DMRSs 225 associated with a physical shared channel 230 that is repeated over multiple slots or TTIs (for example, to increase reliability), or may bundle the DMRSs 225 associated with one or more physical shared channels 230 carrying different TBs (for example, to increase throughput). The UE 115-a may maintain one or more coherence properties across the bundled DMRSs 225 to bundle the DMRSs 225. In some examples, the UE 115-a may maintain a coherence property such as phase continuity or precoder continuity across the bundled DMRSs 225. In some implementations, the phase continuity may include one or more of a precoder phase continuity or a frequency carrier phase continuity. Phase continuity may be based on parameters such as a transmit power, a transmit waveform, a time resource allocation, or a frequency resource allocation, among other examples. For example, a non-contiguous time resource allocation having a timing gap between physical shared channel symbols larger than a given threshold may affect a phase continuity of the physical shared channel symbols, including symbols carrying the DMRSs 225. In some examples, the timing gap between physical shared channel symbols may affect the phase continuity of the physical shared channel symbols because other uplink or downlink signals may be transmitted over the timing gap. The UE 115-a may, in some implementations, maintain one or more of a phase continuity or other coherence properties to transmit the bundled DMRSs 225 to the base station 105-a.

The base station 105-a may indicate that the UE 115-a is to perform DMRS bundling on a physical shared channel 230 (for example, a PUSCH) by transmitting an indication of a DMRS bundling configuration 205, or the DMRS bundling configuration 205 itself, to UE 115-a. For example, this information may indicate to the UE 115-a which DMRS bundling configuration 205, if any, should be implemented. The base station 105-a may explicitly signal the indication or the DMRS bundling configuration 205 itself to the UE 115-a via RRC signaling or via a DCI transmission, or may implicitly indicate the DMRS bundling configuration 205 to the UE 115-a. The base station 105-a may implicitly indicate the DMRS bundling configuration 205 to the UE 115-a (for example, by signaling a parameter) based on one or more of a configured modulation and coding scheme (MCS), a timing gap between physical shared channel symbols, or a quantity of physical shared channel repetitions, among other examples.

In some implementations, the indication may include information that indicates for the UE 115-a to access information received, stored, or otherwise accessible to the UE 115-a that would indicate one or more DMRS bundling configurations 205 to be used. For example, the indication may indicate which of multiple DMRS bundling configurations 205 the UE 115-a is to use (such as from options previously received by the UE 115-a or a list or other table stored or accessible to the UE 115-a). In some implementations, this indication may include a DMRS bundling configuration 205 itself.

A DMRS bundling configuration 205 may include a quantity of symbols for the DMRS bundling (for example, a number of symbols for which DMRS bundling should be performed), as well as one or more of a start symbol or an end symbol for the DMRS bundling. The DMRS bundling configuration 205 may additionally include one or more priorities for DMRS bundling scenarios. For example, the DMRS bundling configuration 205 may include one or more priorities for determining whether to bundle DMRSs 225 in specific transmit power configurations, CC configurations, or DCI configurations, among other examples.

In some implementations, the base station 105-a may transmit an indication to bundle DMRSs 225 by transmitting multiple DMRSs 225 using a same precoding matrix. In some implementations, the indication to transmit multiple DMRSs 225 using a same precoding matrix may be received as part of received DCI (for example, DCI transmitted from base station 105-a). For example, during downlink communication base station 105-a may transmit, and the UE 115-a may receive, DCI. DCI may be transmitted by base station 105-a and received by the UE 115-a over a physical downlink control channel (PDCCH). In some implementations, a bit (such as an uplink-DMRS-bundling-indicating bit) within the DCI may operate as a new data indicator (NDI) bit.

According to some aspects of the disclosure, the DCI may include a bit that provides an indication as to whether or not UE 115-a should perform uplink DMRS bundling. For example, an uplink DMRS bundling bit within the DCI may indicate whether or not uplink DMRS bundling is enabled or disabled. In one example, the uplink DMRS bundling bit may indicate that uplink DMRS bundling is disabled, such that uplink DMRS bundling may not be performed by UE 115-a when the uplink DMRS bundling bit within the DCI is toggled across multiple consecutive transmissions of DCI. In other words, the uplink DMRS bundling bit within the DCI may indicate that uplink DMRS bundling is disabled when the bit has a different value than the uplink DMRS bundling bit within a most recently received DCI.

In some implementations, the uplink DMRS bundling bit may indicate that uplink DMRS bundling is enabled, such that uplink DMRS bundling may be performed by UE 115-a, when the uplink DMRS bundling bit within the DCI is not toggled across multiple consecutive transmissions of DCI. In other words, the uplink DMRS bundling bit within the currently-received DCI may indicate that uplink DMRS bundling is enabled when the bit has a same value as the uplink DMRS bundling bit within a most recently received DCI.

In another example, the indication to transmit multiple DMRSs 225 using a same precoding matrix may be received implicitly through determination that a power control parameter or a precoding matrix, or both, for use in transmitting multiple consecutive DMRSs 225 are the same. In particular, at least two parameters utilized by the UE 115-a to transmit a DMRS 225 and its associated physical shared channel 230 (for example, PUSCH) may include a power control parameter and a precoding matrix.

The power control parameter may be used by a UE 115-a to set the transmit power level to use for transmitting the DMRS 225 and its associated physical shared channel 230. The UE 115-a may compare a current value of a transmit power parameter that indicates the transmit power to use for an immediately upcoming transmission of a DMRS 225 and physical shared channel 230 to an immediately previous value of the transmit power parameter that indicated the transmit power used for the most recent transmission of a DMRS 225 and physical shared channel 230. The UE 115-a may determine that uplink DMRS bundling is disabled, such that uplink DMRS bundling may not be performed by the UE 115-a, when the current value of the transmit power parameter is different than the immediately previous value of the transmit power parameter.

The UE 115-a may determine that uplink DMRS bundling is enabled, such that uplink DMRS bundling may be performed by the UE 115-a, when the current value of the transmit power parameter is the same as the immediately previous value of the transmit power parameter. Similarly, the UE 115-a may compare a current precoding matrix to be used for an immediately upcoming transmission of a DMRS 225 and physical shared channel 230 to an immediately previous precoding matrix used for the most recent transmission of a DMRS 225 and physical shared channel 230. In an aspect of the disclosure, the UE 115-a may determine that uplink DMRS bundling is disabled, such that uplink DMRS bundling may not be performed by the UE 115-a, when the current precoding matrix is different than the immediately previous precoding matrix. In another aspect of the disclosure, the UE 115-a may determine that uplink DMRS bundling is enabled, such that uplink DMRS bundling may be performed by the UE 115-a, when the current precoding matrix is the same as the immediately previous precoding matrix.

In one aspect of the disclosure, the implicit indication may be used in wireless communication systems that use a configured grant (CG) PUSCH. In another aspect of the disclosure, the implicit indication may be used in wireless communication systems that use a dynamic grant (DG) PUSCH.

The UE 115-*a* may receive the DMRS bundling configuration 205, or the indication thereof, from the base station 105-*a* and may transmit a capability indication 210 to the base station 105-*a* indicating a capability of the UE 115-*a* for supporting DMRS bundling. For example, the UE 115-*a* may indicate a supported timing gap between physical shared channel symbols, among other examples. In some examples, the capability indication 210 may be included in a UE capability report transmitted to the base station 105-*a*. The capability indication 210 may provide information indicating one or more capabilities of the UE 115-*a* to support DMRS bundling configuration 205, or may otherwise indicate to the base station 105-*a* the capabilities of the UE 115-*a* to be able to support, or not support, one or more aspects of DMRS bundling. For example, the capability indication may include an indication of one or more timing gaps for uplink transmissions, one or more MCSs, or one or more transmission repetition structures, among other examples, supported by the UE 115-*a*.

The base station 105-*a* may transmit DCI 215 to the UE 115-*a* to configure the UE 115-*a* for uplink or downlink transmissions. The DCI 215 may include a transmit power control (TPC) command or an uplink transmission scheduling indication, among other examples. The UE 115-*a* may receive the DCI 215 and may determine whether to maintain DMRS bundling (for example, maintain a phase continuity or precoder continuity) for one or more of the physical shared channels 230 based on one or more priorities of the DMRS bundling configuration 205 and information included in the DCI 215. For example, the UE 115-*a* may determine to maintain or to alter one or more parameters associated with a phase continuity or one or more other coherence properties associated with transmitting a physical shared channel 230 in one or more symbols, including symbols carrying DMRSs 225 (for example, coherent transmission of DMRSs 225 across multiple slots). Examples of information included in the DCI 215 and priorities included in the DMRS bundling configuration 205 are further described with reference to FIGS. 3-5.

The UE 115-*a* may transmit an uplink transmission 220 to the base station 105-*a* based on the determination of whether to maintain or alter DMRS bundling. In some examples, the uplink transmission may include the physical shared channel 230 and one or more DMRSs 225. The UE 115-*a* may transmit the DMRSs 225 over the physical shared channel 230 such that the DMRSs 225 may occupy various time and frequency resources (for example, one or more of various subcarriers or symbols) over the physical shared channel 230. The UE 115-*a* may bundle the DMRSs 225 or may not bundle the DMRSs 225 (for example, maintain or alter one or more phase continuity or other coherence properties) based on determining whether to maintain DMRS bundling.

For example the UE 115-*a* may transmit DMRS 225 in a number (N) of consecutive transmission slots, in which a same precoding matrix may be associated with each of the DMRS 225 in the N consecutively transmitted slots. Maintaining phase continuity across multiple DMRSs 225 transmitted consecutively on the uplink may be referred to as uplink DMRS bundling, and using the same precoding matrix to code or map physical resources to multiple DMRSs 225 transmitted consecutively may be referred to a DMRS bundling. For example, associating a same precoding matrix with each of N consecutively transmitted DMRSs 225 may be referred to as uplink DMRS bundling. Such uplink DMRS bundling may be performed to maintain phase continuity across multiple DMRSs 225 transmitted consecutively on the uplink.

Figure 3A:
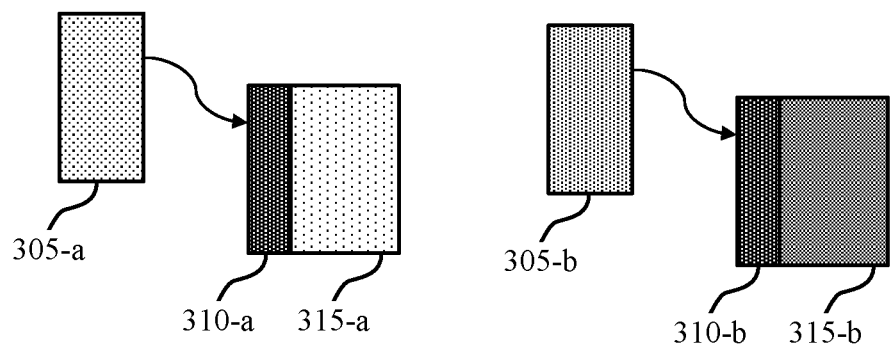
FIGS. 3A and 3B illustrate examples of power control configurations that support physical shared channel reference signal bundling in accordance with aspects of the present disclosure.
Figure 3B:
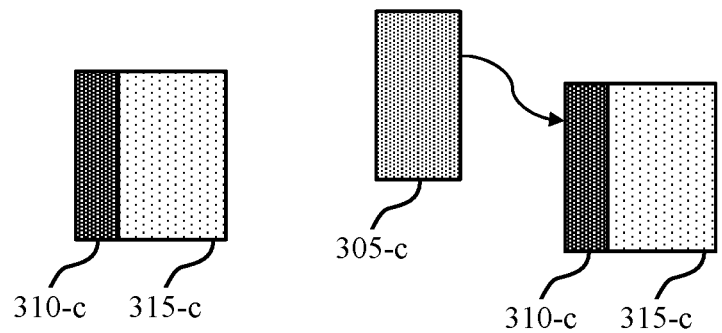

FIGS. 3A and 3B illustrate examples of power control configurations 301 and 302 that support physical shared channel reference signal bundling in accordance with aspects of the present disclosure. In some examples, the power control configurations 301 and 302 may be implemented by, or related to, aspects of wireless communications systems 100 or 200. One or more of a base station or a UE, such as the base station 105 and the UE 115 described with reference to FIGS. 1 and 2, may implement power control configurations 301 or 302.

As described with reference to FIG. 2, the base station 105 may configure the UE 115 to communicate over one or more physical shared channels (for example, over a PUSCH) using a bundling configuration for associated DMRSs. The DMRS bundling configuration may include one or more priorities that may apply to one or more scenarios encountered as part of DMRS bundling, as illustrated by power control configurations 301 and 302. In some implementations, the UE 115 may apply the priority processes described with reference to power control configurations 301 or 302 independently of or concurrently with processes described with reference to FIGS. 4-5.

The base station 105 may transmit DCI 305 to the UE 115 that includes a TPC command for a PUSCH 315, which may include DMRSs 310. In some examples, the DCI 305 may be a scheduling DCI 305, such as DCI 305-*a* or 305-*b* (for example, that may be transmitted to a specific UE 115), or a group common (GC) DCI 305-*c* (for example, that may be transmitted to multiple UEs 115). In some examples, scheduling DCIs 305-*a* and 305-*b* may be associated with PUSCHs 315 that carry different TBs, such as PUSCHs 315-*a* and 315-*b*. In some examples, GC DCI 305-*c* may be associated with a PUSCH 315-*c* that may be repeated in multiple TTIs. The TPC command included in the DCI 305 may indicate a change (for example, an increase or a decrease) in transmit power for the one or more associated PUSCHs 315. A change in transmit power may, in some examples, affect one or more of a phase continuity or other coherence properties of DMRSs 310. As such, the UE 115 may determine to maintain or alter one or more parameters associated with one or more of the phase continuity or other coherence properties based on the DCI 305. Additionally or alternatively, the UE 115 may determine to maintain or alter the parameters based on priority information associated with the DMRS bundling configuration.

In a first example, the UE 115 may determine to apply the TPC command to the symbols of the indicated PUSCH 315. In doing so, the UE 115 may alter one or more of the phase continuity or other coherence properties such that the UE 115 does not maintain phase continuity or other coherence properties associated with transmitting the PUSCH 315 in one or more symbols, including symbols carrying the DMRSs 310 (for example, coherent transmission of DMRSs across multiple slots). The UE 115 may apply the transmit power change and alter the one or more parameters after receiving the DCI 305, or after a determined amount of time after receiving the DCI 305. Accordingly, the UE 115 may avoid (not start) or cease (stop) bundling the DMRSs 310 at a given point in time.

In a second example, the UE 115 may ignore the TPC command and may maintain one or more of the phase continuity or other coherence properties. In such an example, the UE 115 may maintain the phase continuity or other coherence properties associated with transmitting the PUSCH 315 in one or more symbols, including symbols carrying the DMRSs 310 (for example, coherent transmission of DMRSs across multiple slots). As such, the UE 115 may continue bundling the DMRSs 310. In an example in which a GC DCI 305-*c* is received, the UE 115 may determine to ignore the TPC command until completing a bundling pattern (for example, until after bundling a set of repeated TTIs associated with the PUSCH 315-*c*). In some such implementations, the UE 115 may complete the bundling pattern and may apply the TPC command to symbols of the PUSCH 315-*c*, including symbols carrying the DMRSs 310-*c*.

In a third example, the UE 115 may determine to either ignore or apply the TPC command to the symbols of the PUSCH 315 based on a value of the transmit power change indicated in the TPC command. For example, the UE 115 may determine to apply the transmit power change if the value is below (for example is equal to or below) a given threshold, or may determine to not apply the transmit power change if the value satisfies (for example is equal to or above) the given threshold. As described above with reference to the first example and the second example, applying the transmit power change may include altering one or more of the phase continuity or other coherence properties associated with transmitting the PUSCH 315 in one or more symbols, including symbols carrying the DMRSs 310 (for example, coherent transmission of DMRSs across multiple slots). In some examples, the UE 115 may ignore the transmit power change and may maintain one or more of the phase continuity or other coherence properties associated with transmitting the PUSCH 315 in one or more symbols, including symbols carrying the DMRSs 310 (for example, coherent transmission of DMRSs across multiple slots).

In a fourth example, the UE 115 may determine to apply the TPC command to the symbols of the indicated PUSCH 315. The UE 115 may alter one or more of the phase continuity or other coherence properties such that the UE 115 does not maintain phase continuity or other coherence properties associated with transmitting the PUSCH 315 in one or more symbols, including symbols carrying the DMRSs 310 (for example, coherent transmission of DMRSs across multiple slots). The UE 115 may apply the transmit power change and alter one or more of the parameters for transmissions associated with at least some, if not every, symbol of the PUSCH 315 such that the UE 115 may not bundle any of the DMRSs 310 of the PUSCH 315.

The UE 115 may transmit an uplink transmission to the base station 105 in accordance with the determination of whether to maintain DMRS bundling. The uplink transmission may include a PUSCH 315 and one or more DMRSs 310. The UE 115 may transmit the DMRSs 310 over the PUSCH 315 such that the DMRSs 310 may occupy various time and frequency resources (for example, one or more of various subcarriers or symbols) over the PUSCH 315. The UE 115 may bundle the DMRSs 310 or may not bundle the DMRSs 310 (for example, maintain or alter one or more phase continuity or other coherence properties) based on determining whether to maintain DMRS bundling.

Figure 4A:
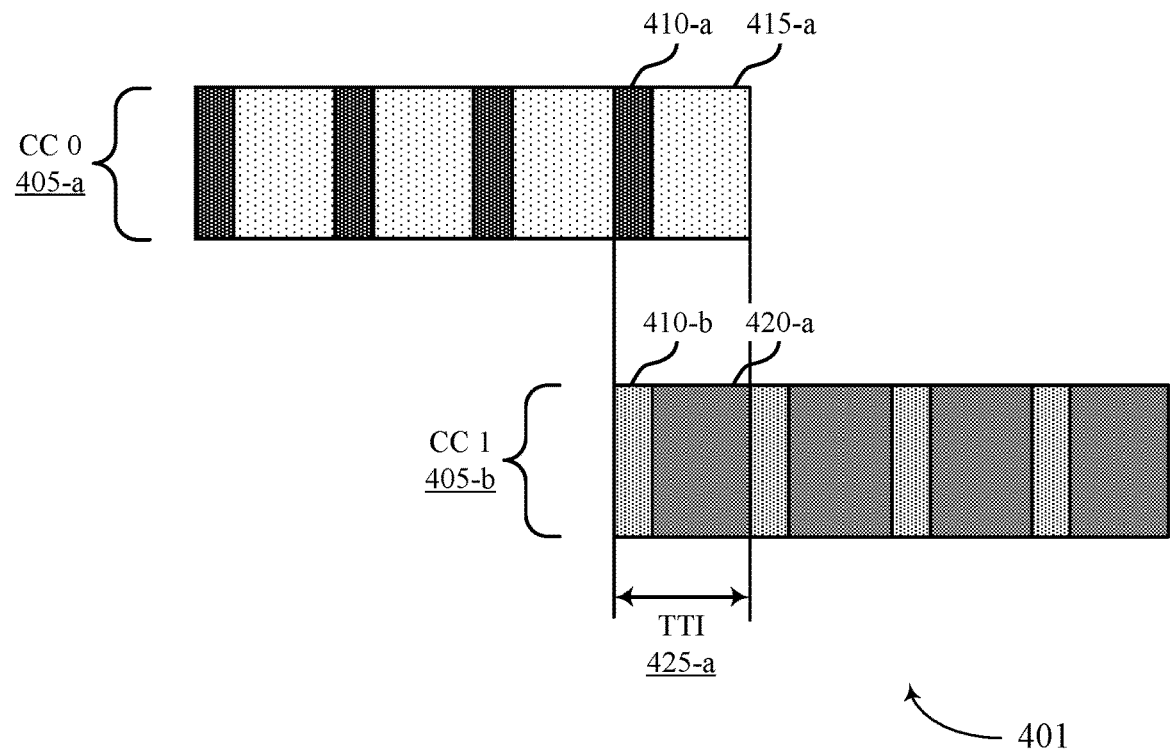
FIGS. 4A and 4B illustrate examples of resource priority configurations that support physical shared channel reference signal bundling in accordance with aspects of the present disclosure.
Figure 4B:
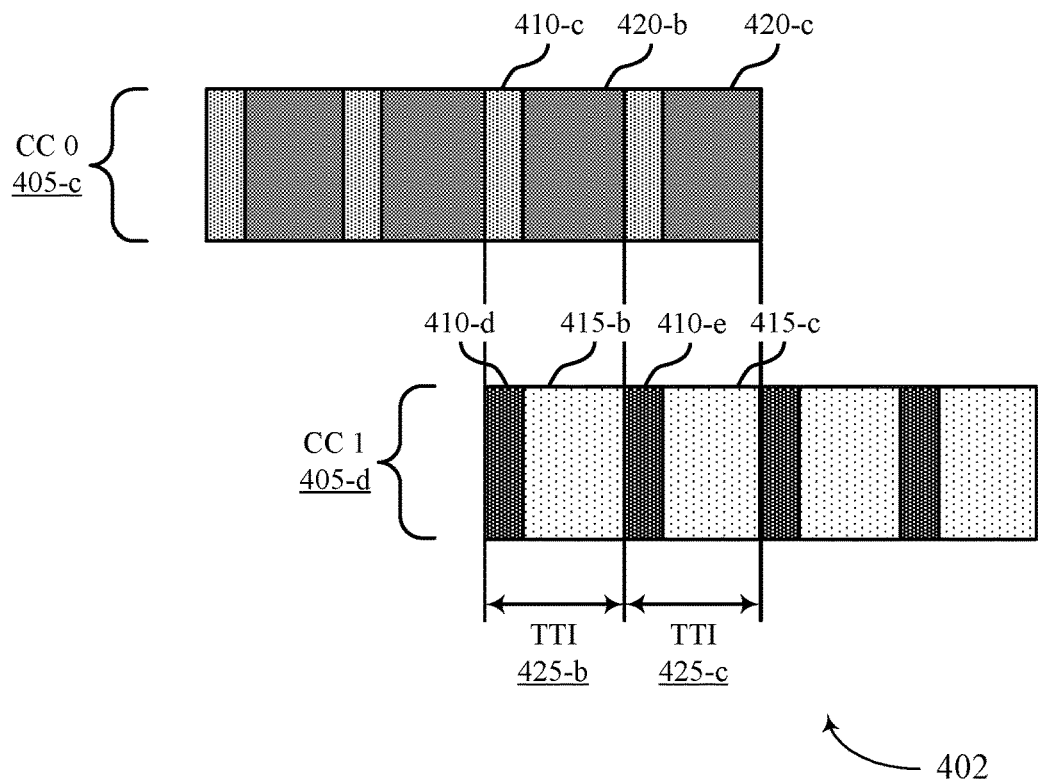

FIGS. 4A and 4B illustrate examples of resource priority configurations 401 and 402 that support physical shared channel reference signal bundling in accordance with aspects of the present disclosure. In some examples, the resource priority configurations 401 and 402 may be implemented by, or related to aspects of, wireless communications systems 100 or 200. One or more of a base station 105 or a UE 115, such as a base station 105 and a UE 115 described with reference to FIGS. 1-3, may implement resource priority configurations 401 or 402. As described with reference to FIG. 2, the base station 105 may configure the UE 115 to communicate over one or more physical shared channels (for example, over a PUSCH) using a bundling configuration for associated DMRSs. The DMRS bundling configuration may include one or more priorities that may apply to one or more scenarios encountered as part of DMRS bundling, as illustrated by resource priority configurations 401 or 402. The UE 115 may apply the priority processes described with reference to resource priority configurations 401 or 402 independently of, or concurrently with, processes described with reference to FIGS. 3 and 5.

The base station 105 may transmit DCI to the UE 115 that includes scheduling information for one or more of one or more uplink transmissions 420 or a PUSCH 415. An uplink transmission 420 may represent a PUSCH 415, a PUCCH, or any other uplink channel or signal. In some examples, one or more of the uplink transmissions 420 or PUSCH 415 may include DMRSs 410 and may be transmitted over CCs 405 as part of a carrier aggregation configuration. The scheduling information may schedule one or more of an uplink transmission 420 or a PUSCH 415 and may indicate that one or more of the PUSCH 415 and the uplink transmission 420 may overlap for one or more TTIs 425 (for example, TTI 425-*a* or TTIs 425-*b* and 425-*c*). In some examples, TTIs 425 may overlap at an end of a PUSCH 415, as illustrated in FIG. 4A, or at a beginning of a PUSCH 415, as illustrated in FIG. 4B. TTIs 425 may also overlap for one or more middle portions of a PUSCH 415, as illustrated with reference to TTI 425-*b* in FIG. 4B.

In some examples, the PUSCH 415 and the uplink transmission 420 may occupy contiguous CCs 405 in a same frequency band (for example, CCs 405-*a* and 405-*b* or CCs 405-*c* and 405-*d*). The CCs 405 may share a same power amplifier or transmit branch at the UE 115, such that overlapping uplink transmissions 420 may affect one or more of phase continuity or other coherence properties of DMRSs 410 on the PUSCH 415. As such, the UE 115 may determine to maintain or alter one or more parameters associated with one or more of the phase continuity or other coherence property based on one or more of the DCI or the priority information associated with the DMRS bundling configuration.

In a first example, the UE 115 may determine to alter one or more phase continuity or other coherence properties, such that the UE 115 does not maintain phase continuity or other coherence properties associated with transmitting the PUSCH 415 in one or more symbols, including symbols carrying the DMRSs 410 (for example, coherent transmission of DMRSs across multiple slots). The UE 115 may alter one or more of the parameters for at least some, if not every, symbol of the PUSCH 415, such that the UE 115 may not bundle any of the DMRSs 410 of the PUSCH 415, including symbols that do not overlap with the uplink transmission 420.

In a second example, the UE 115 may determine to alter one or more phase continuity or other coherence properties associated with transmitting the PUSCH 415 in one or more symbols that overlap with the uplink transmission 420 (for example, symbols included in the TTI 425-*a* or the TTIs 425-*b* and 425-*c*). The UE 115 may determine to maintain one or more of the phase continuity or other coherence properties associated with transmitting the PUSCH 415 in one or more symbols that do not overlap with the uplink transmission 420 (for example, symbols not included in the TTI 425-*a* or the TTIs 425-*b* and 425-*c*). As such, the UE 115 may bundle DMRSs 410 over the TTIs 425 of the PUSCH 415 that do not overlap with the uplink transmission 420 and may not bundle the DMRSs 410 over the TTIs 425 of the PUSCH 415 that overlap with the uplink transmission 420. In the example illustrated in FIG. 4A, the UE 115 may not bundle the DMRSs 410-a and may bundle at least some, if not all, of the other DMRSs associated with the PUSCH 415. In the example illustrated in FIG. 4B, the UE 115 may not bundle DMRSs 410-d and 410-e and may bundle at least some, if not all, of the other DMRSs associated with the PUSCH 415.

The UE 115 may transmit an uplink transmission to the base station 105 in accordance with the determination of whether to maintain DMRS bundling. The uplink transmission may include the PUSCH 415 and one or more DMRSs 410. The UE 115 may transmit DMRSs 410 over the PUSCH 415, such that the DMRSs 410 may occupy various time and frequency resources (for example, one or more of various subcarriers or symbols) over the PUSCH 415. The UE 115 may bundle the DMRSs 410 or may not bundle the DMRSs 410 (for example, maintain or alter one or more phase continuity or other coherence properties) based on the determination of whether to maintain DMRS bundling.

Figure 5A:
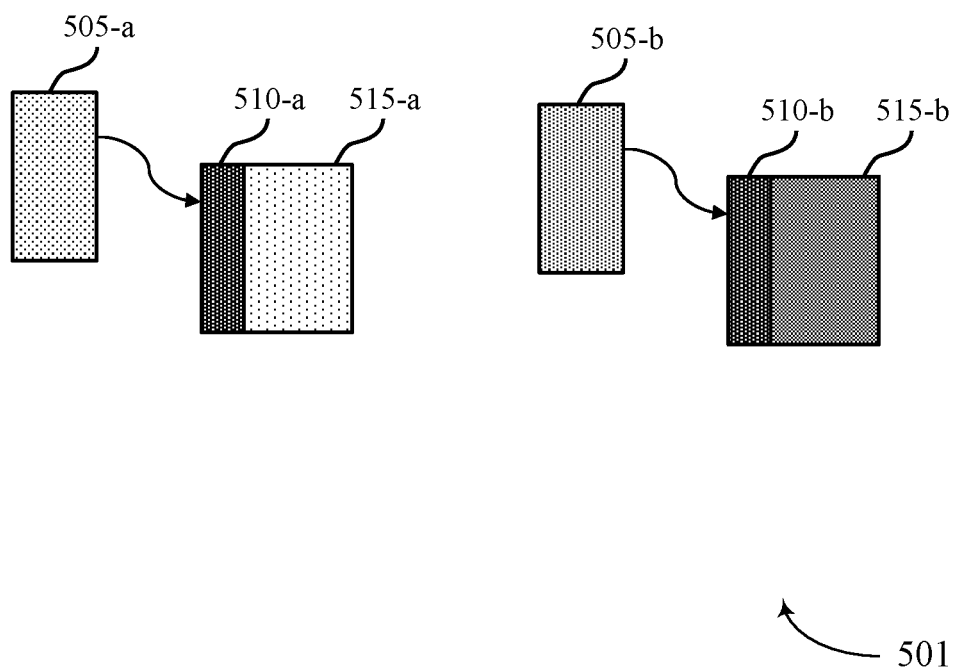
FIGS. 5A and 5B illustrate examples of physical shared channel priority configurations that support physical shared channel reference signal bundling in accordance with aspects of the present disclosure.
Figure 5B:
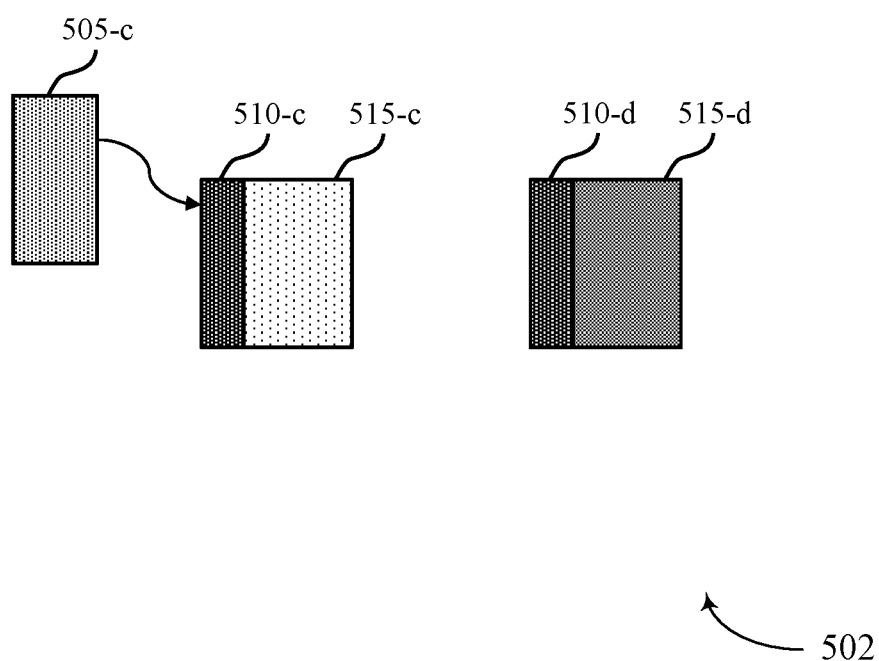

FIGS. 5A and 5B illustrate examples of physical shared channel priority configurations 501 and 502 that support physical shared channel reference signal bundling in accordance with aspects of the present disclosure. In some examples, the physical shared channel priority configurations 501 and 502 may be implemented by, or relate to, aspects of the wireless communications systems 100 or 200. One or more of a base station 105 or a UE 115, such as a base station 105 or a UE 115 described with reference to FIGS. 1-4, may implement physical shared channel priority configurations 501 or 502. As described with reference to FIG. 2, the base station 105 may configure the UE 115 to communicate over one or more physical shared channels (for example, over a PUSCH) using a bundling configuration for associated DMRSs. The DMRS bundling configuration may include one or more priorities that may apply to one or more scenarios encountered as part of DMRS bundling, as illustrated by physical shared channel priority configurations 501 and 502. The UE 115 may apply the priority processes described with reference to the physical shared channel priority configurations 501 and 502 independently of or concurrently with processes described with reference to FIGS. 3-4.

The base station 105 may transmit DCI 505 to the UE 115 that includes scheduling or other information for one or more PUSCHs 515 that may carry one or more DMRSs 510. In some examples, PUSCHs 515 on a same carrier frequency may be associated with different types of DCI 505. For example, DCI 505-a may be a first type of DCI and may correspond to PUSCH 515-a, while DCI 505-b may be a second type of DCI different than the first type of DCI and may correspond to PUSCH 515-b. Types of DCI 505 may include one or more of DCI format 0-0, DCI format 0-1, DCI with a CRC scrambled by a cell radio network temporary identifier (C-RNTI), or DCI with a CRC scrambled by a configured scheduling radio network temporary identifier (CS-RNTI), among other examples. In some examples, the UE 115 may transmit one or more PUSCHs 515 associated with different types of DCI 505 (for example, PUSCHs 515-a and 515-b) having a limited time gap associated with (for example, between) PUSCH transmissions. Such PUSCH transmissions may be referred to as back-to-back transmissions in some implementations.

The base station 105 may indicate to the UE 115 whether bundling of DMRSs 510 may be applied across PUSCHs 515 associated with different types of DCI 505 (for example, PUSCHs 515-a and 515-b). In some examples, the DMRS bundling configuration may include an indication of whether DMRS bundling may be applied across PUSCHs 515 associated with different types of DCI 505. The UE 115 may determine whether to maintain the DMRS bundling based on an indication from the base station 105, such as an indication of the DMRS bundling configuration or the DMRS bundling configuration itself, and the DCI types corresponding to PUSCHs 515-a and 515-b. The UE 115 may additionally or alternatively determine whether to maintain the DMRS bundling based on a link budget, one or more network conditions, a transmission latency, a transmission reliability, or a location of the base station 105, among other examples. The UE 115 may alter one or more phase continuity or other coherence properties associated with transmitting the PUSCH 515 in one or more symbols (for example, across multiple slots) if the UE 115 determines to not maintain DMRS bundling. Similarly, the UE 115 may maintain one or more phase continuity or other coherence properties associated with transmitting the PUSCH 515 in one or more symbols if the UE 115 determines to maintain DMRS bundling.

The UE 115 may transmit an uplink transmission to the base station 105 in accordance with determining whether to maintain DMRS bundling. The uplink transmission may include the one or more PUSCHs 515 and associated DMRSs 510 (for example, PUSCHs 515-a and 515-b, associated with DMRSs 510-a and 510-b, respectively). The UE 115 may transmit DMRSs 510 over the PUSCHs 515, such that the DMRSs 510 may occupy various time and frequency resources (for example, various subcarriers or symbols) over the PUSCHs 515.

In some examples, PUSCHs 515 on a same carrier frequency may be associated with one or more of DCI 505 or with configured grants. For example, DCI 505-c may be a scheduling DCI 505 or a GC DCI 505, and may correspond to PUSCH 515-c, while PUSCH 515-d may be associated with configured grants (for example, grants configured via RRC signaling). In some examples, the UE 115 may transmit PUSCHs 515-c and 515-d with a limited time gap between PUSCH transmissions. Such PUSCH transmissions may be referred to as back-to-back transmissions in some implementations.

The base station 105 may indicate to the UE 115 whether bundling of DMRSs 510 may be applied across PUSCHs 515 associated with DCI 505 and PUSCHs associated with configured grants (for example PUSCHs 515-c and 515-d). In some examples, the DMRS bundling configuration may include the indication of whether DMRS bundling may be applied across PUSCHs 515 associated with DCI 505 and PUSCHs associated with configured grants. The UE 115 may determine whether to maintain the DMRS bundling based on one or more of the DMRS bundling configuration or the configuration of PUSCHs 515-c and 515-d. The UE 115 may additionally or alternatively determine whether to maintain the DMRS bundling based on a link budget, one or more network conditions, a transmission latency, a transmission reliability, or a location of the base station 105, among other examples. The UE 115 may alter one or more phase continuity or other coherence properties associated with transmitting the PUSCH 515 in one or more symbols if the UE 115 determines to not maintain DMRS bundling. Similarly, the UE 115 may maintain one or more phase continuity or other coherence properties associated with transmitting the PUSCH 515 in one or more symbols if the UE 115 determines to maintain DMRS bundling.

The UE 115 may transmit an uplink transmission to the base station 105 in accordance with determining whether to maintain DMRS bundling, in which the uplink transmission may include the one or more PUSCHs 515 and associated DMRSs 510 (for example, PUSCHs 515-c and 515-d associated with DMRSs 510-c and 510-d, respectively). The UE 115 may transmit DMRSs 510 over the PUSCHs 515 such that the DMRSs 510 may occupy various time and frequency resources (for example, various subcarriers or symbols) over the PUSCHs 515.

Figure 6:
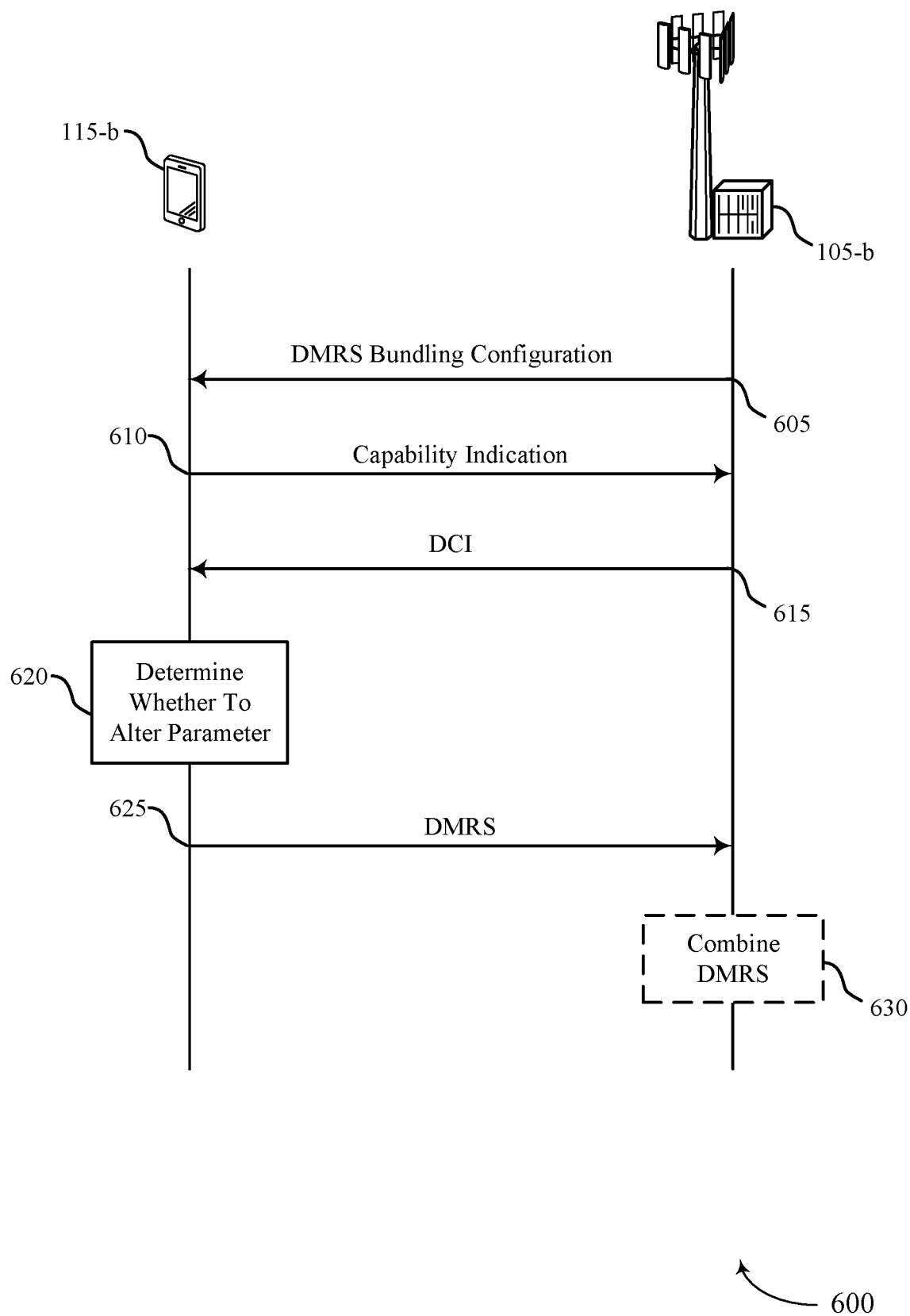
FIG. 6 illustrates an example of a process flow that supports physical shared channel reference signal bundling in accordance with aspects of the present disclosure.

FIG. 6 illustrates an example of a process flow 600 that supports physical shared channel reference signal bundling in accordance with aspects of the present disclosure. In some examples, process flow 600 may be implemented by, or relate to, aspects of wireless communications systems 100 or 200. Process flow 600 may also implement aspects of one or more of power control configurations 301 or 302, resource priority configurations 401 or 402, or physical shared channel priority configurations 501 or 502. Process flow 600 may be implemented by one or more of a base station 105-b or a UE 115-b, which may be examples of a base station 105 and a UE 115 described with reference to FIGS. 1-5. The base station 105-b may configure the UE 115-b to communicate over one or more physical shared channels (for example, over a PUSCH) using a bundling configuration for associated DMRSs. The UE 115-b may use the DMRS bundling configuration to determine whether to bundle DMRSs by maintaining phase continuity or one or more other coherence properties, or to not bundle DMRSs by altering the phase continuity or other coherence properties.

In the following description of the process flow 600, the operations between the UE 115-b and the base station 105-b may be transmitted in a different order than the order shown, or the operations performed by the base station 105-b or the UE 115-b may be performed in different orders or at different times. Specific operations may also be left out of the process flow 600, or other operations may be added to the process flow 600. Although the base station 105-b and the UE 115-b are shown performing the operations of process flow 600, some aspects of some operations may also be performed by another wireless device.

At 605, the base station 105-b may transmit, to the UE 115-b, an indication of a DMRS bundling configuration, or the DMRS bundling configuration itself, for one or more physical shared channels (for example, PUSCHs). The one or more physical shared channels may, in some implementations, repeat over multiple TTIs or may, in some implementations, each carry one or more different TBs. The DMRS bundling configuration may include one or more of a quantity of physical shared channel symbols to have a same parameter, a first symbol to have a same parameter, a last symbol to have a same parameter, or one or more priorities associated with DMRS bundling. The base station 105-b may transmit the DMRS bundling configuration via RRC signaling or via DCI. The base station 105-b may additionally or alternatively transmit an indication of the DMRS bundling configuration based on one or more of an MCS, a timing gap between the one or more physical shared channel symbols, a quantity of repetitions of the one or more physical shared channels.

At 610, the UE 115-b may transmit, to the base station 105-b and based on receiving the DMRS bundling configuration, an indication of a capability of the UE 115-b for DMRS bundling for the one or more physical shared channels (for example, PUSCHs). The indication of the UE capability for DMRS bundling may include a timing gap between the one or more physical shared channel symbols.

At 615, the base station 105-b may transmit, to the UE 115-b and based on receiving the indication of the UE capability, DCI, for example, in the form of scheduling DCI or GC DCI. In some examples, the base station 105-b may transmit, via the DCI, a TPC command including an indication of a change in transmit power corresponding to the one or more physical shared channels.

At 620, the UE 115-b may determine, based on the DCI, whether to alter a parameter associated with or more physical shared channel symbols associated with the one or more physical shared channels. In some examples, the parameter may include, or be associated with, a coherence property of the one or more physical shared channel symbols. The coherence property may include one or more of a phase continuity, a precoder phase continuity (for example, a precoder matrix continuity), a threshold timing gap, a frequency resource allocation, a transmit power, or a transmit waveform, associated with the one or more physical shared channel symbols, among other examples.

In a first example, UE 115-b may determine, based on receiving an indication of a change in transmit power, to alter the parameter of one or more of the physical shared channel symbols. In a second example, UE 115-b may determine, based on receiving an indication of a change in transmit power, to maintain the parameter as unchanged for one or more of the physical shared channel symbols. In some implementations, the UE 115-b may additionally determine, based on receiving the indication of the change in transmit power, to alter the parameter of another one or more of the physical shared channel symbols after a symbol associated with an end of a bundling pattern of the DMRS bundling configuration. In a third example, UE 115-b may determine, based on a TPC value associated with the TPC command, whether to, for one or more of the one or more physical shared channel symbols, alter the respective parameter or maintain the respective parameter as unchanged. In a fourth example, the UE 115-b may determine, based on receiving the indication of the change in transmit power, to alter a parameter of the one or more physical shared channel symbols.

In some examples, a first subset of the one or more physical shared channel symbols may be configured over a first CC and a second subset of one or more physical channel symbols may be configured over a second CC. The second subset of the one or more physical channel symbols may be associated with a same type of physical channel, a same type of signaling, a different type of physical channel, or a different type of signaling as the first subset of the one or more physical shared channel symbols.

The UE 115-b may determine that one or more physical shared channel symbols configured over the first CC overlap with one or more physical channel symbols configured over the second CC. The UE 115-b may determine, based on the overlapping, to alter a parameter of the one or more physical shared channel symbols. The UE 115-b may additionally or alternatively determine, based on the overlapping, to alter the parameter associated with the overlapping one or more physical shared channel symbols configured over the first CC and one or more physical shared channel symbols configured over the second CC. The UE 115-b may also determine, based on the overlapping to maintain the parameter as unchanged for non-overlapping symbols of one or more of the first subset of the one or more physical shared channel symbols or the second subset of one or more physical channel symbols.

The UE 115-b may additionally or alternatively identify that each of the one or more physical shared channels is associated with a different type of DCI. The different types of DCI may include two or more of DCI with a format 0-0, DCI with a format 0-1, DCI with a CRC scrambled by a C-RNTI, or DCI with a CRC scrambled by a CS-RNTI, among other examples. The UE 115-*b* may determine, based on the identifying and the DMRS bundling configuration, whether to alter the parameter for the one or more physical shared channel symbols. Similarly, the UE 115-*b* may identify that one or more of the physical shared channels is associated with DCI and that one or more of the physical shared channels is associated with configured transmission grants. The UE 115-*b* may determine, based on the identifying and the DMRS bundling configuration, whether to alter a parameter for one or more physical shared channel symbols associated with the one or more identified physical shared channels. The UE 115-*b* may, in some implementations, alter or maintain the parameter of one or more of the physical shared channel symbols based on determining to alter or maintain the parameter, respectively.

At 625, the UE 115-*b* may transmit, to the base station 105-*b* and based on determining whether to alter the parameter, one or more DMRSs associated with the one or more physical shared channel symbols.

At 630, the base station 105-*b* may combine the one or more DMRSs associated with the one or more physical shared channel symbols to perform a channel estimate for demodulation of the one or more physical shared channels. Combining the DMRSs may improve one or more of channel estimation, decoding, or demodulation of any physical channels associated with the one or more DMRSs (for example, bundled DMRSs). For example, the base station 105-*b* may receive multiple DMRSs from the UE 115-*b* and may improve a channel estimate by jointly processing the multiple bundled DMRSs. In another example, the base station 105-*b* may combine the signals using one or more components from multiple bundled DMRSs and estimate the channel from the combined signal.

The techniques described herein may enable DMRS bundling as a way to reduce transmission delays and reduce control plane overhead, for example, at the MAC layer, as well as improve channel estimation (for example, for PUSCH decoding). The techniques described herein may also enable DMRS bundling to increase coverage provided by base stations 105, such as the base station 105-*b*, such that a network may avoid employing or installing a higher quantity of the base stations 105 and may reduce costs.

Figure 7A:
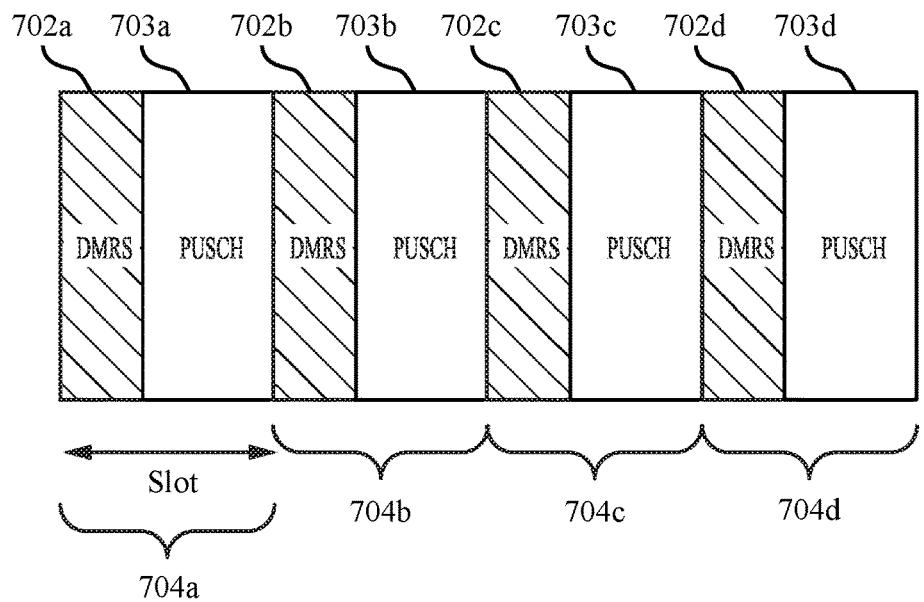
FIGS. 7A and 7B illustrate examples of reference signal bundling that support physical shared channel reference signal bundling in accordance with aspects of the present disclosure.

FIG. 7A illustrates an example of reference signal bundling that supports physical shared channel reference signal bundling in accordance with aspects of the present disclosure. For example, FIG. 7A illustrates uplink DMRS bundling in which a same DMRS-PUSCH pair 704 may be transmitted (for example, by a UE 115 or a mobile device) in four consecutive transmission slots using the same precoding matrix for each DMRS-PUSCH pair 704. Transmission of the same PUSCH 703 may be repeated such that the same PUSCH 703 may be transmitted N times, for example four times, resulting in four transmissions of a same PUSCH, such as the PUSCHs 703*a*, 703*b*, 703*c*, and 703*d*. Similarly, transmission of a same DMRS 702 may be repeated such that the same DMRS 702 is transmitted N times, for example four times, resulting in four transmissions of a same DMRS, such as the DMRSs 702*a*, 702*b*, 702*c*, and 702*d*. In FIG. 7A, a same precoding matrix may be used for the repeated transmissions of the DMRSs 702 and the PUSCHs 703 of the DMRS-PUSCH pairs 704. In the example illustrated in FIG. 7A, a DMRS bundle may refer to the four DMRSs 702*a* through 702*d* that are transmitted using the same precoding matrix.

Figure 7B:
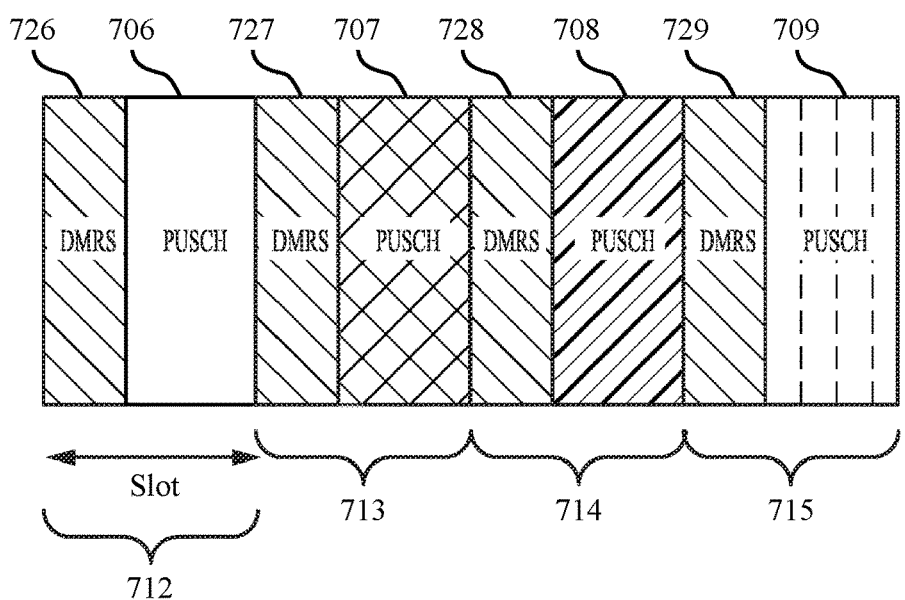

FIG. 7B illustrates an example of reference signal bundling that supports physical shared channel reference signal bundling in accordance with aspects of the present disclosure. For example, FIG. 7B illustrates uplink DMRS bundling in which different DMRS-PUSCH pairs 712 through 715 are transmitted (for example, by a UE 115 or a mobile device) in four consecutive transmission slots using the same precoding matrix. Each of the N, for example four, transmissions of a DMRS-PUSCH pair may include a different PUSCH, such as the PUSCHs 706 through 709. Similarly, each of the N, for example four, transmissions of a DMRS-PUSCH pair may include a different DMRS, such as the DMRSs 726 through 729. In FIG. 7B, the same precoding matrix may be used for transmission of each of the DMRS-PUSCH pairs 712 through 715 to maintain phase continuity across the four DMRSs 726 through 729 transmitted in consecutive transmission slots. In the example illustrated in FIG. 7B, a DMRS bundle may refer to the four DMRSs 726 through 729 that are transmitted using the same precoding matrix.

In both FIG. 7A and FIG. 7B, a transmit power for transmission of each of the DMRS-PUSCH pairs of FIG. 7A and FIG. 7B may be maintained constant to maintain phase continuity across the multiple DMRSs transmitted consecutively on the uplink in each of FIG. 7A and FIG. 7B. In some examples, performing uplink DMRS bundling (for example, maintaining phase continuity across the multiple DMRSs transmitted consecutively on the uplink) may include maintaining an approximately constant transmit power for transmission of the multiple consecutive DMRSs. In some examples, phase continuity may be lost when transmit power is changed between the consecutively transmitted DMRSs.

Figure 8:
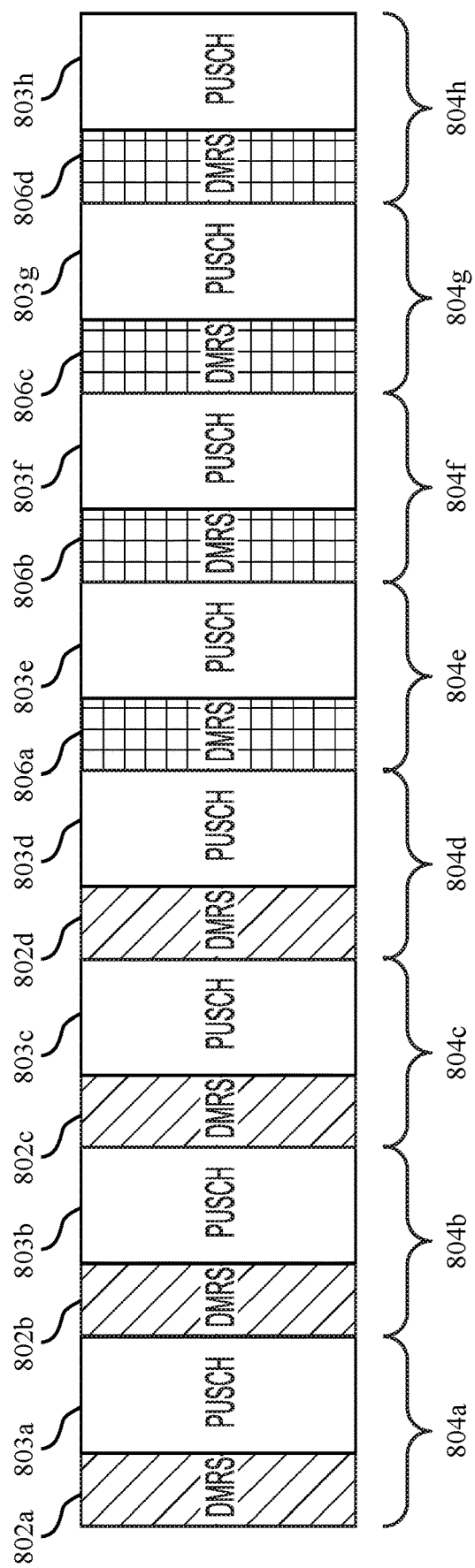
FIG. 8 illustrates an example of reference signal bundling that supports physical shared channel reference signal bundling in accordance with aspects of the present disclosure.

FIG. 8 illustrates an example of reference signal bundling that supports physical shared channel reference signal bundling in accordance with aspects of the present disclosure. For example, FIG. 8 illustrates uplink DMRS bundling in which a transmit power associated with each of the DMRS-PUSCH pairs 804 transmitted in consecutive transmission slots may not be maintained constant. In FIG. 8, transmission of the same PUSCH 803 may be repeated such that a same PUSCH 803 may be transmitted N times, for example eight times, resulting in eight transmissions of the same PUSCH, such as the PUSCHs 803*a* through 803*h*. Similarly, transmission of a same DMRS 802 may be repeated such that the same DMRS 802 may be transmitted N times, for example eight times, resulting in eight transmissions of the same DMRS, such as the DMRSs 802*a* through 802*d* and DMRSs 806*a* through 806*d*. In FIG. 8, a same precoding matrix may be used for the repeated transmissions of the DMRSs 802 and 806 and the PUSCHs 803 of the DMRS-PUSCH pairs 804. In some examples of the disclosure, FIG. 8 may be the result of a mobile device receiving, and a base station 105 transmitting, an indication to transmit eight DMRSs using the same precoding matrix. A mobile device may include or represent a UE 115 as described with reference to FIGS. 1-7.

One distinction between FIG. 7A and FIG. 8, among others, may be that in the example illustrated in FIG. 8, the transmit power utilized by the mobile device for transmitting the DMRS-PUSCH pairs may be maintained approximately constant for only a portion, for example four, of the N, for example eight, consecutively transmitted DMRSs. As described with reference to FIG. 7A and FIG. 7B, transmit power for transmission of each of the DMRS-PUSCH pairs of FIG. 7A and FIG. 7B may be maintained constant. FIG. 8 illustrates uplink DMRS bundling in which a transmit power associated with at least the portion, for example four, of the N, for example eight, consecutively transmitted DMRSs may be maintained constant. For example, in the example of the disclosure illustrated in FIG. 8, a first transmit power may be used to transmit the DMRSs 802a through 802d of the DMRS-PUSCH pairs 804a through 804d, while a second transmit power may be used to transmit the DMRSs 806a through 806d of the DMRS-PUSCH pairs 804e through 804h. Similarly, the first transmit power may also be used to transmit the PUSCHs 803a through 803d of the DMRS-PUSCH pairs 804a through 804d, while the second transmit power may also be used to transmit the PUSCHs 803e through 803h of the DMRS-PUSCH pairs 804e through 804h.

According to some examples of the disclosure, one result of the example illustrated in FIG. 8 may be that, although the same precoding matrix may be used for transmitting all eight of the DMRS-PUSCH pairs 804, phase continuity may not exist across all eight of the consecutively transmitted DMRS-PUSCH pairs 804. For example, phase continuity may be lost when transmit power is changed between the consecutively transmitted DMRSs. Thus, in some examples, phase continuity may exist across the DMRSs 802a through 802d that may each be transmitted using the same first transmit power and the same precoding matrix. Similarly, phase continuity may exist across the DMRSs 806a through 806d that may each be transmitted using the same second transmit power and the same precoding matrix. In some examples of the disclosure, phase continuity may not exist between a DMRS 802 transmitted using the first transmit power and a DMRS 806 transmitted using the second transmit power.

Thus, FIG. 8 may illustrate two sub-bundles of uplink DMRS-bundling phase continuity. In particular, a first DMRS bundle of phase continuity may refer to the four DMRSs 802a through 802d transmitted using the same precoding matrix and the same first transmit power. Similarly, a second DMRS bundle of phase continuity may refer to the four DMRSs 806a through 806d transmitted using the same precoding matrix and the same second transmit power.

Although FIG. 8 illustrates repeated transmission of the same DMRS-PUSCH pair 804, the disclosure may be not limited to such an example. For example, the multiple-transmit-power uplink DMRS bundling illustrated in FIG. 8 may also apply to uplink DMRS bundling performed when different DMRS-PUSCH pairs are transmitted in consecutive transmission slots, for example, as illustrated in the example of FIG. 7B, in which the first four of the eight different DMRS-PUSCH pairs may be transmitted using a first transmit power, while the next four of the eight different DMRS-PUSCH pairs may be transmitted using a second transmit power.

Figure 9:
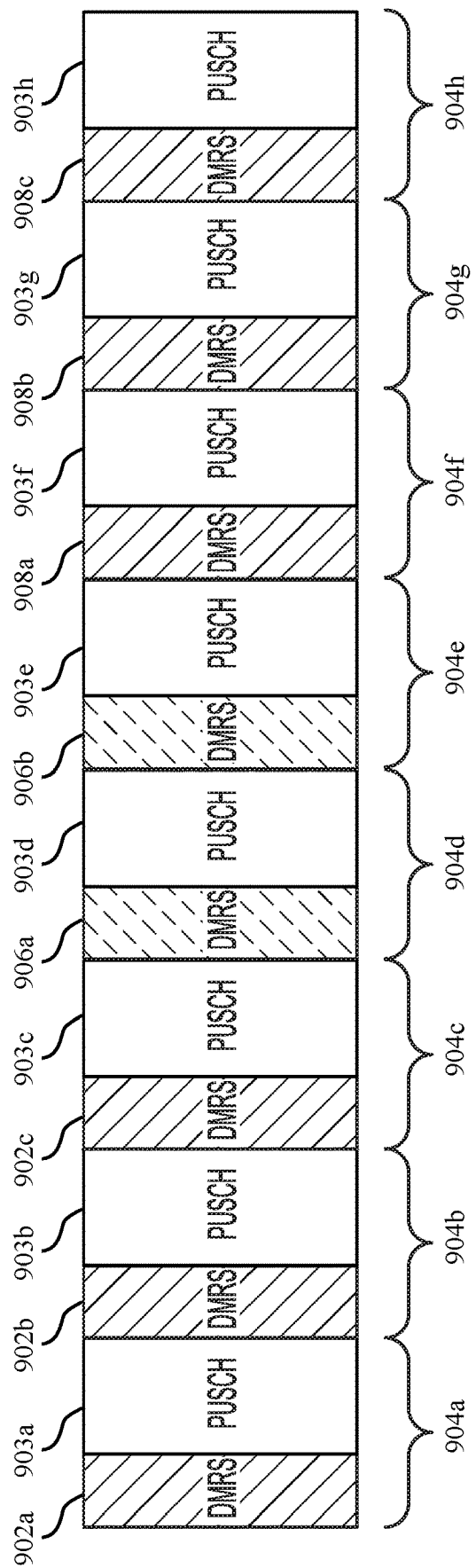
FIG. 9 illustrates an example of reference signal bundling that supports physical shared channel reference signal bundling in accordance with aspects of the present disclosure.

FIG. 9 illustrates an example of reference signal bundling that supports physical shared channel reference signal bundling in accordance with aspects of the present disclosure. For example, FIG. 9 illustrates uplink DMRS bundling in which a transmit power associated with each of DMRS-PUSCH pairs 904 transmitted in consecutive transmission slots may not be maintained constant. In FIG. 9, transmission of a same PUSCH 903 may be repeated such that the same PUSCH 903 may be transmitted N times, for example eight times, resulting in eight transmissions of the same PUSCH, such as the PUSCHs 903a through 903h. Similarly, transmission of a same DMRS 902 may be repeated such that the same DMRS 902 may be transmitted N times, for example eight times, resulting in eight transmissions of the same DMRS, such as the DMRSs 902a through 902c, 906a through 906b, and 908a through 908c. In FIG. 9, a same precoding matrix may be used for the repeated transmissions of the DMRSs 902, 906, and 908, as well as the PUSCHs 903, of the DMRS-PUSCH pairs 904. In some examples of the disclosure, FIG. 9 may be the result of a mobile device receiving, and a base station 105 transmitting, an indication to transmit the eight DMRSs using the same precoding matrix. A mobile device may include or represent a UE 115 as described with reference to FIGS. 1-8.

In FIG. 9, the transmit power utilized by the mobile device for transmitting the DMRS-PUSCH pairs may be different for different groups of the consecutively transmitted DMRSs. For example, FIG. 9 illustrates uplink DMRS bundling in which transmit power associated with different groups of the consecutively transmitted DMRSs may be different. In some examples, a first transmit power may be used to transmit the DMRSs 902a through 902c of the DMRS-PUSCH pairs 904a through 904c, a second transmit power may be used to transmit the DMRSs 906a through 906b of the DMRS-PUSCH pairs 904d through 904e, and a third transmit power may be used to transmit the DMRSs 908a through 908c of the DMRS-PUSCH pairs 904f through 904h. Similarly, the first transmit power may be also used to transmit the PUSCHs 903a through 903c of the DMRS-PUSCH pairs 904a through 904c, the second transmit power may be also used to transmit the PUSCHs 903d through 903e of the DMRS-PUSCH pairs 904d through 904e, and the third transmit power may be also used to transmit the PUSCHs 903f through 903h of the DMRS-PUSCH pairs 904f through 904h. In some examples, the third transmit power may be the same as the first transmit power. In some other examples, the third transmit power may be different than the first transmit power.

According to some examples of the disclosure, one result of the example illustrated in FIG. 9 may be that, although the same precoding matrix may be used for transmitting all eight of the DMRS-PUSCH pairs 904, phase continuity may not exist across all eight of the consecutively transmitted DMRS-PUSCH pairs 904. For example, as mentioned previously, phase continuity may be lost when transmit power is changed between the consecutively transmitted DMRSs. Thus, phase continuity may exist across the DMRSs 902a through 902c transmitted using the same first transmit power and the same precoding matrix. Similarly, phase continuity may exist across the DMRSs 906a through 906b transmitted using the same second transmit power and the same precoding matrix, and phase continuity may exist across the DMRSs 908a through 908c transmitted using the same third transmit power and the same precoding matrix. However, in some examples of the disclosure, phase continuity may not exist between a DMRS 902 transmitted using the first transmit power, a DMRS 906 transmitted using the second transmit power, a DMRS 908 transmitted using the third transmit power, or any combination thereof.

Thus, FIG. 9 may illustrate three sub-bundles of uplink DMRS-bundling phase continuity. For example, a first DMRS bundle of phase continuity may refer to the three DMRSs 902a through 902c transmitted using the same precoding matrix and the same first transmit power. Similarly, a second DMRS bundle of phase continuity may refer to the two DMRSs 906a through 906b that are transmitted using the same precoding matrix and the same second transmit power, and a third DMRS bundle of phase continuity may refer to the three DMRSs 908a through 908c that are transmitted using the same precoding matrix and the same third transmit power.

While FIG. 9 illustrates repeated transmission of the same DMRS-PUSCH pair 904, the disclosure may not be limited to such an example. For example, the multiple-transmit-power uplink DMRS bundling illustrated in FIG. 9 may also apply to uplink DMRS bundling performed when different DMRS-PUSCH pairs are transmitted in consecutive transmission slots, for example, as illustrated in the example of FIG. 7B, in which the first three of the eight different DMRS-PUSCH pairs may be transmitted using a first transmit power, the next two of the eight different DMRS-PUSCH pairs may be transmitted using a second transmit power, and the next three of the eight different DMRS-PUSCH pairs may be transmitted using a third transmit power.

In some examples, a mobile device may receive, and a base station 105 may transmit, an indication to adjust transmit power associated with one or more of the N DMRSs before all N of the DMRSs have been transmitted by the mobile device or received by the base station 105, or both. For example, after a mobile device has begun transmitting the DMRS-PUSCH pairs of an uplink DMRS bundle in which the same precoding matrix may be used for each of the DMRS-PUSCH pairs, but before all of the DMRS-PUSCH pairs having the same precoding matrix have been transmitted, the mobile device may receive, and the base station 105 may transmit, an indication to adjust transmit power associated with one or more of the DMRSs of the DMRS-PUSCH pairs of the uplink DMRS bundle that have not yet been transmitted. For example, a mobile device may schedule four DMRSs to be transmitted using the same precoding matrix, such as illustrated in FIG. 7A and FIG. 7B, and before all four of the DMRSs have been transmitted, for example before the DMRS 702c in FIG. 7A or the DMRS 728 in FIG. 7B has been transmitted, the mobile device may receive, and the base station 105 may transmit, an indication to adjust transmit power associated with the DMRSs that have not yet been transmitted, such as the DMRSs 702c through 702d in FIG. 7A or the DMRSs 728 through 729 in FIG. 7B. In some examples, a mobile device may schedule eight DMRSs to be transmitted using the same precoding matrix, such as illustrated in FIG. 8 or FIG. 9, and before all eight of the DMRSs have been transmitted, for example before the DMRS 806a in FIG. 8 has been transmitted, the mobile device may receive, and the base station 105 may transmit, an indication to adjust transmit power associated with the DMRSs that have not yet been transmitted, such as the DMRSs 806a through 806d in FIG. 8.

In some examples, the indication to adjust transmit power may be part of an indication received by the mobile device, and transmitted by the base station 105, indicating that uplink control information (UCI) is to be multiplexed with a PUSCH within an uplink DMRS-bundling bundle. For example, the indication may indicate that one or more of the PUSCHs 703c through 703d in FIG. 7A, 708 through 709 in FIG. 7B, 803e through 803h in FIG. 8, 903d through 903e in FIG. 9, or 903d through 903h in FIG. 9 are to be multiplexed with UCI. In some aspects of the disclosure, the UCI may include channel state information (CSI), HARQ feedback, or both. For example, an indication within the UCI that provides an indication to adjust transmit power may be represented by "deltaMCS." In some examples, the indication that the UCI is to be multiplexed with a PUSCH within an uplink DMRS-bundling bundle may itself be an indication to adjust transmit power.

In some examples, the indication to adjust transmit power may be a TPC command received by a mobile device, and transmitted by a base station 105. For example, the indication to adjust transmit power may be a group TPC command.

According to some aspects of the disclosure, in response to receiving the indication to adjust transmit power before transmitting all of the DMRSs using the same precoding matrix, the mobile device may maintain an approximately constant transmit power associated with one or more of the N DMRSs transmitted after reception of the indication to adjust the transmit power. For example, in response to receiving the indication to adjust transmit power before transmitting all of the DMRSs using the same precoding matrix, the mobile device may maintain an approximately constant transmit power associated with some of the DMRSs of an uplink DMRS bundle, which may be transmitted after reception of the indication to adjust transmit power. For example, before all four of the DMRSs illustrated in FIG. 7A or FIG. 7B have been transmitted, for example before the DMRS 702c in FIG. 7A or the DMRS 728 in FIG. 7B has been transmitted, the mobile device may receive, and the base station 105 may transmit, an indication to adjust transmit power associated with the DMRSs that have not yet been transmitted, such as the DMRSs 702c through 702d in FIG. 7A or the DMRSs 728 through 729 in FIG. 7B.

In response to receiving the indication to adjust the transmit power, the mobile device may maintain an approximately constant transmit power associated with the DMRSs transmitted after reception of the indication to adjust the transmit power, such as the DMRSs 702c through 702d in FIG. 7A or the DMRSs 728 through 729 in FIG. 7B. In some examples, the mobile device may use the same transmit power to transmit each of the DMRSs scheduled to be transmitted using the same precoding matrix, for example, the DMRSs of a scheduled uplink DMRS bundle, irrespective of the received indication to adjust transmit power, as illustrated in FIG. 7A or FIG. 7B, in which the same transmit power may be used for transmission of each of the DMRSs illustrated in FIG. 7A or FIG. 7B. Thus, a mobile device may ignore a received indication to adjust transmit power when the indication may be received during a duration in which uplink DMRS bundling has been scheduled, for example, during a duration in which DMRSs have been scheduled to be transmitted using the same precoding matrix or transmit power, or both.

In some implementations, when the indication to adjust transmit power may be part of an indication indicating that UCI is to be multiplexed with a PUSCH within an uplink DMRS-bundling bundle, for example, the PUSCHs 703c through 703d in FIG. 7A or 708 through 709 in FIG. 7B, the mobile device may ignore an associated "deltaMCS" transmit power adjustment parameter and may use the same transmit power to transmit each of the DMRSs of a scheduled uplink DMRS bundle irrespective of the received indication to adjust transmit power, as illustrated in FIG. 7A or FIG. 7B in which the same transmit power may be used for transmission of each of the DMRSs illustrated in FIG. 7A or FIG. 7B. In some examples, ignoring the received indication to adjust transmit power may include treating the indication as a disabled or absent indication.

In some examples, rather than ignoring the indication to adjust transmit power or multiplex the UCI with the PUSCH within an uplink DMRS-bundling bundle, or both, a mobile device may partially perform the indicated actions. For example, when the indication indicates that the UCI is to be multiplexed with a PUSCH within an uplink DMRS-bundling bundle, a mobile device may multiplex the PUSCH with a portion of the included UCI. In some implementations, when the UCI includes CSI and HARQ feedback, the mobile device may not multiplex the CSI with the PUSCH but may multiplex the HARQ feedback with the PUSCH, or vice versa.

When the indication to adjust transmit power is a TPC command, the mobile device may ignore the TPC command and use the same transmit power to transmit each of the DMRSs of a scheduled uplink DMRS bundle irrespective of the received indication to adjust transmit power. For example, in FIG. 7A or FIG. 7B, the same transmit power may be used for transmission of each of the DMRSs illustrated in FIG. 7A or FIG. 7B.

According to some examples of the disclosure, in response to receiving the indication to adjust transmit power before transmitting all of the DMRSs using the same precoding matrix, the mobile device may increase the transmit power associated with the DMRSs of the N DMRSs transmitted after reception of the indication to adjust transmit power. For example, in response to receiving the indication to adjust transmit power before transmitting all of the DMRSs using the same precoding matrix, the mobile device may increase transmit power associated with the DMRSs of an uplink DMRS bundle transmitted after reception of the indication to adjust transmit power. For example, before all eight of the DMRSs illustrated in FIG. 8 have been transmitted, for example before the DMRS 806a has been transmitted, the mobile device may receive, and the base station 105 may transmit, an indication to adjust transmit power associated with the DMRSs that have not yet been transmitted, such as the DMRSs 806a through 806d in FIG. 8.

In response to receiving the indication to adjust the transmit power, the mobile device may increase the transmit power associated with the DMRSs transmitted after reception of the indication to adjust transmit power, such as the DMRSs 806a through 806d in FIG. 8. In some examples of the disclosure, the mobile device may use different transmit powers to transmit different groups of the DMRSs scheduled to be transmitted using the same precoding matrix, for example, the DMRSs of a scheduled uplink DMRS bundle, such as in FIG. 8 in which a first transmit power may be used to transmit the DMRSs 802a through 802d of the DMRS-PUSCH pairs 804a through 804d, while a second transmit power may be used to transmit the DMRSs 806a through 806d of the DMRS-PUSCH pairs 804e through 804h. Similarly, the first transmit power may also be used to transmit the PUSCHs 803a through 803d of the DMRS-PUSCH pairs 804a through 804d, while the second transmit power may also be used to transmit the PUSCHs 803e through 803h of the DMRS-PUSCH pairs 804e through 804h.

In some examples, when the indication to adjust transmit power may be part of an indication indicating that UCI is to be multiplexed with a PUSCH within an uplink DMRS-bundling bundle, for example, the PUSCHs 803e through 803f in FIG. 8, the mobile device may increase the transmit power associated with the DMRSs transmitted after reception of the indication to adjust transmit power, such as for the DMRSs 806a through 806d in FIG. 8. This may include the DMRSs 806a through 806b associated with the PUSCHs 803e through 803f that were indicated to be multiplexed with UCI, as well as the subsequent DMRSs 806c through 806d associated with the subsequent PUSCHs 803g through 803h that were not indicated to be multiplexed with UCI but that were transmitted as part of the uplink DMRS bundle after reception of the indication to adjust transmit power.

Similarly, when the indication to adjust transmit power represents a TPC command indicating that some of the PUSCHs within an uplink DMRS-bundling bundle, for example, the PUSCHs 803e through 803f in FIG. 8, are to be transmitted with adjusted power levels, the mobile device may increase the transmit power associated with the DMRSs transmitted after reception of the indication to adjust transmit power, such as the DMRSs 806a through 806d in FIG. 8. This may include the DMRSs 806a through 806b associated with the PUSCHs 803e through 803f that were indicated as requiring transmission with adjusted power levels as well as the subsequent DMRSs 806c through 806d associated with the subsequent PUSCHs 803g through 803h that were not indicated as requiring transmission with adjusted power levels but that were transmitted as part of the uplink DMRS bundle after reception of the indication to adjust transmit power.

In some examples of the disclosure, in response to receiving the indication to adjust transmit power before transmitting all of the DMRSs using the same precoding matrix, the mobile device may increase the transmit power associated with at least a portion of the one or more of the N DMRSs transmitted after reception of the indication to adjust the transmit power. For example, in response to receiving the indication to adjust transmit power before transmitting all of the DMRSs using the same precoding matrix, the mobile device may increase transmit power associated with some of the DMRSs of an uplink DMRS bundle transmitted after reception of the indication to adjust transmit power. For example, before all eight of the DMRSs illustrated in FIG. 9 have been transmitted, for example before the DMRS 906a has been transmitted, the mobile device may receive, and the base station 105 may transmit, an indication to adjust transmit power associated with the DMRSs that have not yet been transmitted, such as the DMRSs 906a through 906b and 908a through 908c in FIG. 9. In response to receiving the indication to adjust transmit power, the mobile device may increase the transmit power associated with some of the DMRSs transmitted after reception of the indication to adjust transmit power, such as the DMRSs 906a through b in FIG. 9.

In some examples, although the DMRSs 908a through 908c may be scheduled for transmission after the indication to adjust transmit power has been received, the transmit power used for transmitting the DMRSs 908a through 908c may be the same as the transmit power used for transmitting the DMRSs 902a through 902c. For example, after the mobile device increases the transmit power to transmit the DMRSs 906a through 906b, the mobile device may reduce the transmit power the same amount the transmit power was increased so that the DMRSs 908a through 908c may be transmitted using the same first transmit power used to transmit the DMRSs 902a through 902c.

In some examples, the transmit power used to transmit the DMRSs 908a through 908c may be different than the first transmit power used to transmit the DMRSs 902a through 902c and the second transmit power used to transmit the DMRSs 906a through 906b. For example, after the mobile device increases the transmit power to transmit the DMRSs 906a through 906b, the mobile device may adjust the transmit power again so that the DMRSs 908a through 908c may be transmitted using a third transmit power that may be different than the first and second transmit powers.

In some examples of the disclosure, the result of the multi-transmit-power uplink bundling illustrated in FIG. 9 may be that the mobile device may use different transmit powers to transmit different groups of the DMRSs scheduled to be transmitted using the same precoding matrix, for example, the DMRSs of a scheduled uplink DMRS bundle.

For example, in FIG. 9, a first transmit power may be used to transmit the DMRSs 902a through 902c of the DMRS-PUSCH pairs 904a through 904c, a second transmit power may be used to transmit the DMRSs 906a through 906b of the DMRS-PUSCH pairs 904d through 904e, and a third transmit power, which may be the same or different than the first transmit power, may be used to transmit the DMRSs 908a through 908c of the DMRS-PUSCH pairs 904f through 904h. Similarly, the first transmit power may be also used to transmit the PUSCHs 903a through 903c of the DMRS-PUSCH pairs 904a through 904c, the second transmit power may be also used to transmit the PUSCHs 903d through 903e of the DMRS-PUSCH pairs 904d through 904e, and the third transmit power may be also used to transmit the PUSCHs 903f through 903h of the DMRS-PUSCH pairs 904f through 904h.

In some implementations, when the indication to adjust transmit power is part of an indication indicating that UCI is to be multiplexed with a PUSCH within an uplink DMRS-bundling bundle, for example, the PUSCHs 903d through 903e in FIG. 9, the mobile device may increase the transmit power associated with the DMRSs 906a through 906b associated with the PUSCHs 903d through 903e that were indicated to be multiplexed with the UCI. The remaining DMRSs 908a through 908c may be transmitted using the same transmit power used for the DMRSs 902a through 902c or may be transmitted with another transmit power. Similarly, when the indication to adjust transmit power is a TPC command indicating that some of the PUSCHs within an uplink DMRS-bundling bundle, for example, the PUSCHs 903d through 903e in FIG. 9, are to be transmitted with adjusted power levels, the mobile device may increase the transmit power associated with the DMRSs 906a through 906b associated with the PUSCHs 903d through 903e that were indicated for adjusting transmit power. The remaining DMRSs 908a through 908c may be transmitted using the same transmit power used for the DMRSs 902a through 902c or may be transmitted with another transmit power.

In some examples of the disclosure, some indications may indicate to a mobile device that uplink DMRS bundling may be disabled, that uplink DMRS bundling is not to be used, or that uplink DMRS bundling has been reset. For example, in one aspect of the disclosure, an indication to adjust transmit power received by a mobile device that may be not associated with a TPC command or an indication that UCI is to be multiplexed with a PUSCH within an uplink DMRS-bundling bundle may be an indication that uplink DMRS bundling may be disabled, that uplink DMRS bundling is not to be used, or that uplink DMRS bundling has been reset. In some examples of the disclosure, an indication that uplink DMRS bundling may be disabled, that uplink DMRS bundling is not to be used, or that uplink DMRS bundling has been reset may include the loss of phase continuity across multiple consecutively transmitted DMRSs.

In some examples, in the frequency domain, the N DMRSs of an uplink DMRS bundle may be transmitted by the mobile device in a first carrier (or first group of carriers), and other information may be transmitted in a second carrier (or second group of carriers). Similarly, the N DMRSs of an uplink DMRS bundle may be received by the base station 105 in a first carrier (or first group of carriers), and other information may be received in a second carrier (or second group of carriers). In the time domain, the other information may be transmitted in at least a portion of N consecutive transmission slots used for transmitting the N DMRSs of the uplink DMRS bundle using the same precoding matrix. Similarly, the other information may be received in at least a portion of the same N consecutive transmission slots used for transmitting the N DMRSs of the uplink DMRS bundle using the same precoding matrix. Accordingly, in some examples, the second carrier(s) may be different than the first carrier(s).

In some examples of the disclosure, the mobile device may determine that the total transmit power for transmitting the N DMRSs of an uplink DMRS bundle in the first carrier(s) and for transmitting the other information in the second carrier(s) exceeds a threshold. For example, the threshold may be a maximum transmit power threshold. Upon determining that the total transmit power exceeds the threshold, the mobile device may allocate power between the transmission of the N DMRSs of the uplink DMRS bundle in the first carrier(s) and the transmission of the other information in the second carrier(s). Such allocation may be performed to maintain the total transmit power below a transmit power threshold (for example, a maximum transmit power). According to some aspects of the disclosure, when allocating power between the transmission of the N DMRSs of the uplink DMRS bundle in the first carrier(s) and the transmission of the other information in the second carrier(s), the transmission of the N DMRSs of the uplink DMRS bundle in the first carrier(s) may be given priority over transmission of the information in the second carrier(s).

For example, an uplink DMRS bundle transmitted in the first carrier(s) may include a DMRS and its associated PUSCH that does not include a HARQ-ACK or CSI. Other information that may not be part of an uplink DMRS bundle and that may be transmitted in the second carrier(s) may include a PUCCH with CSI, a PUSCH with CSI, or a PUSCH without CSI. In order to maintain phase continuity across the DMRSs of the uplink DMRS bundle transmitted in the first carrier(s), the transmission of the DMRSs of the uplink DMRS bundle in the first carrier(s) may be given priority over the transmission of the information in the second carrier(s).

Figure 10:
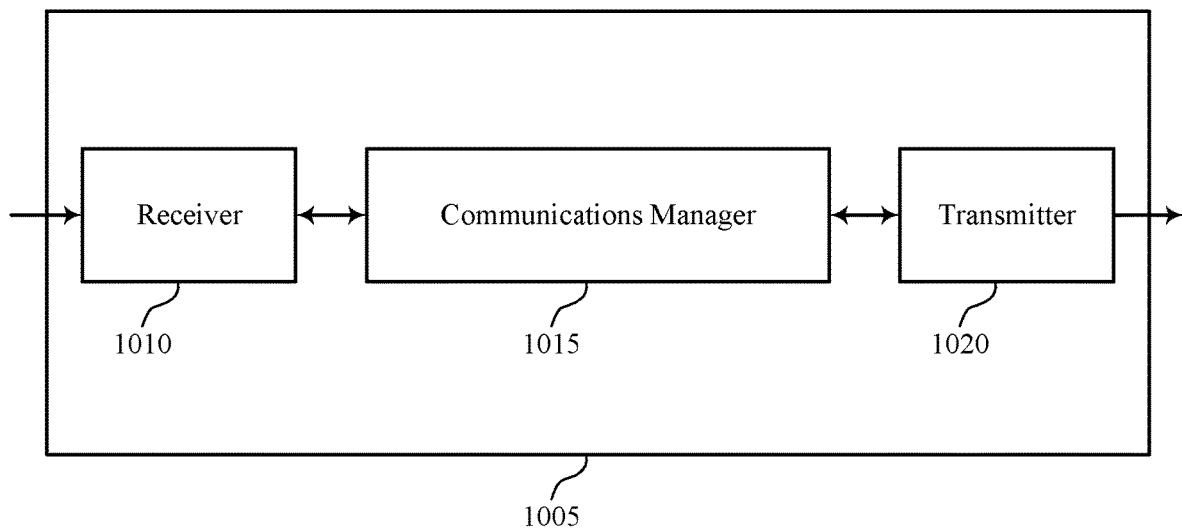
FIGS. 10 and 11 show block diagrams of devices that support physical shared channel reference signal bundling in accordance with aspects of the present disclosure.

FIG. 10 shows a block diagram of a device 1005 that supports physical shared channel reference signal bundling in accordance with aspects of the present disclosure. The device 1005 may be an example of aspects of a UE 115 as described herein. The device 1005 may include a receiver 1010, a communications manager 1015, and a transmitter 1020. The communications manager 1015 may be implemented, at least in part, by one or both of a modem and a processor. Each of these components may be in communication with one another (for example, via one or more buses).

The receiver 1010 may receive information such as packets, user data, or control information associated with various information channels (for example, control channels, data channels, and information related to physical shared channel reference signal bundling). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive, from a base station, an indication of a DMRS bundling configuration for one or more physical shared channels; transmit, to the base station based on receiving the indication, an indication of a UE capability for DMRS bundling for the one or more physical shared channels; receive, from the base station based on transmitting the indication of the UE capability, DCI; determine, based on the DCI, whether to alter a parameter associated with or more physical shared channel symbols associated with the one or more physical shared channels; and transmit, to the base station based on determining whether to alter the parameter, one or more bundled DMRSs associated with the one or more physical shared channel symbols. The communications manager 1015 may be an example of aspects of the communications manager 1310 described herein.

The transmitter 1020 may transmit signals generated by other components of the device 1005. In some examples, the transmitter 1020 may be collocated with a receiver 1010 in a transceiver component. For example, the transmitter 1020 may be an example of aspects of the transceiver 1320 described with reference to FIG. 13. The transmitter 1020 may utilize a single antenna or a set of antennas.

The actions performed by the communications manager 1015 as described herein may be implemented to realize one or more potential advantages. For example, communications manager 1015 may increase communication reliability and decrease communication latency at a UE 115 by enabling DMRS bundling, which may reduce transmission delays, improve channel estimation, and reduce overhead. Similarly, communications manager 1015 may save power and increase battery life at a UE 115 by strategically reducing overhead and improving channel estimation, as well as strategically determining when to perform DMRS bundling.

Figure 11:
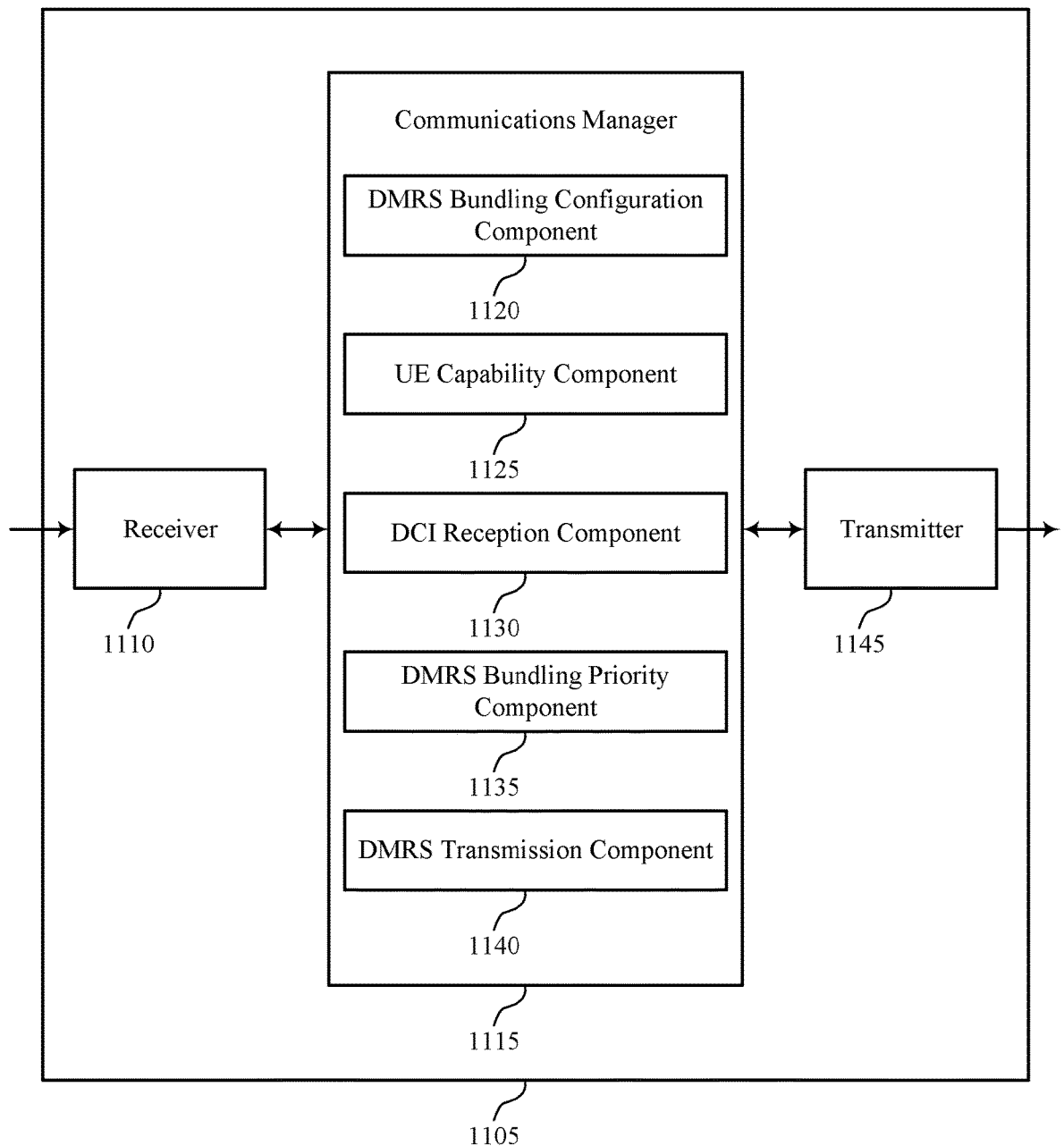

FIG. 11 shows a block diagram of a device 1105 that supports physical shared channel reference signal bundling in accordance with aspects of the present disclosure. The device 1105 may be an example of aspects of a device 705 or a UE 115 as described herein. The device 1105 may include a receiver 1110, a communications manager 1115, and a transmitter 1145. The communications manager 1115 may be implemented, at least in part, by one or both of a modem and a processor. Each of these components may be in communication with one another (for example, via one or more buses).

The receiver 1110 may receive information such as packets, user data, or control information associated with various information channels (for example, control channels, data channels, and information related to physical shared channel reference signal bundling). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 715 as described herein. The communications manager 1115 may include a DMRS bundling configuration component 1120, a UE capability component 1125, a DCI reception component 1130, a DMRS bundling priority component 1135, and a DMRS transmission component 1140. The communications manager 1115 may be an example of aspects of the communications manager 1310 described herein.

The DMRS bundling configuration component 1120 may receive, from a base station, an indication of a DMRS bundling configuration for one or more physical shared channels. The UE capability component 1125 may transmit, to the base station based on receiving the indication, an indication of a UE capability for DMRS bundling for the one or more physical shared channels. The DCI reception component 1130 may receive, from the base station based on transmitting the indication of the UE capability, DCI. The DMRS bundling priority component 1135 may determine, based on the DCI, whether to alter a parameter associated with or more physical shared channel symbols associated with the one or more physical shared channels. The DMRS transmission component 1140 may transmit, to the base station based on determining whether to alter the parameter, one or more bundled DMRSs associated with the one or more physical shared channel symbols.

The transmitter 1145 may transmit signals generated by other components of the device 1105. In some examples, the transmitter 1145 may be collocated with a receiver 1110 in a transceiver component. For example, the transmitter 1145 may be an example of aspects of the transceiver 1320 described with reference to FIG. 13. The transmitter 1145 may utilize a single antenna or a set of antennas.

A processor of a UE 115 (for example, controlling the receiver 1110, the transmitter 1145, or the transceiver 1320 as described with reference to FIG. 13) may increase communication reliability and accuracy by enabling the UE 115 to perform DMRS bundling and reduce transmission delays and overhead (for example, via implementation of system components described with reference to FIG. 12). Further, the processor of the UE 115 may identify one or more aspects of a DMRS bundling configuration to perform the processes described herein. The processor of the UE 115 may use the DMRS bundling configuration and received DCI to perform DMRS bundling and thereby improve channel estimation, communication accuracy, and communication reliability, as well as to save power and increase battery life at the UE 115 (for example, by reducing overhead, improving decoding, and by strategically determining when to apply DMRS bundling).

Figure 12:
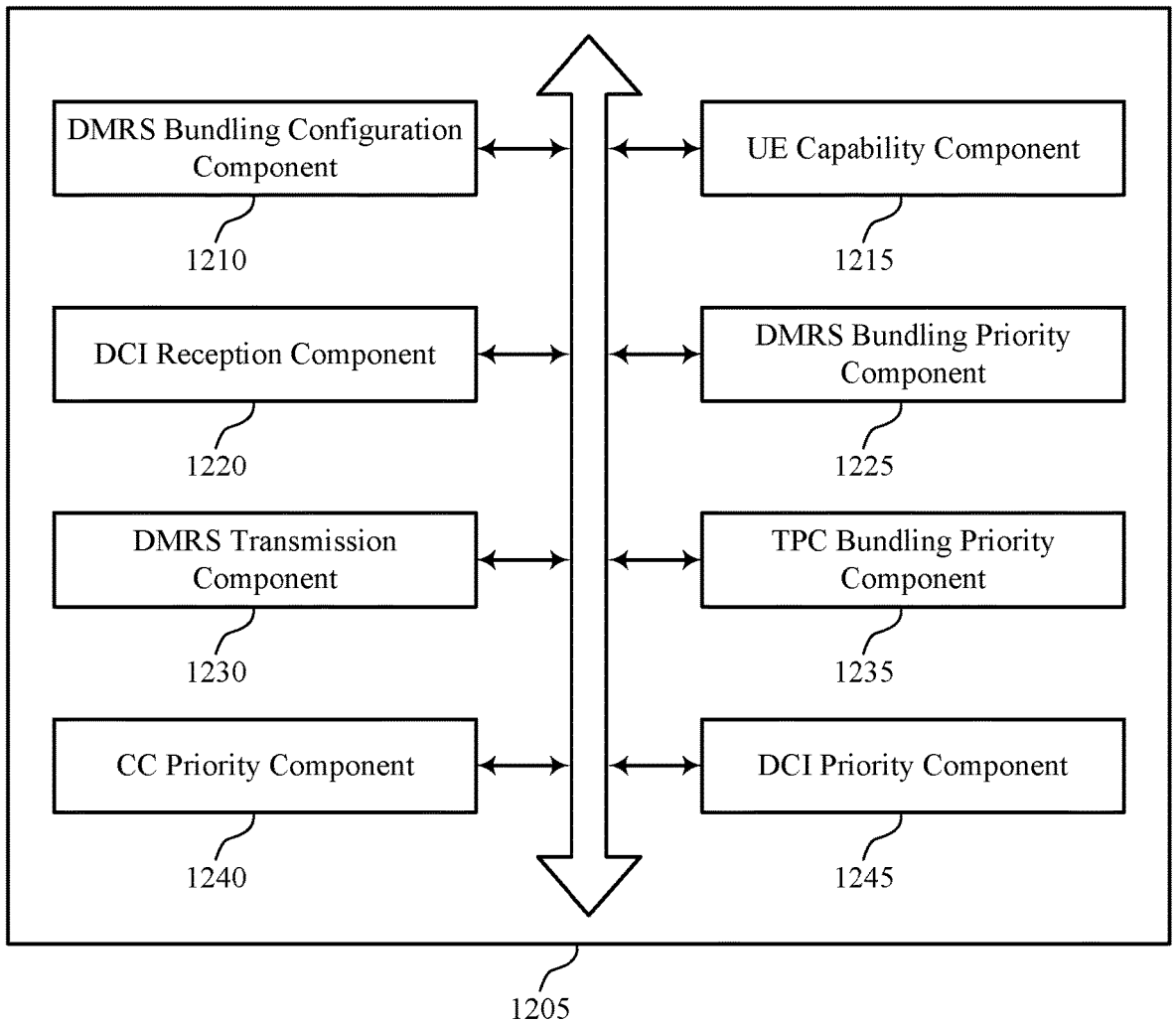
FIG. 12 shows a block diagram of a communications manager that supports physical shared channel reference signal bundling in accordance with aspects of the present disclosure.

FIG. 12 shows a block diagram of a communications manager 1205 that supports physical shared channel reference signal bundling in accordance with aspects of the present disclosure. The communications manager 1205 may be an example of aspects of a communications manager 1015, a communications manager 1115, or a communications manager 1310 described herein. The communications manager 1205 may include a DMRS bundling configuration component 1210, a UE capability component 1215, a DCI reception component 1220, a DMRS bundling priority component 1225, a DMRS transmission component 1230, a TPC bundling priority component 1235, a CC priority component 1240, and a DCI priority component 1245. Each of these components may communicate, directly or indirectly, with one another (for example, via one or more buses).

The DMRS bundling configuration component 1210 may receive, from a base station, an indication of a DMRS bundling configuration for one or more physical shared channels. In some examples, the DMRS bundling configuration component 1210 receives the indication of the DMRS bundling configuration via RRC signaling or via DCI. In some examples, the DMRS bundling configuration component 1210 receives the indication of the DMRS bundling configuration based on one or more of an MCS, a timing gap between the one or more physical shared channel symbols, or a quantity of repetitions of the one or more physical shared channels.

In some examples, the one or more physical shared channels repeat over multiple TTIs. In some examples, the one or more physical shared channels each carry one or more different TBs. In some examples, the DMRS bundling configuration includes one or more of a quantity of physical shared channel symbols to have a same parameter, a first symbol to have a same parameter, a last symbol to have a same parameter, or one or more priorities associated with DMRS bundling.

In some examples, the DMRS bundling configuration component 1210 may receive an indication to transmit the one or more bundled DMRSs using a same precoding matrix. In some examples, the DMRS bundling configuration component 1210 may receive, before transmission of a portion of the one or more bundled DMRSs, an indication to adjust a transmit power for the one or more bundled DMRSs. In some examples, the indication to transmit the one or more bundled DMRSs using the same precoding matrix is received via DCI. In some examples, the indication to transmit the one or more bundled DMRSs using the same precoding matrix is received implicitly through determination that one or more of a same power control parameter or precoding matrix is to be used to transmit the one or more bundled DMRSs.

The UE capability component 1215 may transmit, to the base station based on receiving the indication, an indication of a UE capability for DMRS bundling for the one or more physical shared channels. In some examples, the indication of the UE capability for DMRS bundling includes a timing gap between the one or more physical shared channel symbols.

The DCI reception component 1220 may receive, from the base station based on transmitting the indication of the UE capability, DCI. In some examples, the DCI includes scheduling DCI or GC DCI.

The DMRS bundling priority component 1225 may determine, based on the DCI, whether to alter a parameter associated with or more physical shared channel symbols associated with the one or more physical shared channels. In some examples, the parameter includes a coherence property of the one or more physical shared channel symbols. In some examples, the coherence property includes one or more of a phase continuity, a precoder phase continuity, a threshold timing gap, a frequency resource allocation, a transmit power, or a transmit waveform, associated with the one or more physical shared channel symbols. In some examples, determining whether to alter the parameter may include determining whether to alter the parameter associated with the one or more physical shared channel symbols across multiple slots associated with the one or more physical shared channels.

The DMRS transmission component 1230 may transmit, to the base station based on determining whether to alter the parameter, one or more bundled DMRSs associated with the one or more physical shared channel symbols. In some examples, transmitting the one or more bundled DMRSs may include transmitting the one or more bundled DMRSs associated with the one or more physical shared channel symbols across the multiple slots. In some examples, the DMRS transmission component 1230 may transmit the one or more bundled DMRSs in a number of consecutive transmission slots and using the same precoding matrix.

The TPC bundling priority component 1235 may receive, via the DCI, a TPC command including an indication of a change in transmit power corresponding to the one or more physical shared channels. In some examples, the TPC bundling priority component 1235 may determine, based on receiving the indication of the change in transmit power, to alter the parameter of one or more of the physical shared channel symbols. In some examples, the TPC bundling priority component 1235 may alter the parameter of one or more of the physical shared channel symbols based on determining to alter the parameter. In some examples, the TPC bundling priority component 1235 may determine, based on receiving the indication of the change in transmit power, to maintain one or more of the parameters as unchanged for one or more of the physical shared channel symbols.

In some examples, the TPC bundling priority component 1235 may maintain the parameter associated with the one or more physical shared channel symbols based on determining to maintain the parameters. In some examples, the TPC bundling priority component 1235 may determine, based on receiving the indication of the change in transmit power, to alter a parameter of another one of the one or more physical shared channel symbols after a symbol associated with an end of a bundling pattern of the DMRS bundling configuration. In some examples, the TPC bundling priority component 1235 may alter the parameter of the other one of the one or more physical shared channel symbols based on determining to alter the parameter.

In some examples, the TPC bundling priority component 1235 may determine, based on a TPC value associated with the TPC command, whether to alter the parameter or to maintain the parameter as unchanged for one or more of the physical shared channel symbols. In some examples, the TPC bundling priority component 1235 may alter or maintain a parameter of one or more of the physical shared channel symbols based on determining whether to alter the parameter. In some examples, the TPC bundling priority component 1235 may determine, based on receiving the indication of the change in transmit power, to alter a parameter associated with each of the one or more physical shared channel symbols. In some examples, the TPC bundling priority component 1235 may alter a parameter associated with each of the one or more physical shared channel symbols based on determining to alter the parameter.

In some examples, the TPC bundling priority component 1235 may maintain a transmit power for at least a portion of the one or more bundled DMRSs within a threshold range. In some examples, the TPC bundling priority component 1235 may maintain a transmit power for at least a portion of the one or more bundled DMRSs within a threshold range after reception of the indication to adjust transmit power. In some examples, the TPC bundling priority component 1235 may increase the transmit power for each of the one or more bundled DMRSs transmitted after reception of the indication to adjust transmit power or increase the transmit power for at least a portion of the one or more bundled DMRSs transmitted after reception of the indication to adjust transmit power.

In some examples, a first subset of the one or more physical shared channel symbols may be configured over a first CC and a second subset of one or more physical channel symbols may be configured over a second CC. The CC priority component 1240 may determine that one or more physical shared channel symbols configured over the first CC overlap with one or more physical channel symbols configured over the second CC. In some examples, the second subset of the one or more physical channel symbols is associated with a same type of physical channel, a same type of signaling, a different type of physical channel, or a different type of signaling as the first subset of the one or more physical shared channel symbols.

In some examples, the CC priority component 1240 may determine, based on the overlapping, to alter a parameter of the one or more physical shared channel symbols. In some examples, the CC priority component 1240 may alter the parameter associated with the one or more physical shared channel symbols based on determining to alter the parameter. In some examples, the CC priority component 1240 may determine, based on the overlapping, to alter the parameter associated with the overlapping one or more physical shared channel symbols configured over the first CC and one or more physical shared channel symbols configured over the second CC.

In some examples, the CC priority component 1240 may alter the parameter associated with the one or more physical shared channel symbols configured over the first CC and the one or more physical shared channel symbols configured over the second CC based on determining to alter the parameter. In some examples, the CC priority component 1240 may determine, based on the overlapping, to maintain the parameter as unchanged for non-overlapping symbols of one or more of the first subset of the one or more physical shared channel symbols or the second subset of one or more physical channel symbols. In some examples, the CC priority component 1240 may maintain the parameter associated with the non-overlapping symbols of one or more of the first subset of the one or more physical shared channel symbols or the second subset of one or more physical channel symbols based on determining to maintain the parameter.

In some examples, the one or more bundled DMRSs are transmitted in a first carrier (for example, a first CC). In some examples, the CC priority component 1240 may transmit information in a second carrier and in at least a portion of the number of consecutive transmission slots. In some examples, the CC priority component 1240 may determine that a total transmit power for transmitting the one or more bundled DMRSs in the first carrier and for transmitting the information in the second carrier satisfies a threshold and may allocate power between the transmission of the one or more bundled DMRSs in the first carrier and the transmission of the information in the second carrier, in which transmission of the one or more bundled DMRSs in the first carrier is given priority over transmission of the information in the second carrier.

The DCI priority component 1245 may identify that each of the one or more physical shared channels is associated with a different type of DCI. In some examples, the different types of DCI include two or more of DCI with a format 0-0, DCI with a format 0-1, DCI with a CRC scrambled by a C-RNTI, or DCI with a CRC scrambled by a CS-RNTI. In some examples, the DCI priority component 1245 may determine, based on the identifying and the DMRS bundling configuration, whether to alter the parameter for the one or more physical shared channel symbols. In some examples, the DCI priority component 1245 may alter the parameter or maintain the parameter as unchanged for one or more of the physical shared channel symbols.

In some examples, the DCI priority component 1245 may identify that one or more of the one or more physical shared channels is associated with the DCI and that one or more of the one or more physical shared channels is associated with configured transmission grants. In some examples, the DCI priority component 1245 may determine, based on the identifying and the DMRS bundling configuration, whether to alter a parameter for one or more physical shared channel symbols associated with the one or more identified physical shared channels. In some examples, the DCI priority component 1245 may alter the parameter or maintain the parameter as unchanged for the one or more physical shared channel symbols associated with the one or more identified physical shared channels.

Figure 13:
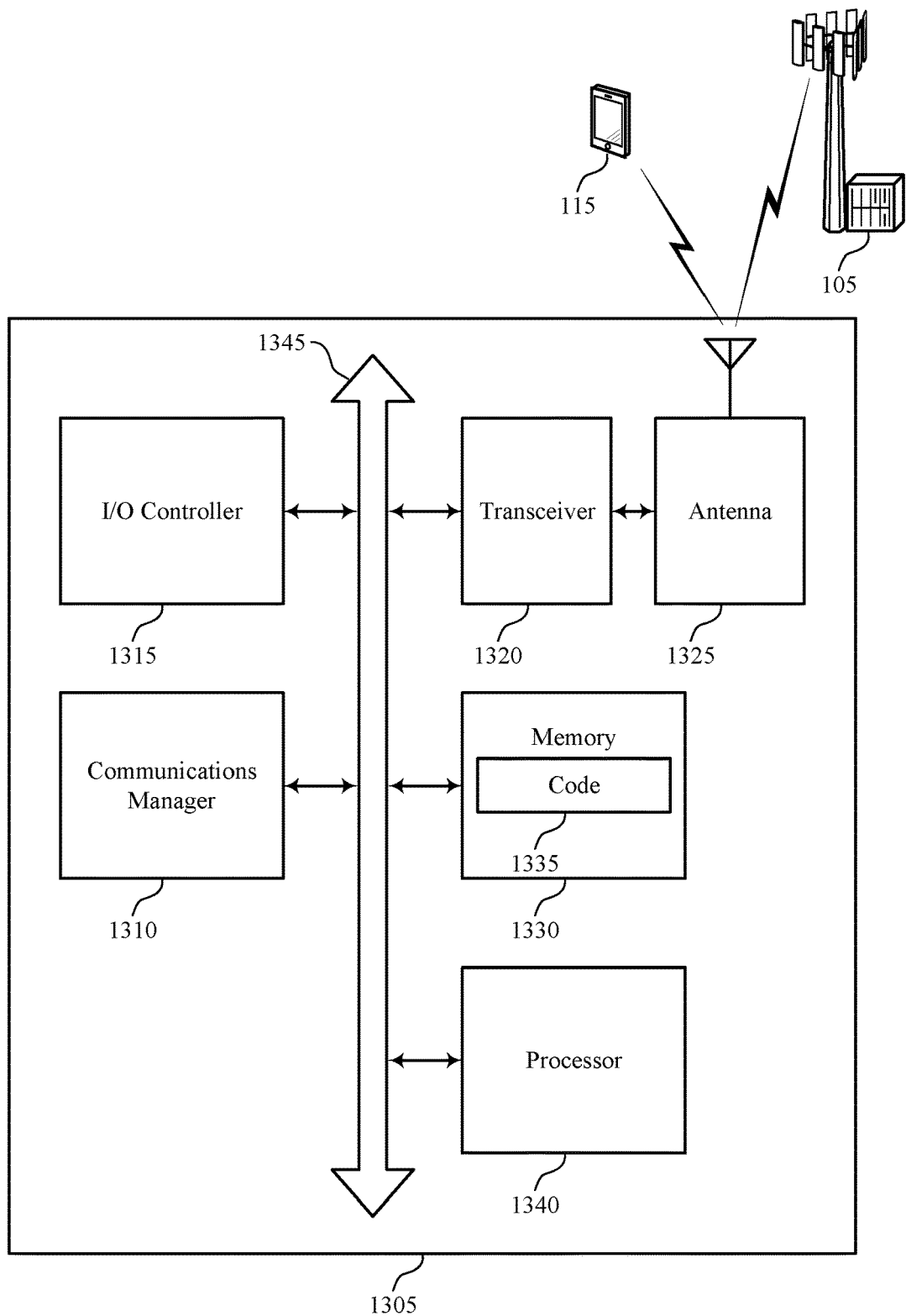
FIG. 13 shows a diagram of a system including a device that supports physical shared channel reference signal bundling in accordance with aspects of the present disclosure.

FIG. 13 shows a diagram of a system including a device 1305 that supports physical shared channel reference signal bundling in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an input/output (I/O) controller 1315, a transceiver 1320, an antenna 1325, a memory 1330, and a processor 1340. These components may be in electronic communication via one or more buses (for example, bus 1345).

The communications manager 1310 may receive, from a base station, an indication of a DMRS bundling configuration for one or more physical shared channels; transmit, to the base station based on receiving the indication, an indication of a UE capability for DMRS bundling for the one or more physical shared channels; receive, from the base station based on transmitting the indication of the UE capability, DCI; determine, based on the DCI, whether to alter a parameter associated with or more physical shared channel symbols associated with the one or more physical shared channels; and transmit, to the base station based on determining whether to alter the parameter, one or more bundled DMRSs associated with the one or more physical shared channel symbols.

The I/O controller 1315 may manage input and output signals for the device 1305. The I/O controller 1315 may also manage peripherals not integrated into the device 1305. In some examples, the I/O controller 1315 may represent a physical connection or port to an external peripheral. In some examples, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some examples, the I/O controller 1315 may be implemented as part of a processor. In some examples, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some examples, the wireless device may include a single antenna 1325. However, in some examples the device may have more than one antenna 1325, which may be capable of concurrently transmitting or receiving multiple wireless transmissions.

The memory 1330 may include random access memory (RAM) and read only memory (ROM). The memory 1330 may store computer-readable, computer-executable code 1335 including instructions that, when executed, cause the processor to perform various functions described herein. In some examples, the memory 1330 may contain, among other things, a basic I/O system (BIOS) which may control basic hardware or software operation such as the interaction with peripheral components or devices.

The processor 1340 may include an intelligent hardware device, (for example, a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some examples, the processor 1340 may be configured to operate a memory array using a memory controller. In other cases, a memory controller may be integrated into the processor 1340. The processor 1340 may be configured to execute computer-readable instructions stored in a memory (for example, the memory 1330) to cause the device 1305 to perform various functions (for example, functions or tasks supporting physical shared channel reference signal bundling).

The code 1335 may include instructions to implement aspects of the present disclosure, including instructions to support wireless communications. The code 1335 may be stored in a non-transitory computer-readable medium such as system memory or other type of memory. In some examples, the code 1335 may not be directly executable by the processor 1340 but may cause a computer (for example, when compiled and executed) to perform functions described herein.

Figure 14:
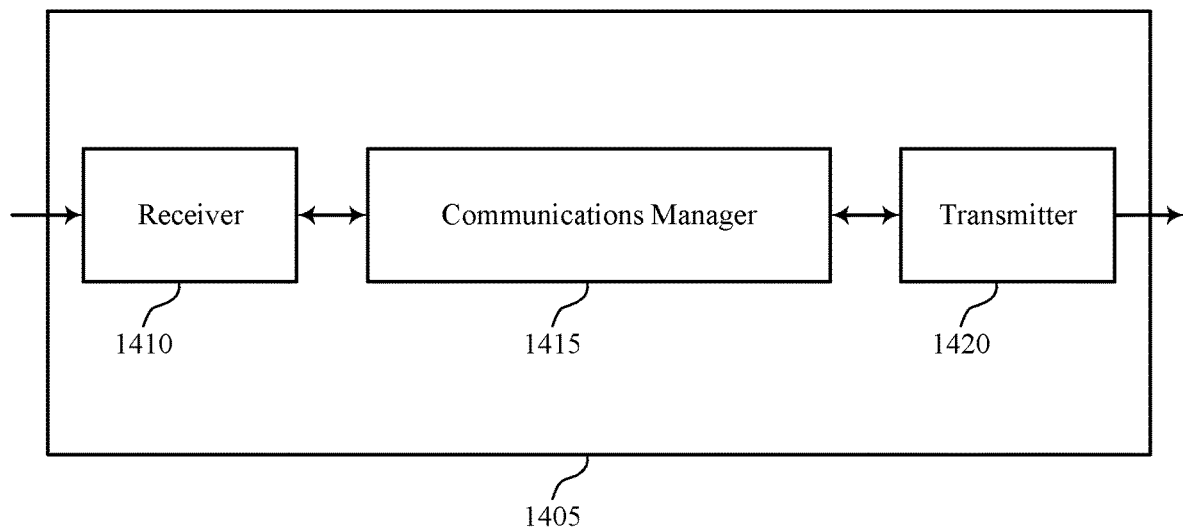
FIGS. 14 and 15 show block diagrams of devices that support physical shared channel reference signal bundling in accordance with aspects of the present disclosure.

FIG. 14 shows a block diagram of a device 1405 that supports physical shared channel reference signal bundling in accordance with aspects of the present disclosure. The device 1405 may be an example of aspects of a base station 105 as described herein. The device 1405 may include a receiver 1410, a communications manager 1415, and a transmitter 1420. The communications manager 1415 may be implemented, at least in part, by one or both of a modem and a processor. Each of these components may be in communication with one another (for example, via one or more buses).

The receiver 1410 may receive information such as packets, user data, or control information associated with various information channels (for example, control channels, data channels, and information related to physical shared channel reference signal bundling). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may determine, for a UE, a DMRS bundling configuration for one or more physical shared channels; transmit, to the UE, an indication of the DMRS bundling configuration; receive, from the UE based on transmitting the indication, an indication of a UE capability for DMRS bundling for the one or more physical shared channels; and transmit, to the UE based on receiving the indication of the UE capability, DCI. The communications manager 1415 may be an example of aspects of the communications manager 1710 described herein.

The transmitter 1420 may transmit signals generated by other components of the device 1405. In some examples, the transmitter 1420 may be collocated with a receiver 1410 in a transceiver component. For example, the transmitter 1420 may be an example of aspects of the transceiver 1720 described with reference to FIG. 17. The transmitter 1420 may utilize a single antenna or a set of antennas.

Figure 15:
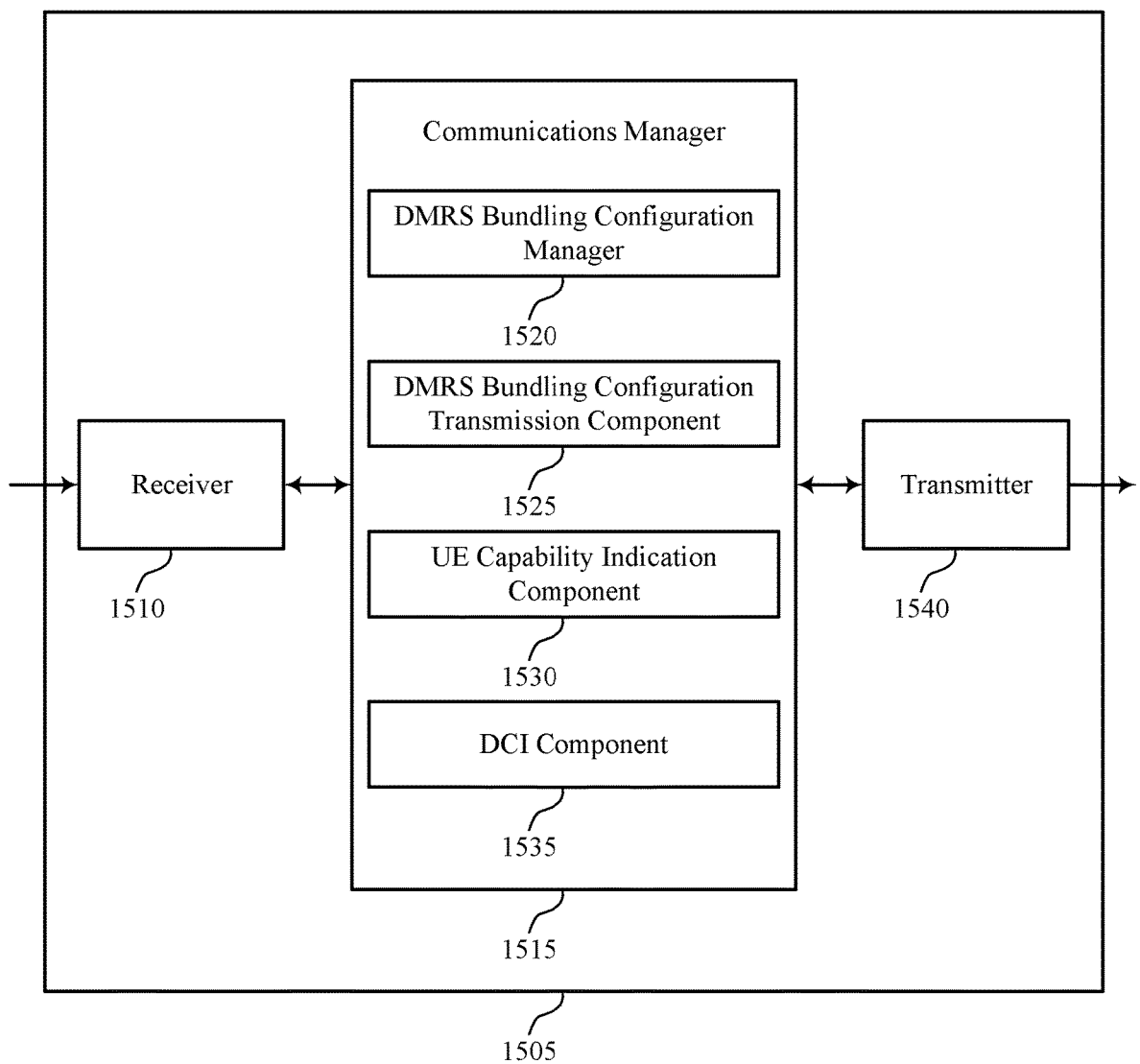

FIG. 15 shows a block diagram of a device 1505 that supports physical shared channel reference signal bundling in accordance with aspects of the present disclosure. The device 1505 may be an example of aspects of a device 1405 or a base station 105 as described herein. The device 1505 may include a receiver 1510, a communications manager 1515, and a transmitter 1540. The communications manager 1515 may be implemented, at least in part, by one or both of a modem and a processor. Each of these components may be in communication with one another (for example, via one or more buses).

The receiver 1510 may receive information such as packets, user data, or control information associated with various information channels (for example, control channels, data channels, and information related to physical shared channel reference signal bundling). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a DMRS bundling configuration manager 1520, a DMRS bundling configuration transmission component 1525, a UE capability indication component 1530, and a DCI component 1535. The communications manager 1515 may be an example of aspects of the communications manager 1710 described herein.

The DMRS bundling configuration manager 1520 may determine, for a UE, a DMRS bundling configuration for one or more physical shared channels. The DMRS bundling configuration transmission component 1525 may transmit, to the UE, an indication of the DMRS bundling configuration. The UE capability indication component 1530 may receive, from the UE based on transmitting the indication, an indication of a UE capability for DMRS bundling for the one or more physical shared channels. The DCI component 1535 may transmit, to the UE based on receiving the indication of the UE capability, DCI.

The transmitter 1540 may transmit signals generated by other components of the device 1505. In some examples, the transmitter 1540 may be collocated with a receiver 1510 in a transceiver component. For example, the transmitter 1540 may be an example of aspects of the transceiver 1720 described with reference to FIG. 17. The transmitter 1540 may utilize a single antenna or a set of antennas.

Figure 16:
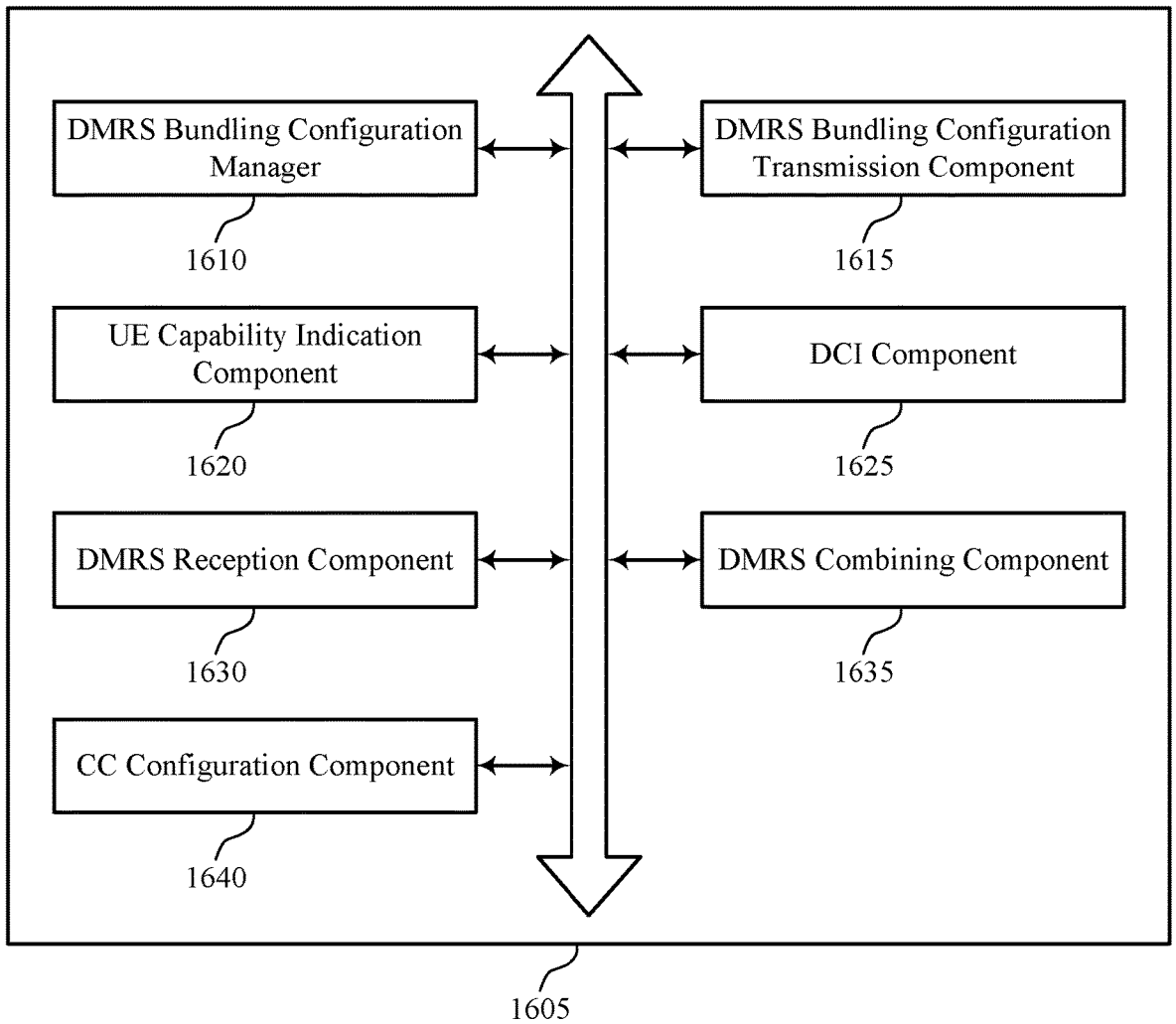
FIG. 16 shows a block diagram of a communications manager that supports physical shared channel reference signal bundling in accordance with aspects of the present disclosure.

FIG. 16 shows a block diagram of a communications manager 1605 that supports physical shared channel reference signal bundling in accordance with aspects of the present disclosure. The communications manager 1605 may be an example of aspects of a communications manager 1415, a communications manager 1515, or a communications manager 1710 described herein. The communications manager 1605 may include a DMRS bundling configuration manager 1610, a DMRS bundling configuration transmission component 1615, a UE capability indication component 1620, a DCI component 1625, a DMRS reception component 1630, a DMRS combining component 1635, and a CC configuration component 1640. Each of these components may communicate, directly or indirectly, with one another (for example, via one or more buses).

The DMRS bundling configuration manager 1610 may determine, for a UE, a DMRS bundling configuration for one or more physical shared channels. In some examples, the one or more physical shared channel symbols are associated with one or more parameters that may be altered or maintained as unchanged based on transmitting the DCI. In some examples, a parameter includes a coherence property of the one or more physical shared channel symbols. In some examples, the coherence property includes one or more of a phase continuity, a precoder phase continuity, a threshold timing gap, a frequency resource allocation, a transmit power, or a transmit waveform, associated with the one or more physical shared channel symbols.

In some examples, the one or more physical shared channels repeat over multiple TTIs. In some examples, the one or more physical shared channels each carry one or more different TBs. In some examples, the DMRS bundling configuration includes one or more of a quantity of physical shared channel symbols to have a same parameter, a first symbol to have a same parameter, a last symbol to have a same parameter, and one or more priorities associated with DMRS bundling.

The DMRS bundling configuration transmission component 1615 may transmit, to the UE, an indication of the DMRS bundling configuration. In some examples, the DMRS bundling configuration transmission component 1615 transmits the indication of the DMRS bundling configuration via RRC signaling or via DCI. In some examples, the DMRS bundling configuration transmission component 1615 transmits the indication of the DMRS bundling based on one or more of an MCS, a timing gap between one or more physical shared channel symbols, a quantity of repetitions of the one or more physical shared channels.

In some examples, the DMRS bundling configuration transmission component 1615 may transmit an indication to transmit the one or more bundled DMRSs using a same precoding matrix. In some examples, the DMRS bundling configuration transmission component 1615 may transmit, before a portion of the one or more bundled DMRSs is transmitted, an indication to adjust a transmit power for the one or more bundled DMRSs. In some examples, the indication to transmit the one or more bundled DMRSs using a same precoding matrix is transmitted via DCI.

The UE capability indication component 1620 may receive, from the UE based on transmitting the indication, an indication of a UE capability for DMRS bundling for the one or more physical shared channels. In some examples, the indication of the UE capability for DMRS bundling includes a timing gap between one or more physical shared channel symbols.

The DCI component 1625 may transmit, to the UE based on receiving the indication of the UE capability, DCI. In some examples, the DCI includes scheduling DCI or GC DCI. In some examples, the DCI component 1625 may transmit, via the DCI, a TPC command including an indication of a change in transmit power corresponding to the one or more physical shared channels. In some examples, the DCI component 1625 may configure the one or more physical shared channels such that each of the one or more physical shared channels is associated with a different type of DCI. In some examples, the different types of DCI include two or more of DCI with a format 0-0, DCI with a format 0-1, DCI with a CRC scrambled by a C-RNTI, or DCI with a CRC scrambled by a CS-RNTI. In some examples, the DCI component 1625 may configure the one or more physical shared channels such that one or more of the one or more physical shared channels is associated with the DCI and that one or more of the one or more physical shared channels is associated with configured transmission grants.

The DMRS reception component 1630 may receive, from the UE based on transmitting the DCI, one or more bundled DMRSs associated with one or more physical shared channel symbols associated with the one or more physical shared channels. In some examples, receiving the one or more bundled DMRSs may include receiving the one or more bundled DMRSs associated with the one or more physical shared channel symbols across multiple slots associated with the one or more physical shared channels. In some examples, the DMRS reception component 1630 may receive the one or more bundled DMRSs in a number of consecutive transmission slots, in which the same precoding matrix is associated with each of the one or more bundled DMRSs.

The DMRS combining component 1635 may combine the one or more bundled DMRSs associated with the one or more physical shared channel symbols. In some examples, the DMRS combining component 1635 may estimate one or more parameters associated with physical shared channel demodulation based on combining the one or more bundled DMRSs.

The CC configuration component 1640 may configure a first subset of the one or more physical shared channel symbols over a first CC. In some examples, the CC configuration component 1640 may configure a second subset of one or more physical channel symbols over a second CC, in which one or more physical shared channel symbols configured over the first CC overlap with one or more physical channel symbols configured over the second CC. In some examples, the second subset of the one or more physical channel symbols is associated with a same type of physical channel, a same type of signaling, a different type of physical channel, or a different type of signaling as the first subset of the one or more physical shared channel symbols. In some examples, the one or more bundled DMRSs are received in a first carrier (for example, a first CC). In some examples, the CC configuration component 1640 may receive information in a second carrier and in at least a portion of the number of consecutive transmission slots.

Figure 17:
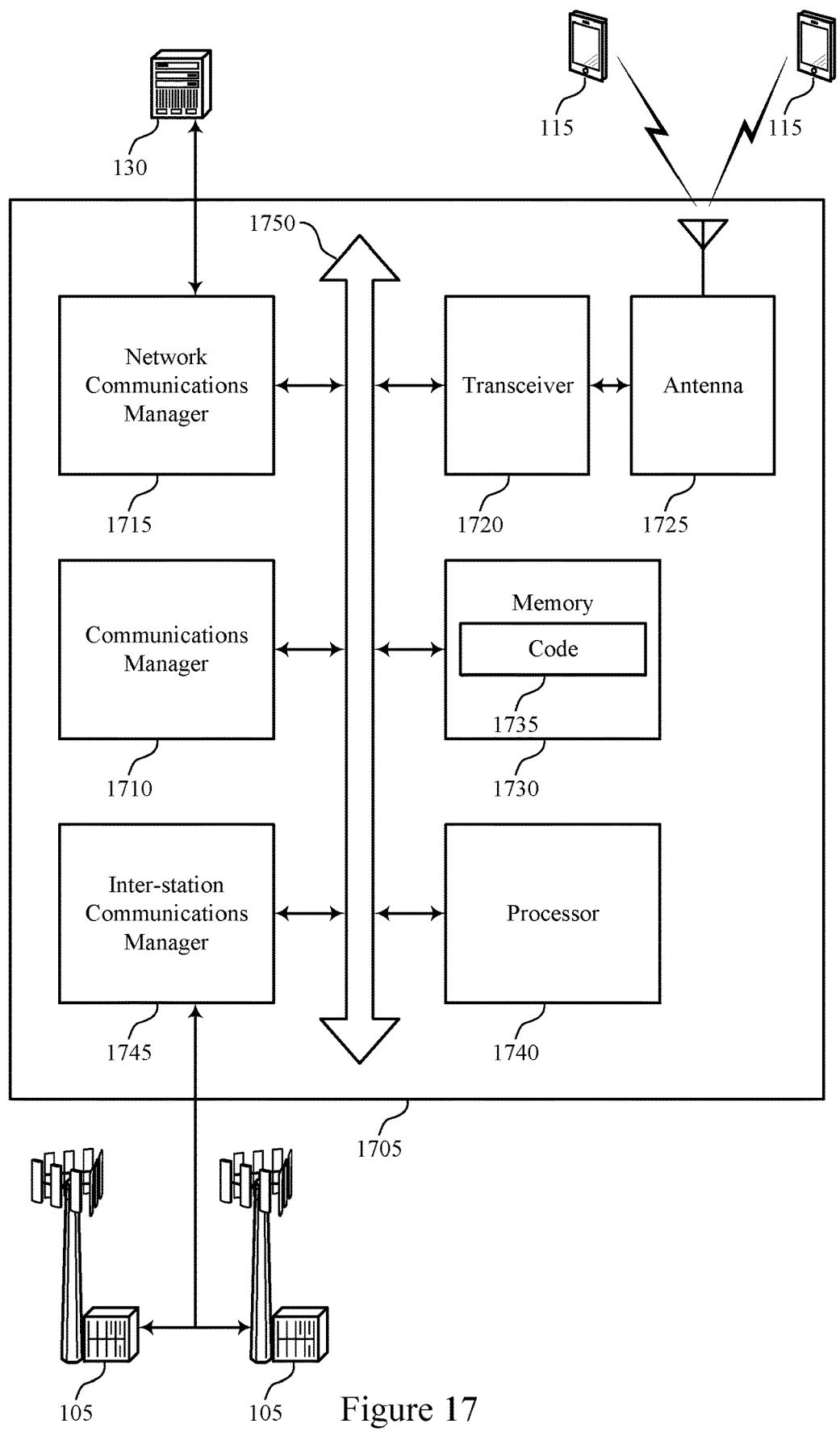
FIG. 17 shows a diagram of a system including a device that supports physical shared channel reference signal bundling in accordance with aspects of the present disclosure.

FIG. 17 shows a diagram of a system including a device 1705 that supports physical shared channel reference signal bundling in accordance with aspects of the present disclosure. The device 1705 may be an example of, or include the components of, the device 1705, the device 1505, or a base station 105 as described herein. The device 1705 may include components for bi-directional voice and data communications including components for transmitting and receiving communications, including a communications manager 1710, a network communications manager 1715, a transceiver 1720, an antenna 1725, a memory 1730, a processor 1740, and an inter-station communications manager 1745. These components may be in electronic communication via one or more buses (for example, bus 1750).

The communications manager 1710 may determine, for a UE, a DMRS bundling configuration for one or more physical shared channels; transmit, to the UE, an indication of the DMRS bundling configuration; receive, from the UE based on transmitting the indication, an indication of a UE capability for DMRS bundling for the one or more physical shared channels; and transmit, to the UE based on receiving the indication of the UE capability, DCI.

The network communications manager 1715 may manage communications with the core network (for example, via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some examples, the wireless device may include a single antenna 1725. However, in some examples the device may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by a processor (for example, the processor 1740) cause the device to perform various functions described herein. In some examples, the memory 1730 may contain, among other things, a BIOS which may control basic hardware or software operation such as the interaction with peripheral components or devices.

The processor 1740 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1740 may be configured to operate a memory array using a memory controller. In some examples, a memory controller may be integrated into processor 1740. The processor 1740 may be configured to execute computer-readable instructions stored in a memory (for example, the memory 1730) to cause the device 1705 to perform various functions (for example, functions or tasks supporting physical shared channel reference signal bundling).

The inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some examples, the code 1735 may not be directly executable by the processor 1740 but may cause a computer (for example, when compiled and executed) to perform functions described herein.

Figure 18:
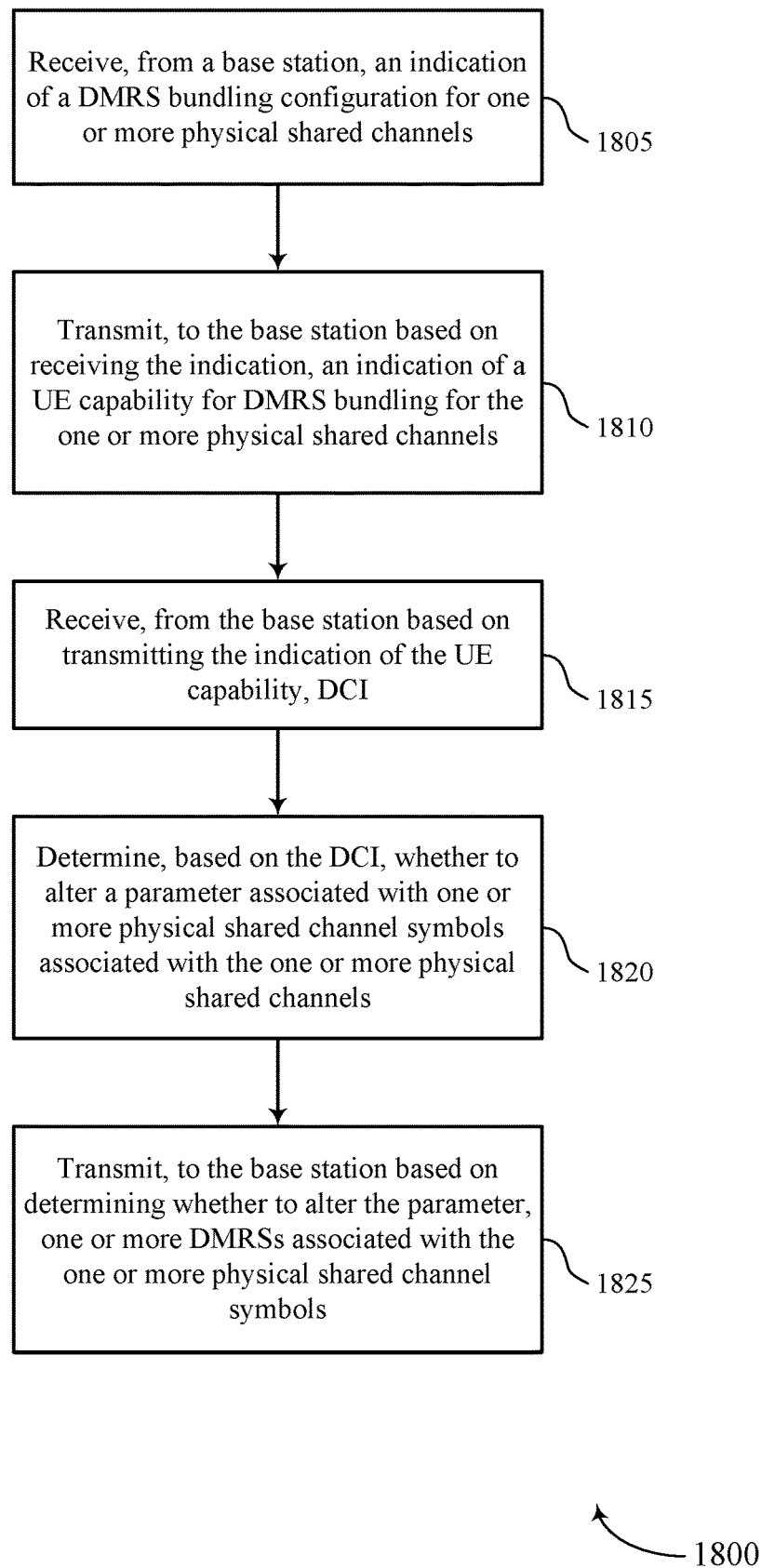
FIGS. 18-24 show flowcharts illustrating methods that support physical shared channel reference signal bundling in accordance with aspects of the present disclosure.

FIG. 18 shows a flowchart illustrating a method 1800 that supports physical shared channel reference signal bundling in accordance with aspects of the present disclosure. The operations of method 1800 may be implemented by a UE 118 or its components as described herein. For example, the operations of method 1800 may be performed by a communications manager as described with reference to FIGS. 10-13. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station, an indication of a DMRS bundling configuration for one or more physical shared channels. The operations of 1805 may be performed according to the methods described herein. In some examples, aspects of the operations of 1805 may be performed by a DMRS bundling configuration component as described with reference to FIGS. 10-13.

At 1810, the UE may transmit, to the base station based on receiving the indication, an indication of a UE capability for DMRS bundling for the one or more physical shared channels. The operations of 1810 may be performed according to the methods described herein. In some examples, aspects of the operations of 1810 may be performed by a UE capability component as described with reference to FIGS. 10-13.

At 1815, the UE may receive, from the base station based on transmitting the indication of the UE capability, DCI. The operations of 1815 may be performed according to the methods described herein. In some examples, aspects of the operations of 1815 may be performed by a DCI reception component as described with reference to FIGS. 10-13.

At 1820, the UE may determine, based on the DCI, whether to alter a parameter associated with or more physical shared channel symbols associated with the one or more physical shared channels. The operations of 1820 may be performed according to the methods described herein. In some examples, aspects of the operations of 1820 may be performed by a DMRS bundling priority component as described with reference to FIGS. 10-13.

At 1825, the UE may transmit, to the base station based on determining whether to alter the parameter, one or more bundled DMRSs associated with the one or more physical shared channel symbols. The operations of 1825 may be performed according to the methods described herein. In some examples, aspects of the operations of 1825 may be performed by a DMRS transmission component as described with reference to FIGS. 10-13.

Figure 19:
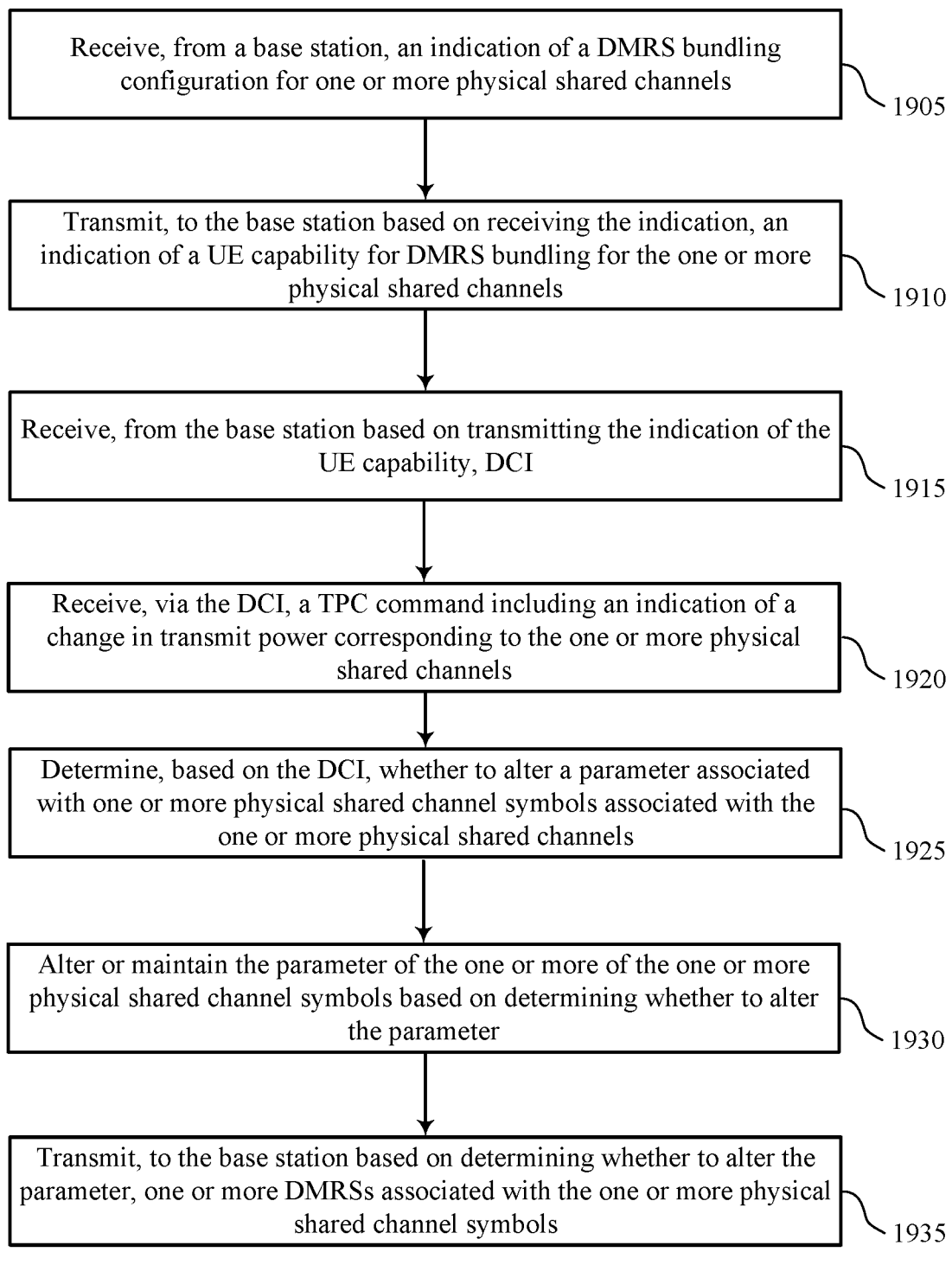

FIG. 19 shows a flowchart illustrating a method 1900 that supports physical shared channel reference signal bundling in accordance with aspects of the present disclosure. The operations of method 1900 may be implemented by a UE 115 or its components as described herein. For example, the operations of method 1900 may be performed by a communications manager as described with reference to FIGS. 10-13. In some examples, a UE may execute a set of instructions to control the functional elements of the UE to perform the functions described below. Additionally or alternatively, a UE may perform aspects of the functions described below using special-purpose hardware.

At 1905, the UE may receive, from a base station, an indication of a DMRS bundling configuration for one or more physical shared channels. The operations of 1905 may be performed according to the methods described herein. In some examples, aspects of the operations of 1905 may be performed by a DMRS bundling configuration component as described with reference to FIGS. 10-13.

At 1910, the UE may transmit, to the base station based on receiving the indication, an indication of a UE capability for DMRS bundling for the one or more physical shared channels. The operations of 1910 may be performed according to the methods described herein. In some examples, aspects of the operations of 1910 may be performed by a UE capability component as described with reference to FIGS. 10-13.

At 1915, the UE may receive, from the base station based on transmitting the indication of the UE capability, DCI. The operations of 1915 may be performed according to the methods described herein. In some examples, aspects of the operations of 1915 may be performed by a DCI reception component as described with reference to FIGS. 10-13.

At 1920, the UE may receive, via the DCI, a TPC command including an indication of a change in transmit power corresponding to the one or more physical shared channels. The operations of 1920 may be performed according to the methods described herein. In some examples, aspects of the operations of 1920 may be performed by a TPC bundling priority component as described with reference to FIGS. 10-13.

At 1925, the UE may determine, based on the DCI, whether to alter a parameter associated with or more physical shared channel symbols associated with the one or more physical shared channels. The operations of 1925 may be performed according to the methods described herein. In some examples, aspects of the operations of 1925 may be performed by a DMRS bundling priority component or a TPC bundling priority component, as described with reference to FIGS. 10-13.

In a first example, the UE may determine, based on receiving the indication of the change in transmit power, to alter the parameter of one or more of the physical shared channel symbols. In a second example, the UE may determine, based on receiving the indication of the change in transmit power, to maintain the parameter as unchanged for one or more of the physical shared channel symbols. In some implementations of the second example, the UE may determine, based on receiving the indication of the change in transmit power, to alter the parameter of another one of the one or more physical shared channel symbols after a symbol associated with an end of a bundling pattern of the DMRS bundling configuration. In a third example, the UE may determine, based on a TPC value associated with the TPC command, whether to alter the parameter or maintain the parameter as unchanged for one or more of the one or more physical shared channel symbols. In a fourth example, the UE may determine, based on receiving the indication of the change in transmit power, to alter the parameter associated with each of the one or more physical shared channel symbols.

At 1930, the UE may alter or maintain the parameter of one or more of the physical shared channel symbols based on determining whether to alter the parameter. The operations of 1930 may be performed according to the methods described herein. In some examples, aspects of the operations of 1930 may be performed by a TPC bundling priority component, as described with reference to FIGS. 10-13.

At 1935, the UE may transmit, to the base station based on determining whether to alter the parameter, one or more bundled DMRSs associated with the one or more physical shared channel symbols. The operations of 1935 may be performed according to the methods described herein. In some examples, aspects of the operations of 1935 may be performed by a DMRS transmission component as described with reference to FIGS. 10-13.

Figure 20:
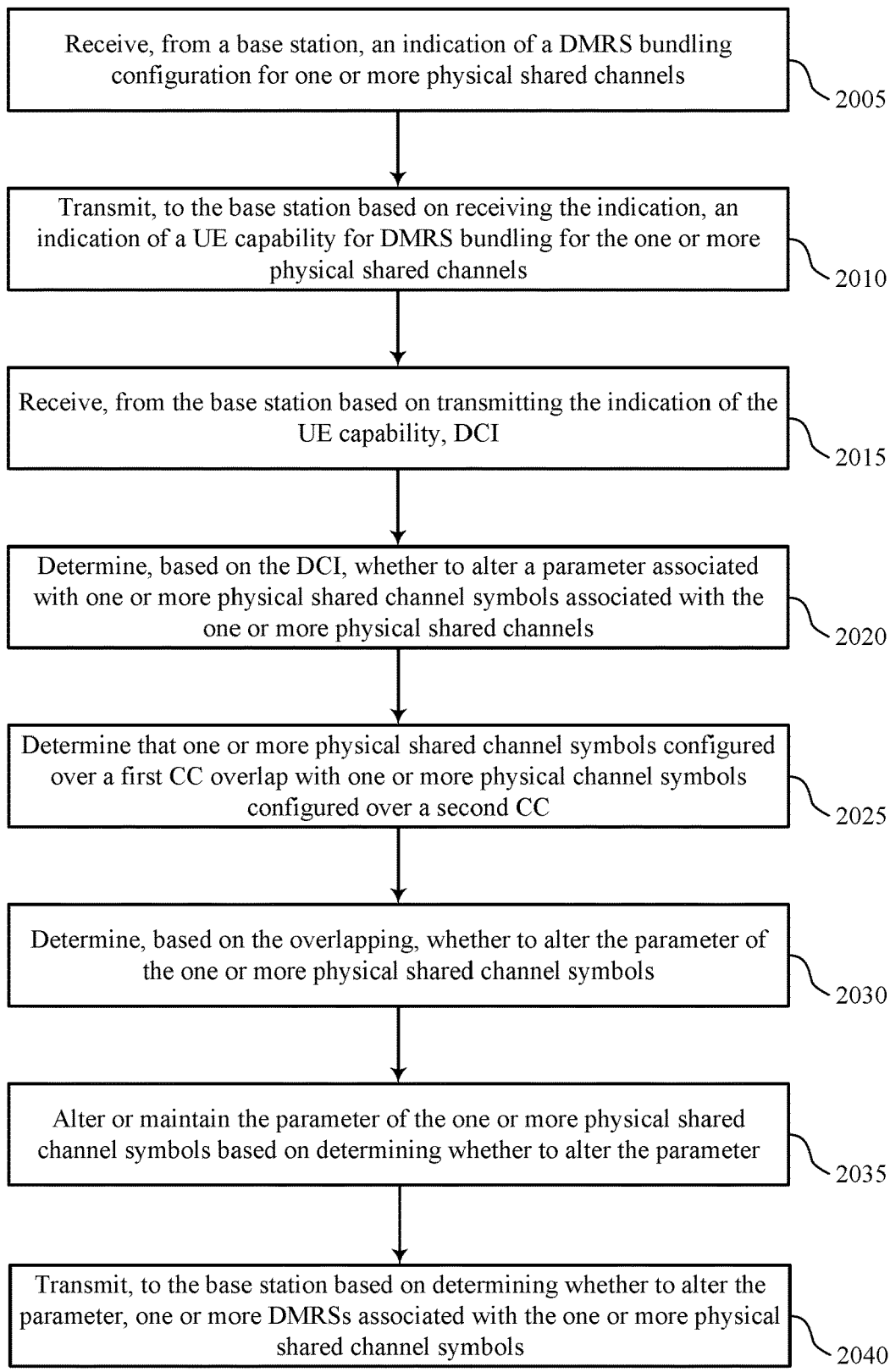

FIG. 20 shows a flowchart illustrating a method 2000 that supports physical shared channel reference signal bundling in accordance with aspects of the present disclosure. The operations of method 2000 may be implemented by a UE 115 or its components as described herein. For example, the operations of method 2000 may be performed by a communications manager as described with reference to FIGS. 10-13. In some examples, a UE may execute a set of instructions to control the functional elements of the UE to perform the functions described below. Additionally or alternatively, a UE may perform aspects of the functions described below using special-purpose hardware.

At 2005, the UE may receive, from a base station, an indication of a DMRS bundling configuration for one or more physical shared channels. The operations of 2005 may be performed according to the methods described herein. In some examples, aspects of the operations of 2005 may be performed by a DMRS bundling configuration component as described with reference to FIGS. 10-13.

At 2010, the UE may transmit, to the base station based on receiving the indication, an indication of a UE capability for DMRS bundling for the one or more physical shared channels. The operations of 2010 may be performed according to the methods described herein. In some examples, aspects of the operations of 2010 may be performed by a UE capability component as described with reference to FIGS. 10-13.

At 2015, the UE may receive, from the base station based on transmitting the indication of the UE capability, DCI. The operations of 2015 may be performed according to the methods described herein. In some examples, aspects of the operations of 2015 may be performed by a DCI reception component as described with reference to FIGS. 10-13.

At 2020, the UE may determine, based on the DCI, whether to alter a parameter associated with or more physical shared channel symbols associated with the one or more physical shared channels. The operations of 2020 may be performed according to the methods described herein. In some examples, aspects of the operations of 2020 may be performed by a DMRS bundling priority component or a CC priority component as described with reference to FIGS. 10-13.

At 2025, the UE may determine that one or more physical shared channel symbols configured over a first CC overlap with one or more physical channel symbols configured over a second CC. The operations of 2025 may be performed according to the methods described herein. In some examples, aspects of the operations of 2025 may be performed by a CC priority component as described with reference to FIGS. 10-13.

At 2030, the UE may determine, based on the overlapping, whether to alter the parameter associated with the one or more physical shared channel symbols. The operations of 2030 may be performed according to the methods described herein. In some examples, aspects of the operations of 2030 may be performed by a CC priority component as described with reference to FIGS. 10-13.

In a first example, the UE may determine, based on the overlapping, to alter the parameter associated with the one or more physical shared channel symbols. In a second example, the UE may determine, based on the overlapping, to alter the parameter associated with the overlapping one or more physical shared channel symbols configured over the first CC and one or more physical shared channel symbols configured over the second CC. In the second example, the UE may determine, based on the overlapping, to maintain the parameter as unchanged for non-overlapping symbols of one or more of the first subset of the physical shared channel symbols or the second subset of the physical channel symbols.

At 2035, the UE may alter or maintain the parameter associated with the one or more physical shared channel symbols based on determining whether to alter the parameter. The operations of 2035 may be performed according to the methods described herein. In some examples, aspects of the operations of 2035 may be performed by a CC priority component as described with reference to FIGS. 10-13.

At 2040, the UE may transmit, to the base station based on determining whether to alter the parameter, one or more bundled DMRSs associated with the one or more physical shared channel symbols. The operations of 2040 may be performed according to the methods described herein. In some examples, aspects of the operations of 2040 may be performed by a DMRS transmission component as described with reference to FIGS. 10-13.

Figure 21:
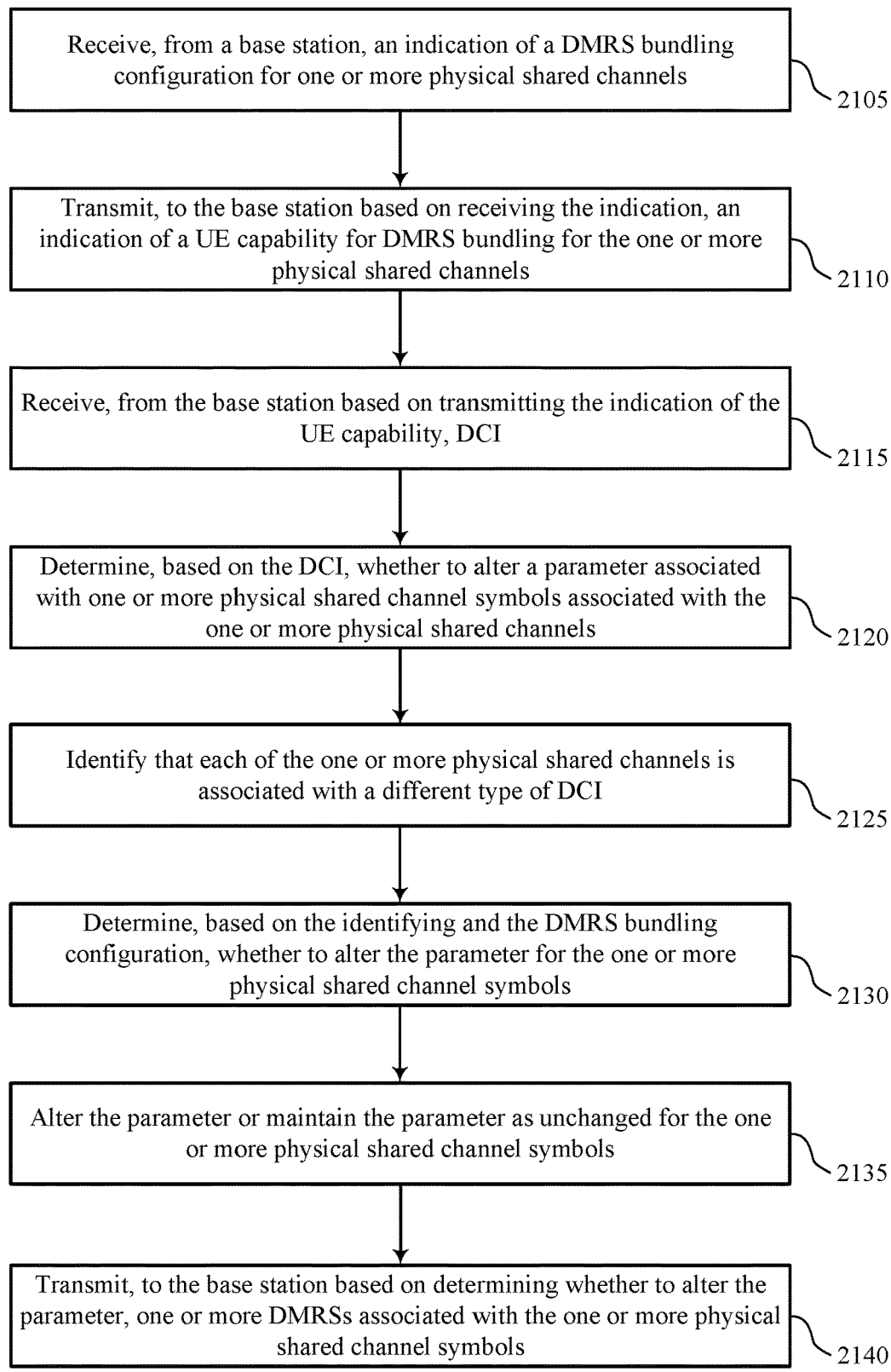

FIG. 21 shows a flowchart illustrating a method 2100 that supports physical shared channel reference signal bundling in accordance with aspects of the present disclosure. The operations of method 2100 may be implemented by a UE 115 or its components as described herein. For example, the operations of method 2100 may be performed by a communications manager as described with reference to FIGS. 10-13. In some examples, a UE may execute a set of instructions to control the functional elements of the UE to perform the functions described below. Additionally or alternatively, a UE may perform aspects of the functions described below using special-purpose hardware.

At 2105, the UE may receive, from a base station, an indication of a DMRS bundling configuration for one or more physical shared channels. The operations of 2105 may be performed according to the methods described herein. In some examples, aspects of the operations of 2105 may be performed by a DMRS bundling configuration component as described with reference to FIGS. 10-13.

At 2110, the UE may transmit, to the base station based on receiving the indication, an indication of a UE capability for DMRS bundling for the one or more physical shared channels. The operations of 2110 may be performed according to the methods described herein. In some examples, aspects of the operations of 2110 may be performed by a UE capability component as described with reference to FIGS. 10-13.

At 2115, the UE may receive, from the base station based on transmitting the indication of the UE capability, DCI. The operations of 2115 may be performed according to the methods described herein. In some examples, aspects of the operations of 2115 may be performed by a DCI reception component as described with reference to FIGS. 10-13.

At 2120, the UE may determine, based on the DCI, whether to alter a parameter associated with or more physical shared channel symbols associated with the one or more physical shared channels. The operations of 2120 may be performed according to the methods described herein. In some examples, aspects of the operations of 2120 may be performed by a DMRS bundling priority component as described with reference to FIGS. 10-13.

At 2125, the UE may identify that each of the one or more physical shared channels is associated with a different type of DCI. The operations of 2125 may be performed according to the methods described herein. In some examples, aspects of the operations of 2125 may be performed by a DCI priority component as described with reference to FIGS. 10-13.

At 2130, the UE may determine, based on the identifying and the DMRS bundling configuration, whether to alter the parameter for the one or more physical shared channel symbols. The operations of 2130 may be performed according to the methods described herein. In some examples, aspects of the operations of 2130 may be performed by a DCI priority component as described with reference to FIGS. 10-13.

At 2135, the UE may alter the parameter or maintain the parameter as unchanged for the one or more physical shared channel symbols. The operations of 2135 may be performed according to the methods described herein. In some examples, aspects of the operations of 2135 may be performed by a DCI priority component as described with reference to FIGS. 10-13.

At 2140, the UE may transmit, to the base station based on determining whether to alter the parameter, one or more bundled DMRSs associated with the one or more physical shared channel symbols. The operations of 2140 may be performed according to the methods described herein. In some examples, aspects of the operations of 2140 may be performed by a DMRS transmission component as described with reference to FIGS. 10-13.

Figure 22:
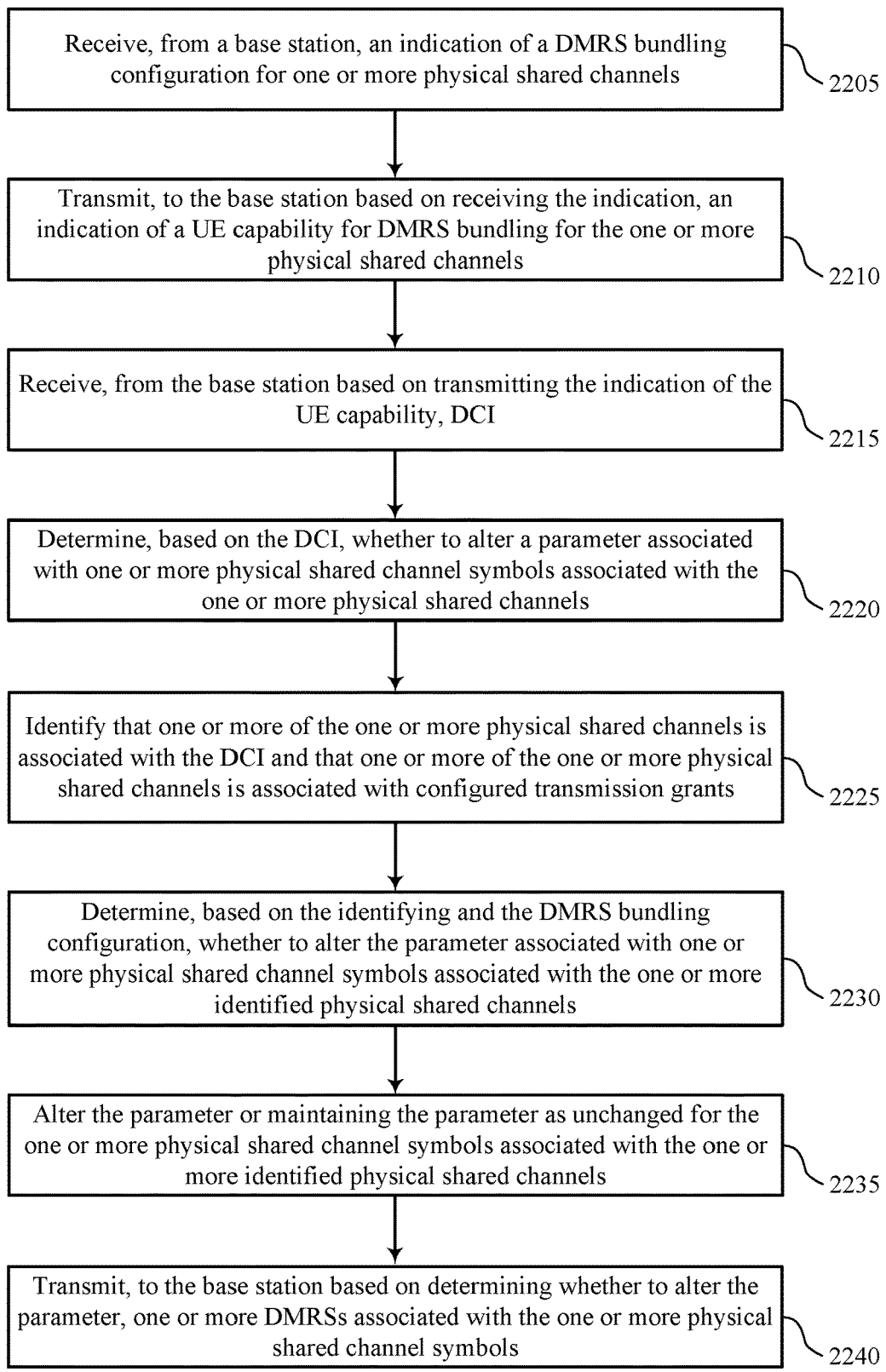

FIG. 22 shows a flowchart illustrating a method 2200 that supports physical shared channel reference signal bundling in accordance with aspects of the present disclosure. The operations of method 2200 may be implemented by a UE 115 or its components as described herein. For example, the operations of method 2200 may be performed by a communications manager as described with reference to FIGS. 10-13. In some examples, a UE may execute a set of instructions to control the functional elements of the UE to perform the functions described below. Additionally or alternatively, a UE may perform aspects of the functions described below using special-purpose hardware.

At 2205, the UE may receive, from a base station, an indication of a DMRS bundling configuration for one or more physical shared channels. The operations of 2205 may be performed according to the methods described herein. In some examples, aspects of the operations of 2205 may be performed by a DMRS bundling configuration component as described with reference to FIGS. 10-13.

At 2210, the UE may transmit, to the base station based on receiving the indication, an indication of a UE capability for DMRS bundling for the one or more physical shared channels. The operations of 2210 may be performed according to the methods described herein. In some examples, aspects of the operations of 2210 may be performed by a UE capability component as described with reference to FIGS. 10-13.

At 2215, the UE may receive, from the base station based on transmitting the indication of the UE capability, DCI. The operations of 2215 may be performed according to the methods described herein. In some examples, aspects of the operations of 2215 may be performed by a DCI reception component as described with reference to FIGS. 10-13.

At 2220, the UE may determine, based on the DCI, whether to alter a parameter associated with or more physical shared channel symbols associated with the one or more physical shared channels. The operations of 2220 may be performed according to the methods described herein. In some examples, aspects of the operations of 2220 may be performed by a DMRS bundling priority component as described with reference to FIGS. 10-13.

At 2225, the UE may identify that one or more of the one or more physical shared channels is associated with the DCI and that one or more of the one or more physical shared channels is associated with configured transmission grants. The operations of 2225 may be performed according to the methods described herein. In some examples, aspects of the operations of 2225 may be performed by a DCI priority component as described with reference to FIGS. 10-13.

At 2230, the UE may determine, based on the identifying and the DMRS bundling configuration, whether to alter the parameter for one or more physical shared channel symbols associated with the one or more identified physical shared channels. The operations of 2230 may be performed according to the methods described herein. In some examples, aspects of the operations of 2230 may be performed by a DCI priority component as described with reference to FIGS. 10-13.

At 2235, the UE may alter the parameter or maintain the parameter as unchanged for the one or more physical shared channel symbols associated with the one or more identified physical shared channels. The operations of 2235 may be performed according to the methods described herein. In some examples, aspects of the operations of 2235 may be performed by a DCI priority component as described with reference to FIGS. 10-13.

At 2240, the UE may transmit, to the base station based on determining whether to alter the parameter, one or more bundled DMRSs associated with the one or more physical shared channel symbols. The operations of 2240 may be performed according to the methods described herein. In some examples, aspects of the operations of 2240 may be performed by a DMRS transmission component as described with reference to FIGS. 10-13.

Figure 23:
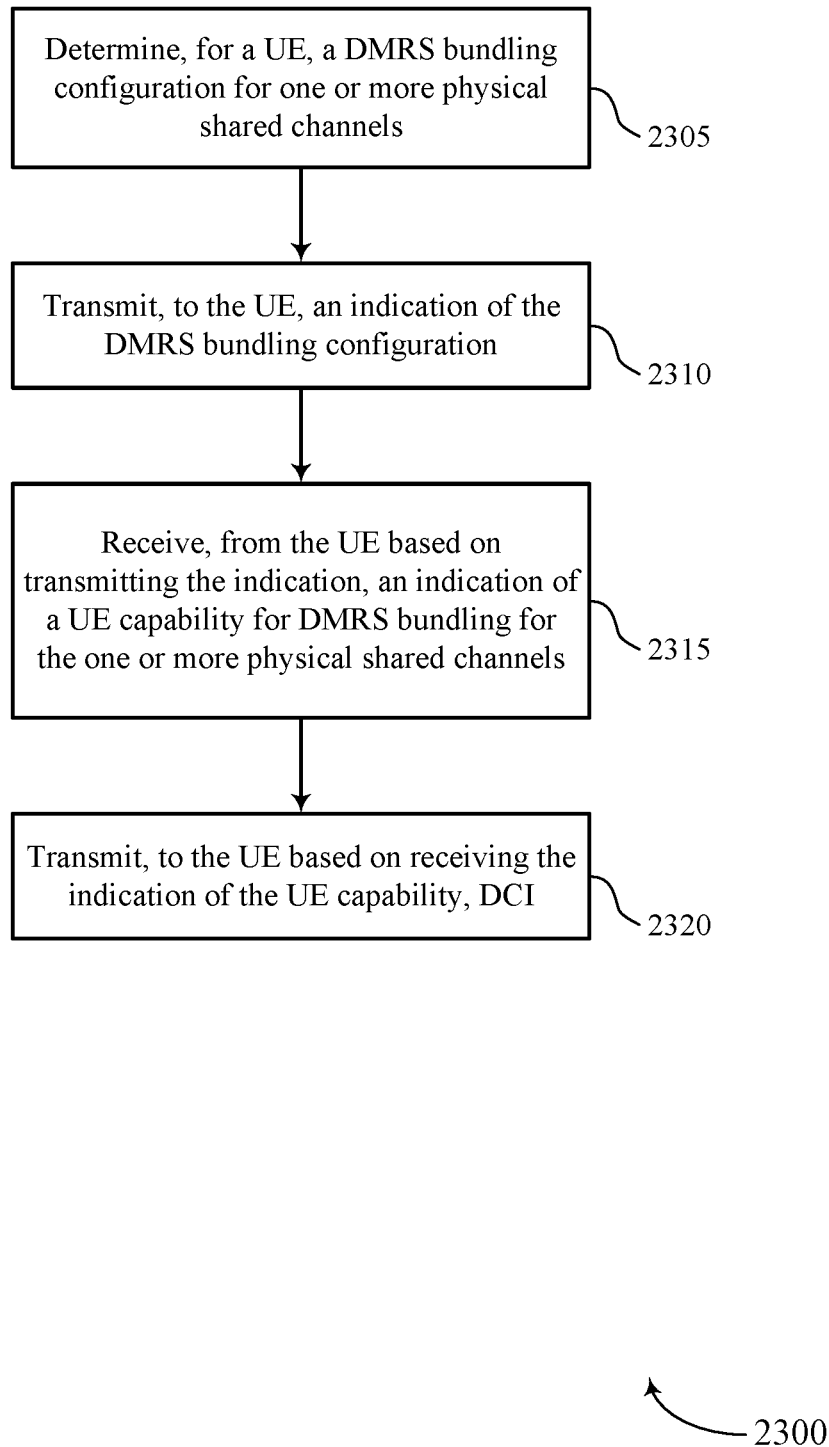

FIG. 23 shows a flowchart illustrating a method 2300 that supports physical shared channel reference signal bundling in accordance with aspects of the present disclosure. The operations of method 2300 may be implemented by a base station 105 or its components as described herein. For example, the operations of method 2300 may be performed by a communications manager as described with reference to FIGS. 14-17. In some examples, a base station may execute a set of instructions to control the functional elements of the base station to perform the functions described below. Additionally or alternatively, a base station may perform aspects of the functions described below using special-purpose hardware.

At 2305, the base station may determine, for a UE, a DMRS bundling configuration for one or more physical shared channels. The operations of 2305 may be performed according to the methods described herein. In some examples, aspects of the operations of 2305 may be performed by a DMRS bundling configuration manager as described with reference to FIGS. 14-17.

At 2310, the base station may transmit, to the UE, an indication of the DMRS bundling configuration. The operations of 2310 may be performed according to the methods described herein. In some examples, aspects of the operations of 2310 may be performed by a DMRS bundling configuration transmission component as described with reference to FIGS. 14-17.

At 2315, the base station may receive, from the UE based on transmitting the indication, an indication of a UE capability for DMRS bundling for the one or more physical shared channels. The operations of 2315 may be performed according to the methods described herein. In some examples, aspects of the operations of 2315 may be performed by a UE capability indication component as described with reference to FIGS. 14-17.

At 2320, the base station may transmit, to the UE based on receiving the indication of the UE capability, DCI. The operations of 2320 may be performed according to the methods described herein. In some examples, aspects of the operations of 2320 may be performed by a DCI component as described with reference to FIGS. 14-17.

Figure 24:
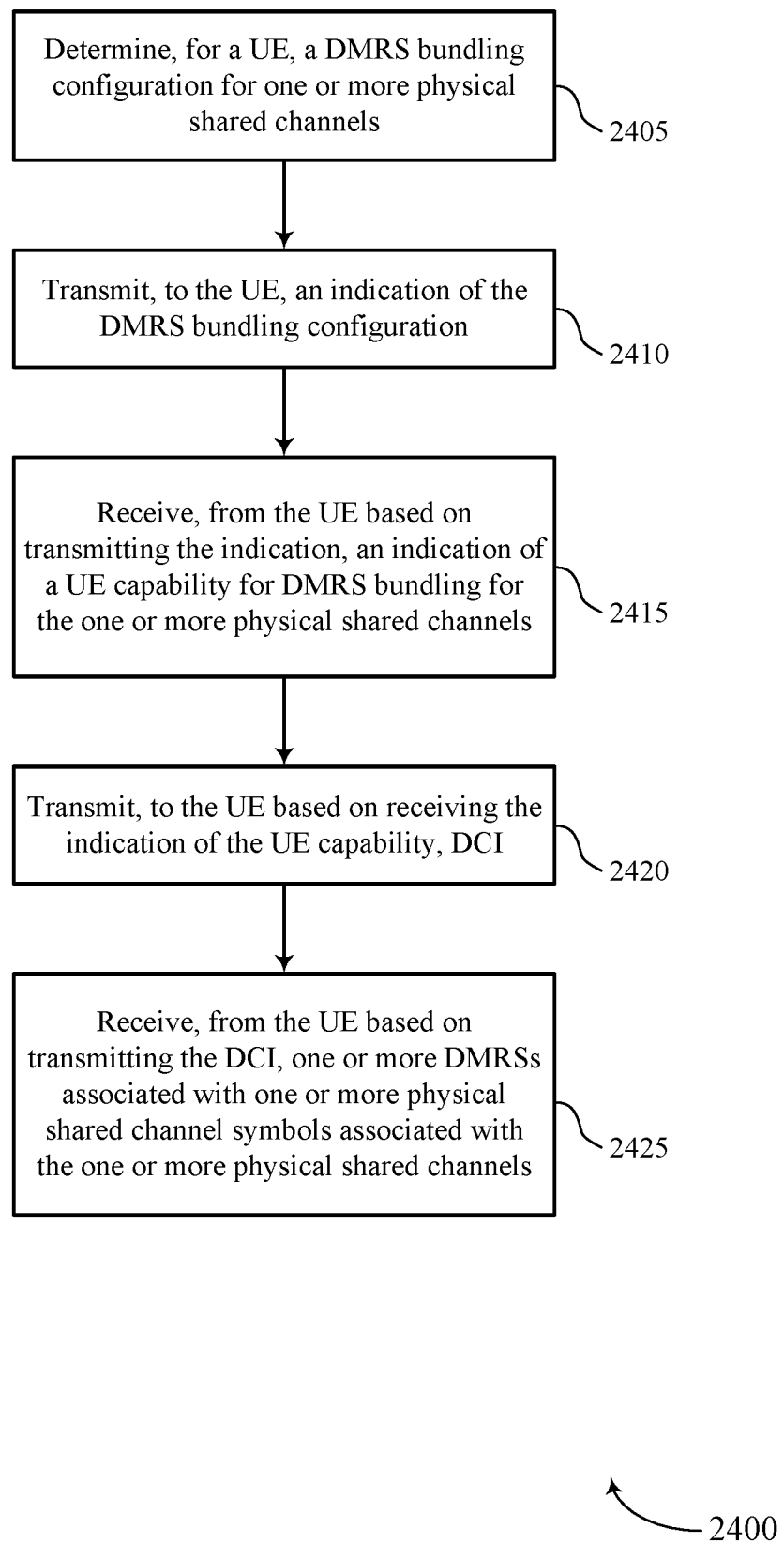

FIG. 24 shows a flowchart illustrating a method 2400 that supports physical shared channel reference signal bundling in accordance with aspects of the present disclosure. The operations of method 2400 may be implemented by a base station 105 or its components as described herein. For example, the operations of method 2400 may be performed by a communications manager as described with reference to FIGS. 14-17. In some examples, a base station may execute a set of instructions to control the functional elements of the base station to perform the functions described below. Additionally or alternatively, a base station may perform aspects of the functions described below using special-purpose hardware.

At 2405, the base station may determine, for a UE, a DMRS bundling configuration for one or more physical shared channels. The operations of 2405 may be performed according to the methods described herein. In some examples, aspects of the operations of 2405 may be performed by a DMRS bundling configuration manager as described with reference to FIGS. 14-17.

At 2410, the base station may transmit, to the UE, an indication of the DMRS bundling configuration. The operations of 2410 may be performed according to the methods described herein. In some examples, aspects of the operations of 2410 may be performed by a DMRS bundling configuration transmission component as described with reference to FIGS. 14-17.

At 2415, the base station may receive, from the UE based on transmitting the indication, an indication of a UE capability for DMRS bundling for the one or more physical shared channels. The operations of 2415 may be performed according to the methods described herein. In some examples, aspects of the operations of 2415 may be performed by a UE capability indication component as described with reference to FIGS. 14-17.

At 2420, the base station may transmit, to the UE based on receiving the indication of the UE capability, DCI. The operations of 2420 may be performed according to the methods described herein. In some examples, aspects of the operations of 2420 may be performed by a DCI component as described with reference to FIGS. 14-17.

At 2425, the base station may receive, from the UE based on transmitting the DCI, one or more bundled DMRSs associated with one or more physical shared channel symbols associated with the one or more physical shared channels. The operations of 2425 may be performed according to the methods described herein. In some examples, aspects of the operations of 2425 may be performed by a DMRS reception component as described with reference to FIGS. 14-17.

The methods described herein describe possible implementations, and the operations and the steps may be rearranged or otherwise modified, and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc in which disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a base station, an indication of a demodulation reference signal bundling configuration for one or more physical shared channels;
   transmitting, to the base station based at least in part on receiving the indication, an indication of a UE capability for demodulation reference signal bundling for the one or more physical shared channels;
   receiving, from the base station based at least in part on transmitting the indication of the UE capability, downlink control information;
   determining, based at least in part on the downlink control information, whether to alter a parameter associated with one or more physical shared channel symbols associated with the one or more physical shared channels; and
   transmitting, to the base station based at least in part on determining whether to alter the parameter, one or more bundled demodulation reference signals associated with the one or more physical shared channel symbols.

2. The method of claim 1, wherein the parameter comprises a coherence property of the one or more physical shared channel symbols.

3. The method of claim 2, wherein the coherence property comprises one or more of a phase continuity, a precoder phase continuity, a threshold timing gap, a frequency resource allocation, a transmit power, or a transmit waveform, associated with the one or more physical shared channel symbols.

4. The method of claim 2, wherein determining whether to alter the parameter comprises determining whether to alter the parameter associated with the one or more physical shared channel symbols across multiple slots associated with the one or more physical shared channels.

5. The method of claim 2, wherein transmitting the one or more bundled demodulation reference signals comprises transmitting the one or more bundled demodulation reference signals associated with the one or more physical shared channel symbols across multiple slots.

6. The method of claim 1, further comprising receiving, via the downlink control information, a transmit power control command comprising an indication of a change in transmit power corresponding to the one or more physical shared channels.

7. The method of claim 6, further comprising:
determining, based at least in part on receiving the indication of the change in transmit power, to alter the parameter associated with one or more of the one or more physical shared channel symbols; and
altering the parameter associated with the one or more of the one or more physical shared channel symbols based at least in part on determining to alter the parameter.

8. The method of claim 6, further comprising:
determining, based at least in part on receiving the indication of the change in transmit power, to maintain the parameter as unchanged for one or more of the one or more physical shared channel symbols; and
maintaining the parameter associated with the one or more of the one or more physical shared channel symbols based at least in part on determining to maintain the parameter.

9. The method of claim 8, further comprising:
determining, based at least in part on receiving the indication of the change in transmit power, to alter the parameter associated with another one or more of the one or more physical shared channel symbols after a symbol associated with an end of a bundling pattern of the demodulation reference signal bundling configuration; and
altering the parameter associated with the another one or more of the one or more physical shared channel symbols based at least in part on determining to alter the parameter.

10. The method of claim 6, further comprising:
determining, based at least in part on a transmit power control value associated with the transmit power control command, whether to alter the parameter or maintain the parameter as unchanged for one or more of the one or more physical shared channel symbols; and
altering or maintaining the parameter associated with the one or more of the one or more physical shared channel symbols based at least in part on determining whether to alter the parameter.

11. The method of claim 6, further comprising:
determining, based at least in part on receiving the indication of the change in transmit power, to alter the parameter associated with each of the one or more physical shared channel symbols; and
altering the parameter associated with each of the one or more physical shared channel symbols based at least in part on determining to alter the parameter.

12. The method of claim 1, wherein a first subset of the one or more physical shared channel symbols are configured over a first component carrier and a second subset of one or more physical channel symbols are configured over a second component carrier, the method further comprising:
determining that one or more physical shared channel symbols configured over the first component carrier overlap with one or more physical channel symbols configured over the second component carrier.

13. The method of claim 12, wherein the second subset of the one or more physical channel symbols is associated with a same type of physical channel, a same type of signaling, a different type of physical channel, or a different type of signaling as the first subset of the one or more physical shared channel symbols.

14. The method of claim 12, further comprising:
determining, based at least in part on the overlapping, to alter the parameter associated with the one or more physical shared channel symbols; and
altering the parameter associated with the one or more physical shared channel symbols based at least in part on determining to alter the parameter.

15. The method of claim 12, further comprising:
determining, based at least in part on the overlapping, to alter the parameter associated with the overlapping one or more physical shared channel symbols configured over the first component carrier and one or more physical shared channel symbols configured over the second component carrier; and
altering the parameter associated with the one or more physical shared channel symbols configured over the first component carrier and the one or more physical shared channel symbols configured over the second component carrier based at least in part on determining to alter the parameter.

16. The method of claim 15, further comprising:
determining, based at least in part on the overlapping, to maintain the parameter as unchanged for non-overlapping symbols of one or more of the first subset of the one or more physical shared channel symbols or the second subset of the one or more physical channel symbols; and
maintaining the parameter associated with the non-overlapping symbols of one or more of the first subset of the one or more physical shared channel symbols or the second subset of the one or more physical channel symbols based at least in part on determining to maintain the parameter.

17. The method of claim 1, further comprising:
identifying that each of the one or more physical shared channels is associated with a different type of downlink control information;
determining, based at least in part on the identifying and the demodulation reference signal bundling configuration, whether to alter the parameter for the one or more physical shared channel symbols; and
altering the parameter or maintaining the parameter as unchanged for the one or more physical shared channel symbols.

18. The method of claim 17, wherein the different types of downlink control information comprise two or more of downlink control information with a format 0-0, downlink control information with a format 0-1, downlink control information with a cyclic redundancy check scrambled by a cell radio network temporary identifier, or downlink control information with a cyclic redundancy check scrambled by a configured scheduling radio network temporary identifier.

19. The method of claim 1, further comprising:
identifying that one or more of the one or more physical shared channels is associated with the downlink control information and that one or more of the one or more physical shared channels is associated with configured transmission grants;
determining, based at least in part on the identifying and the demodulation reference signal bundling configuration, whether to alter the parameter for one or more physical shared channel symbols associated with the one or more identified physical shared channels; and
altering the parameter or maintaining the parameter as unchanged for the one or more physical shared channel symbols associated with the one or more identified physical shared channels.

20. The method of claim 1, wherein the downlink control information comprises scheduling downlink control information or group common downlink control information.

21. The method of claim 1, wherein the one or more physical shared channels repeat over multiple transmission time intervals.

22. The method of claim 1, wherein the one or more physical shared channels each carry one or more different transport blocks.

23. The method of claim 1, wherein receiving the indication of the demodulation reference signal bundling configuration comprises receiving the indication of the demodulation reference signal bundling configuration via radio resource control signaling or via downlink control information.

24. The method of claim 1, wherein receiving the indication of the demodulation reference signal bundling configuration comprises receiving the indication of the demodulation reference signal bundling configuration based at least in part on one or more of a modulation coding scheme, a timing gap between the one or more physical shared channel symbols, or a quantity of repetitions of the one or more physical shared channels.

25. The method of claim 1, wherein the indication of the UE capability for demodulation reference signal bundling comprises a timing gap between the one or more physical shared channel symbols.

26. The method of claim 1, wherein the demodulation reference signal bundling configuration comprises one or more of a quantity of physical shared channel symbols to have a same parameter, a first symbol to have a same parameter, a last symbol to have a same parameter, or one or more priorities associated with demodulation reference signal bundling.

27. The method of claim 1, further comprising:
receiving an indication to transmit the one or more bundled demodulation reference signals using a same precoding matrix; and
transmitting the one or more bundled demodulation reference signals in a number of consecutive transmission slots and using the same precoding matrix.

28. The method of claim 27, further comprising maintaining a transmit power for at least a portion of the one or more bundled demodulation reference signals within a threshold range.

29. The method of claim 27, further comprising:
receiving, before transmission of a portion of the one or more bundled demodulation reference signals, an indication to adjust a transmit power for the one or more bundled demodulation reference signals; and
maintaining a transmit power for at least a portion of the one or more bundled demodulation reference signals within a threshold range after reception of the indication to adjust transmit power.

30. The method of claim 27, wherein the one or more bundled demodulation reference signals are transmitted in a first carrier, the method further comprising:
transmitting information in a second carrier and in at least a portion of the number of consecutive transmission slots;
determining that a total transmit power for transmitting the one or more bundled demodulation reference signals in the first carrier and for transmitting the information in the second carrier satisfies a threshold; and
allocating power between transmission of the one or more bundled demodulation reference signals in the first carrier and transmission of the information in the second carrier, wherein transmission of the one or more bundled demodulation reference signals in the first carrier is given priority over transmission of the information in the second carrier.

31. The method of claim 27, further comprising:
receiving, before transmission of a portion of the one or more bundled demodulation reference signals, an indication to adjust a transmit power for the one or more bundled demodulation reference signals; and
increasing the transmit power for each of the one or more bundled demodulation reference signals transmitted after reception of the indication to adjust transmit power or increasing the transmit power for at least a portion of the one or more bundled demodulation reference signals transmitted after reception of the indication to adjust transmit power.

32. The method of claim 27, wherein the indication to transmit the one or more bundled demodulation reference signals using the same precoding matrix is received via downlink control information.

33. The method of claim 27, wherein the indication to transmit the one or more bundled demodulation reference signals using the same precoding matrix is received implicitly through determination that one or more of a same power control parameter or precoding matrix is to be used to transmit the one or more bundled demodulation reference signals.

34. A method for wireless communication at a base station, comprising:
determining, for a user equipment (UE), a demodulation reference signal bundling configuration for one or more physical shared channels;
transmitting, to the UE, an indication of the demodulation reference signal bundling configuration;
receiving, from the UE based at least in part on transmitting the indication, an indication of a UE capability for demodulation reference signal bundling for the one or more physical shared channels; and
transmitting, to the UE based at least in part on receiving the indication of the UE capability, downlink control information.

35. The method of claim 34, further comprising receiving, from the UE based at least in part on transmitting the downlink control information, one or more bundled demodulation reference signals associated with one or more physical shared channel symbols associated with the one or more physical shared channels.

36. The method of claim 35, further comprising:
combining the one or more bundled demodulation reference signals associated with the one or more physical shared channel symbols; and
estimating one or more parameters associated with physical shared channel demodulation based at least in part on combining the one or more bundled demodulation reference signals.

37. The method of claim 35, wherein the one or more physical shared channel symbols are associated with a parameter that is altered or maintained as unchanged based at least in part on transmitting the downlink control information.

38. The method of claim 37, wherein the parameter comprises a coherence property of the one or more physical shared channel symbols.

39. The method of claim 38, wherein the coherence property comprises one or more of a phase continuity, a precoder phase continuity, a threshold timing gap, a frequency resource allocation, a transmit power, or a transmit waveform, associated with the one or more physical shared channel symbols.

40. The method of claim 35, wherein receiving the one or more bundled demodulation reference signals comprises receiving the one or more bundled demodulation reference signals associated with the one or more physical shared channel symbols across multiple slots associated with the one or more physical shared channels.

41. The method of claim 35, further comprising:
configuring a first subset of the one or more physical shared channel symbols over a first component carrier; and
configuring a second subset of one or more physical channel symbols over a second component carrier, wherein one or more physical shared channel symbols configured over the first component carrier overlap with one or more physical channel symbols configured over the second component carrier.

42. The method of claim 41, wherein the second subset of the one or more physical channel symbols is associated with a same type of physical channel, a same type of signaling, a different type of physical channel, or a different type of signaling as the first subset of the one or more physical shared channel symbols.

43. The method of claim 34, further comprising transmitting, via the downlink control information, a transmit power control command comprising an indication of a change in transmit power corresponding to the one or more physical shared channels.

44. The method of claim 34, wherein the downlink control information comprises scheduling downlink control information or group common downlink control information.

45. The method of claim 34, further comprising configuring the one or more physical shared channels such that each of the one or more physical shared channels is associated with a different type of downlink control information.

46. The method of claim 45, wherein the different types of downlink control information comprise two or more of downlink control information with a format 0-0, downlink control information with a format 0-1, downlink control information with a cyclic redundancy check scrambled by a cell radio network temporary identifier, or downlink control information with a cyclic redundancy check scrambled by a configured scheduling radio network temporary identifier.

47. The method of claim 34, further comprising configuring the one or more physical shared channels such that one or more of the one or more physical shared channels is associated with the downlink control information and that one or more of the one or more physical shared channels is associated with configured transmission grants.

48. The method of claim 34, wherein the one or more physical shared channels repeat over multiple transmission time intervals.

49. The method of claim 34, wherein the one or more physical shared channels each carry one or more different transport blocks.

50. The method of claim 34, wherein transmitting the indication of the demodulation reference signal bundling configuration comprises transmitting the indication of the demodulation reference signal bundling configuration via radio resource control signaling or via downlink control information.

51. The method of claim 34, wherein transmitting the indication of the demodulation reference signal bundling comprises transmitting the indication of the demodulation reference signal bundling configuration based at least in part on one or more of a modulation coding scheme, a timing gap between one or more physical shared channel symbols, a quantity of repetitions of the one or more physical shared channels.

52. The method of claim 34, wherein the indication of the UE capability for demodulation reference signal bundling comprises a timing gap between one or more physical shared channel symbols.

53. The method of claim 35, wherein the demodulation reference signal bundling configuration comprises one or more of a quantity of physical shared channel symbols to have a same parameter, a first symbol to have a same parameter, a last symbol to have a same parameter, and one or more priorities associated with demodulation reference signal bundling.

54. The method of claim 35, further comprising:
transmitting an indication to transmit the one or more bundled demodulation reference signals using a same precoding matrix; and
receiving the one or more bundled demodulation reference signals in a number of consecutive transmission slots, wherein the same precoding matrix is associated with each of the one or more bundled demodulation reference signals.

55. The method of claim 54, further comprising transmitting, before a portion of the one or more bundled demodulation reference signals is transmitted, an indication to adjust a transmit power for the one or more bundled demodulation reference signals.

56. The method of claim 54, wherein the one or more bundled demodulation reference signals are received in a first carrier, the method further comprising:
receiving information in a second carrier and in at least a portion of the number of consecutive transmission slots.

57. The method of claim 54, wherein the indication to transmit the one or more bundled demodulation reference signals using a same precoding matrix is transmitted via downlink control information.

58. An apparatus for wireless communication at a user equipment (UE), comprising:
a processor;
memory coupled with the processor; and
instructions stored in the memory and executable by the processor to cause the apparatus to:
receive, from a base station, an indication of a demodulation reference signal bundling configuration for one or more physical shared channels;
transmit, to the base station based at least in part on receiving the indication, an indication of a UE capability for demodulation reference signal bundling for the one or more physical shared channels;
receive, from the base station based at least in part on transmitting the indication of the UE capability, downlink control information;
determine, based at least in part on the downlink control information, whether to alter a parameter associated with or more physical shared channel symbols associated with the one or more physical shared channels; and
transmit, to the base station based at least in part on determining whether to alter the parameter, one or more bundled demodulation reference signals associated with the one or more physical shared channel symbols.

59. The apparatus of claim 58, wherein the parameter comprises a coherence property of the one or more physical shared channel symbols.

60. The apparatus of claim 59, wherein the coherence property comprises one or more of a phase continuity, a precoder phase continuity, a threshold timing gap, a frequency resource allocation, a transmit power, or a transmit waveform, associated with the one or more physical shared channel symbols.

61. An apparatus for wireless communication at a base station, comprising:
   a processor;
   memory coupled with the processor; and
   instructions stored in the memory and executable by the processor to cause the apparatus to:
      determine, for a user equipment (UE), a demodulation reference signal bundling configuration for one or more physical shared channels;
      transmit, to the UE, an indication of the demodulation reference signal bundling configuration;
      receive, from the UE based at least in part on transmitting the indication, an indication of a UE capability for demodulation reference signal bundling for the one or more physical shared channels; and
      transmit, to the UE based at least in part on receiving the indication of the UE capability, downlink control information.

62. The apparatus of claim 61, wherein the instructions are further executable by the processor to cause the apparatus to receive, from the UE based at least in part on transmitting the downlink control information, one or more bundled demodulation reference signals associated with one or more physical shared channel symbols associated with the one or more physical shared channels.

63. The apparatus of claim 62, wherein the instructions are further executable by the processor to cause the apparatus to:
   combine the one or more bundled demodulation reference signals associated with the one or more physical shared channel symbols; and
   estimate one or more parameters associated with physical shared channel demodulation based at least in part on combining the one or more bundled demodulation reference signals.

64. The method of claim 1, wherein performing demodulation reference signal bundling comprises maintaining a coherence property across one or more demodulation reference signals.

65. The method of claim 1, wherein the demodulation reference signal bundling configuration comprises an indication of a time window for bundling demodulation reference signals.

* * * * *